US012702946B2

(12) United States Patent
Backhaus-Ricoult et al.

(10) Patent No.: US 12,702,946 B2
(45) Date of Patent: Aug. 11, 2026

(54) HIGH FILTRATION EFFICIENCY PARTICULATE FILTERS HAVING BIMODAL PORE SIZE DISTRIBUTION MADE FROM BEADS WITH OPEN POROSITY

(71) Applicant: CORNING INCORPORATED, Corning, NY (US)

(72) Inventors: Monika Backhaus-Ricoult, Bourron (FR); Linda Kay Bohart, Liberty, PA (US); Kimberley Louise Work, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 625 days.

(21) Appl. No.: 17/925,932

(22) PCT Filed: Jul. 29, 2021

(86) PCT No.: PCT/US2021/043646
§ 371 (c)(1),
(2) Date: Nov. 17, 2022

(87) PCT Pub. No.: WO2022/026669
PCT Pub. Date: Feb. 3, 2022

(65) Prior Publication Data

US 2023/0211270 A1 Jul. 6, 2023

Related U.S. Application Data

(60) Provisional application No. 63/072,837, filed on Aug. 31, 2020, provisional application No. 63/071,717,
(Continued)

(51) Int. Cl.
*B01D 46/24* (2006.01)
*C04B 35/195* (2006.01)
(Continued)

(52) U.S. Cl.
CPC ... *B01D 46/24491* (2021.08); *B01D 46/2429* (2013.01); *B01D 46/24492* (2021.08);
(Continued)

(58) Field of Classification Search
CPC .......... B01D 46/24491; B01D 46/2482; B01D 46/24; B01D 46/492; B01D 46/2429;
(Continued)

(56) References Cited

U.S. PATENT DOCUMENTS 4,476,236 A 10/1984 Inoguchi et al.
5,322,821 A 6/1994 Brezny
(Continued)

FOREIGN PATENT DOCUMENTS

CN 1355776 A 6/2002
CN 1844645 A 10/2006
(Continued)

OTHER PUBLICATIONS

International Search Report and Written Opinion of the International Searching Authority; PCT/US2021/043646; dated Nov. 8, 2021; 12 pages; European Patent Office.
(Continued)

*Primary Examiner* — Qianping He
(74) *Attorney, Agent, or Firm* — Irene L. Brookins

(57) ABSTRACT

A particulate filter and method of manufacture. The particulate filter comprises a ceramic honeycomb body comprising a plurality of intersecting walls that define a plurality of channels extending longitudinally though the ceramic honeycomb body. The intersecting walls comprise a porous ceramic material having a microstructure that comprises an interconnected network of porous spheroidal ceramic beads. The microstructure has a total porosity defined as the sum of an open intrabead porosity of the beads and an interbead porosity defined by interstices between the beads in the
(Continued)

interconnected network. The microstructure has a bimodal pore size distribution in which an intrabead median pore size of the intrabead porosity is from 1.5 μm to 4 μm and an interbead median pore size of the interbead porosity is from 6 μm to 20 μm.

20 Claims, 29 Drawing Sheets

Related U.S. Application Data filed on Aug. 28, 2020, provisional application No. 63/059,631, filed on Jul. 31, 2020.

(51) Int. Cl.
*C04B 38/00* (2006.01)
*C04B 38/06* (2006.01)
*C04B 111/00* (2006.01)

(52) U.S. Cl.
CPC ..... *B01D 46/2455* (2013.01); *B01D 46/2474* (2013.01); *B01D 46/2482* (2021.08); *C04B 35/195* (2013.01); *C04B 38/0009* (2013.01); *C04B 38/0054* (2013.01); *C04B 38/0064* (2013.01); *C04B 38/0074* (2013.01); *C04B 38/0615* (2013.01); *C04B 38/063* (2013.01); *B01D 2275/30* (2013.01); *C04B 2111/00793* (2013.01); *C04B 2111/0081* (2013.01)

(58) Field of Classification Search
CPC ........... B01D 26/2455; B01D 46/2474; B01D 2275/30; B01D 46/24492; B01D 2255/9155; B01D 2255/9205; B01D 2253/311; B01D 46/2459; C04B 35/195; C04B 38/0009; C04B 38/0054; C04B 38/0064; C04B 38/0074; C04B 38/0615; C04B 38/063; C04B 2111/00793; C04B 38/0006; C04B 2111/0081; C04B 38/009; C04B 38/0058; C04B 38/00; C04B 38/06; C01B 2111/00793; C01B 2111/0081; F01N 3/2825; F01N 3/2828
USPC .......... 55/523, 524; 428/116, 313.9; 501/80, 501/153, 134, 97.2; 502/80
See application file for complete search history.

(56) References Cited

U.S. PATENT DOCUMENTS 5,552,349 A 9/1996 Ichii et al.
6,210,625 B1 4/2001 Matsushita et al.
9,376,347 B2 6/2016 Backhaus-Ricoult et al.
9,623,360 B2 4/2017 Backhaus-Ricoult et al.
9,908,260 B2 3/2018 Backhaus et al.
11,229,902 B2 1/2022 Backhaus-Ricoult et al.
2003/0039598 A1 2/2003 Nishimura et al.
2003/0165662 A1 9/2003 Suwabe et al.
2006/0230732 A1 10/2006 Kunieda
2008/0022644 A1* 1/2008 DeRosa .............. C04B 38/0615 55/523
2008/0124516 A1 5/2008 Noguchi et al.
2009/0049815 A1 2/2009 Beall et al.
2009/0087613 A1 4/2009 Lu et al.
2011/0052906 A1 3/2011 Itoi et al.
2011/0111205 A1* 5/2011 Park ...................... C04B 35/591 428/313.9
2011/0160104 A1 6/2011 Wu et al.
2011/0252773 A1 10/2011 Arnold et al.
2012/0110965 A1 5/2012 Cai et al.
2014/0249058 A1 9/2014 Wu et al.
2014/0342898 A1* 11/2014 Backhaus-Ricoult ....................... C04B 35/62655 501/153
2015/0121824 A1 5/2015 Jinbo et al.
2016/0103261 A1 4/2016 Bauco et al.
2016/0250577 A1 9/2016 Okazaki
2018/0319114 A1* 11/2018 Shibayama ........ B29D 99/0089
2018/0361299 A1 12/2018 Ingram-Ogunwumi et al.
2020/0324279 A1 10/2020 Backhaus-Ricoult et al.
2021/0155555 A1 5/2021 Backhaus-Ricoult et al.
2022/0155683 A1 5/2022 Deng et al.

FOREIGN PATENT DOCUMENTS

CN 201648251 U 11/2010
CN 102470359 A 5/2012
CN 102630184 A 8/2012
CN 102731111 A 10/2012
CN 102781854 A 11/2012
CN 102939445 A 2/2013
CN 103282327 A 9/2013
CN 105236947 A 1/2016
CN 105473532 A 4/2016
CN 105555738 A 5/2016
CN 108367224 A 8/2018
CN 108367225 A 8/2018
CN 109219589 A 1/2019
CN 107266097 B 8/2019
DE 102007034339 A1 1/2009
EP 1245262 A1 10/2002
EP 2281783 A1 2/2011
EP 3202477 A1 8/2017
EP 3347328 A1 7/2018
JP 07-060038 A 3/1995
JP 09-010527 A 1/1997
JP 2009-263182 A 11/2009
JP 2016-519047 A 6/2016
JP 2016-519048 A 6/2016
JP 7060038 B2 4/2022
WO 97/30782 A1 8/1997
WO 2008/005291 A1 1/2008
WO 2014/189740 A1 11/2014
WO 2014/189741 A2 11/2014
WO 2014/189817 A1 11/2014
WO 2017/042611 A1 3/2017
WO 2017/210251 A1 12/2017
WO 2019/089735 A1 5/2019
WO 2022/026820 A1 2/2022
WO 2022/187436 A1 9/2022

OTHER PUBLICATIONS

Chinese Patent Application No. 202180042220.9, Office Action dated Jun. 21, 2023, 5 pages (English Translation only), Chinese Patent Office.
Yan et al., "Preparation of magnetic polymer composite hydrogel and its adsorption properties for copper ions in water", Journal of Environmental Science, vol. 3, 2017, 9 pages.

* cited by examiner 126
120
122
128

120
126
124
122
128

Example A1

Example A2

Example A8

Example A9

Example A10

Example A11

Example A12

Example A13

A8

RV1

RV2

HIGH FILTRATION EFFICIENCY PARTICULATE FILTERS HAVING BIMODAL PORE SIZE DISTRIBUTION MADE FROM BEADS WITH OPEN POROSITY

This is a national stage application under 35 U.S.C. § 371 of International Application No. PCT/US2021/043646, filed on Jul. 29, 2021, which claims the benefit of priority under 35 U.S.C. § 119 of U.S. Provisional Application Ser. No. 63/072,837 filed on Aug. 31, 2020, and U.S. Provisional Application Ser. No. 63/071,717 filed on Aug. 28, 2020 and U.S. Provisional Application Ser. No. 63/059,631 filed on Jul. 31, 2020, the content of which is relied upon and incorporated herein by reference in their entireties.

FIELD

This disclosure relates to ceramic articles, more particularly to particulate filters, including ceramic particulate filters comprising ceramic honeycomb bodies comprising an interconnected network of ceramic beads having open porosities, and more particularly to particulate filters having high filtration efficiencies resulting from a bimodal pore size distribution of the interconnected network of ceramic beads.

BACKGROUND

Honeycomb bodies are used in a variety of applications, such as particulate filters and catalytic converters that treat pollutants in combustion exhaust. The process of manufacturing honeycomb bodies can include extruding a batch material through a honeycomb extrusion die.

SUMMARY

Disclosed herein is a particulate filter comprising a ceramic honeycomb body comprising a plurality of intersecting walls, wherein the intersecting walls form a plurality of channels extending longitudinally though the ceramic honeycomb body from a first end face to a second end face; a first plurality of plugs in a first subset of the channels at the first end face; a second plurality of plugs in a second subset of the channels at the second end face, wherein the first subset of channels is different than the second subset of channels; wherein the intersecting walls comprise a porous ceramic material having a microstructure that comprises an interconnected network of porous spheroidal ceramic beads, wherein the microstructure has a total porosity defined as the sum of an open intrabead porosity of the beads and an interbead porosity defined by interstices between the beads in the interconnected network; and wherein the microstructure has a bimodal pore size distribution in which an intrabead median pore size of the intrabead porosity is from 1.5 μm to 4 μm and an interbead median pore size of the interbead porosity is from 6 μm to 20 μm.

In some embodiments, the open intrabead porosity is at least 8% relative to a total volume defined by the interconnected network.

In some embodiments, the open intrabead porosity is at least 9% relative to a total volume defined by the interconnected network.

In some embodiments, the open intrabead porosity is at least 10% relative to a total volume defined by the interconnected network.

In some embodiments, a surface area of the microstructure, as measured by BET, is at least 0.40 g/m2.

In some embodiments, a surface area of the microstructure, as measured by BET, is at least 0.50 g/m2.

In some embodiments, a surface area of the microstructure, as measured by BET, is at least 0.60 g/m2.

In some embodiments, the particulate filter has a clean filtration efficiency of at least 75% on a particle mass basis when normalized to a first standard geometry of 4.05" diameter, 5.47" length, 200 cpsi, 8 mil wall thickness, 6 mm plug depth, and skin thickness of 0.8 mm, or to a second standard geometry of 5.66" diameter, 6" length, 300 cpsi, 8 mil wall thickness, 6 mm plug depth, and 0.5 mm thick skin.

In some embodiments, the particulate filter has a clean filtration efficiency of at least 80% on a particle mass basis when normalized to a first standard geometry of 4.05" diameter, 5.47" length, 200 cpsi, 8 mil wall thickness, 6 mm plug depth, and skin thickness of 0.8 mm, or to a second standard geometry of 5.66" diameter, 6" length, 300 cpsi, 8 mil wall thickness, 6 mm plug depth, and 0.5 mm thick skin.

In some embodiments, the particulate filter has a clean filtration efficiency of at least 85% on a particle mass basis when normalized to a first standard geometry of 4.05" diameter, 5.47" length, 200 cpsi, 8 mil wall thickness, 6 mm plug depth, and skin thickness of 0.8 mm, or to a second standard geometry of 5.66" diameter, 6" length, 300 cpsi, 8 mil wall thickness, 6 mm plug depth, and 0.5 mm thick skin.

In some embodiments, the particulate filter further comprises a plurality of catalytically active particles deposited within the intrabead porosity of the beads and within the interbead porosity on outer surfaces of the beads.

In some embodiments, the open intrabead porosity is at least 9% relative to a volume of the beads and the total porosity is at least 50%.

In some embodiments, the ceramic beads comprise at least 80 wt % cordierite.

In some embodiments, crystalline phases of the porous ceramic material comprise at least 90 wt % cordierite.

In some embodiments, the porous ceramic beads comprise a closed bead porosity of less than 5%.

In some embodiments, the open intrabead porosity is at least 12% relative to a total volume defined by the interconnected network.

In some embodiments, the open intrabead porosity is at least 15% relative to a total volume defined by the interconnected network.

In some embodiments, an interbead half maximum pore size distribution peak breadth is at most 6 μm, as determined by mercury intrusion porosimetry.

In some embodiments, an interbead half maximum pore size distribution peak breadth is at most 5.5 μm, as determined by mercury intrusion porosimetry.

In some embodiments, an intrabead half maximum pore size distribution peak breadth is at most 2 μm, as determined by mercury intrusion porosimetry.

In some embodiments, an intrabead half maximum pore size distribution peak breadth is at most 1.5 μm, as determined by mercury intrusion porosimetry.

In some embodiments, the bimodal pore size distribution, when determined via mercury intrusion porosimetry, has a local minimum differential intrusion value at a pore size that is between the intrabead median pore size and the interbead median pore size, and wherein the local minimum differential intrusion value is less than 20% of a maximum differential intrusion value of the interbead peak.

In some embodiments, the bimodal pore size distribution, when determined via mercury intrusion porosimetry, has a local minimum differential intrusion value at a pore size that is between the intrabead median pore size and the interbead median pore size, and wherein the local minimum differential intrusion value is less than 15% of a maximum differential intrusion value of the interbead peak.

In some embodiments, the bimodal pore size distribution, when determined via mercury intrusion porosimetry, has a local minimum differential intrusion value at a pore size that is between the intrabead median pore size and the interbead median pore size, and wherein the local minimum differential intrusion value is less than a value of an intrabead half maximum pore size distribution peak breadth.

In some embodiments, a D10 value of the bimodal pore size distribution of the particulate filter is at most 3 μm, as determined by mercury intrusion porosimetry.

In some embodiments, a D10 value of the bimodal pore size distribution of the particulate filter is at most 2.5 μm, as determined by mercury intrusion porosimetry.

In some embodiments, a D10 value of the bimodal pore size distribution of the particulate filter is at most 2 μm, as determined by mercury intrusion porosimetry.

In some embodiments, a D75-D50 value of the bimodal pore size distribution of the particulate filter is at most 2 μm, as determined by mercury intrusion porosimetry.

In some embodiments, a D75-D50 value of the bimodal pore size distribution of the particulate filter is at most 1.5 μm, as determined by mercury intrusion porosimetry.

In some embodiments, a D50/D10 ratio of the bimodal pore size distribution of the particulate filter is at least 3, as determined by mercury intrusion porosimetry.

In some embodiments, a D50/D10 ratio of the bimodal pore size distribution of the particulate filter is at least 4, as determined by mercury intrusion porosimetry.

In some embodiments, a D50/D10 ratio of the bimodal pore size distribution of the particulate filter is at least 5, as determined by mercury intrusion porosimetry.

In some embodiments, the total porosity is at least 55%, and wherein, as determined by mercury intrusion porosimetry, the bimodal pore size distribution has a D10 value of at most 3 μm, a D50 value between 5 μm and 18 μm, and a D75-D50 value of at most 2 μm.

In some embodiments, the open intrabead porosity of the porous ceramic beads is on average at least 20% relative to a volume of the beads.

In some embodiments, the open intrabead porosity of the material of the beads is on average at least 25% relative to a volume of the beads.

In some embodiments, the open intrabead porosity of the material of the beads is on average at least 30% relative to a volume of the beads.

In some embodiments, the interbead median pore size is in a range from 8 μm to 18 μm.

In some embodiments, the beads have a median particle size in a range from 20 μm to 50 μm.

In some embodiments, a particulate filter comprises a ceramic honeycomb body comprising a plurality of intersecting walls, wherein the intersecting walls form a plurality of channels extending longitudinally though the ceramic honeycomb body from a first end face to a second end face, and wherein the intersecting walls have a thickness separating adjacent channels; a first plurality of plugs in a first subset of the channels at the first end face; a second plurality of plugs in a second subset of the channels at the second end face, wherein the first subset of channels and the second subset of channels are different; wherein the intersecting walls comprise porous ceramic material having a microstructure comprising an interconnected network of porous spheroidal ceramic beads, wherein the microstructure has a total open porosity defined as the sum of an open intrabead porosity of the beads and an interbead porosity defined by interstices between the beads in the interconnected network; wherein the microstructure has a bimodal pore size distribution having an intrabead peak corresponding to the open intrabead porosity and an interbead peak corresponding to the interbead porosity, in which an intrabead median pore size of the intrabead porosity is less than an interbead median pore size of the interbead porosity; wherein the microstructure each of a pore size distribution, a particle size distribution, and the microstructure is homogeneous across the thickness of the intersecting walls.

In some embodiments, the particulate filter has a clean filtration efficiency of at least 75% on a particle mass basis and at least 80% on a particle number basis.

In some embodiments, a method of manufacturing a particulate filter, comprises mixing together a batch mixture comprising a plurality of porous ceramic beads each comprising a porous ceramic material, wherein the porous ceramic material of the porous ceramic beads, shaping the batch mixture into a green honeycomb body; firing the green honeycomb body into a ceramic honeycomb body by sintering together the porous ceramic beads into an interconnected network of the porous ceramic beads, wherein the ceramic honeycomb body comprises a plurality of intersecting walls that define channels extending axially between opposite end faces of the ceramic honeycomb body, wherein a microstructure of the intersecting walls comprises the interconnected network of the porous ceramic beads; and alternatingly plugging at least some of the channels at the opposite end faces of the ceramic honeycomb body to form the particulate filter; wherein the microstructure has a total porosity defined as the sum of an open intrabead porosity of the beads and an interbead porosity defined by interstices between the beads in the interconnected network; and wherein the microstructure has a bimodal pore size distribution in which an intrabead median pore size of the intrabead porosity is from 1.5 μm to 4 μm and an interbead median pore size of the interbead porosity is from 6 μm to 20 μm.

In some embodiments, the open intrabead porosity is at least 8% relative to a total volume defined by the interconnected network.

In some embodiments, the open intrabead porosity is at least 9% relative to a total volume defined by the interconnected network.

In some embodiments, the open intrabead porosity is at least 10% relative to a total volume defined by the interconnected network.

In some embodiments, a surface area of the microstructure, as measured by BET, is at least 0.40 g/m2.

In some embodiments, a surface area of the microstructure, as measured by BET, is at least 0.50 g/m2.

In some embodiments, a surface area of the microstructure, as measured by BET, is at least 0.60 g/m2.

In some embodiments, the particulate filter has a clean filtration efficiency of at least 75% on a particle mass basis when normalized to a first standard geometry of 4.05" diameter, 5.47" length, 200 cpsi, 8 mil wall thickness, 6 mm plug depth, and skin thickness of 0.8 mm, or to a second standard geometry of 5.66" diameter, 6" length, 300 cpsi, 8 mil wall thickness, 6 mm plug depth, and 0.5 mm thick skin.

In some embodiments, the particulate filter has a clean filtration efficiency of at least 80% on a particle mass basis when normalized to a first standard geometry of 4.05" diameter, 5.47" length, 200 cpsi, 8 mil wall thickness, 6 mm plug depth, and skin thickness of 0.8 mm, or to a second standard geometry of 5.66" diameter, 6" length, 300 cpsi, 8 mil wall thickness, 6 mm plug depth, and 0.5 mm thick skin.

In some embodiments, the particulate filter has a clean filtration efficiency of at least 85% on a particle mass basis when normalized to a first standard geometry of 4.05" diameter, 5.47" length, 200 cpsi, 8 mil wall thickness, 6 mm plug depth, and skin thickness of 0.8 mm, or to a second standard geometry of 5.66" diameter, 6" length, 300 cpsi, 8 mil wall thickness, 6 mm plug depth, and 0.5 mm thick skin.

In some embodiments, prior to forming the batch mixture, the method further comprises:

forming a slurry mixture comprising a mixture of ceramic precursor materials;

spheroidizing the slurry mixture into spheroidal green agglomerates; and firing the green agglomerates to form the porous ceramic beads by converting the ceramic precursor materials into the porous ceramic material.

In some embodiments, the method further comprises sieving the green agglomerates or sieving the porous ceramic beads to affect a median particle size of the porous ceramic beads prior to mixing together the batch mixture.

In some embodiments, spheroidizing the slurry mixture comprises a spraydrying process.

In some embodiments, spheroidizing the slurry mixture comprises a rotary evaporation process.

In some embodiments, the ceramic precursor materials comprise a silica source, an alumina source, and a magnesia source and the porous ceramic material of the porous ceramic beads comprises cordierite.

In some embodiments, the batch mixture further comprises an organic binder and an inorganic binder.

In some embodiments, the batch mixture comprises the porous ceramic beads in an amount ranging from 60 wt % to 95 wt %, relative to a total weight of the inorganic binder and the porous ceramic beads.

In some embodiments, the inorganic binder comprises a plurality of shear binder agglomerates, wherein the shear binder agglomerates comprise a green mixture of one or more inorganic ceramic precursor materials and a binder.

It is to be understood that both the foregoing general description and the following detailed description are merely exemplary and are intended to provide an overview or framework to understanding the nature and character of the claimed subject matter. The accompanying drawings are included to provide a further understanding and are incorporated in and constitute a part of this specification. The drawings illustrate one or more embodiment(s), and, together with the description, serve to explain principles and operation of the various embodiments.

DETAILED DESCRIPTION

Figure 1:
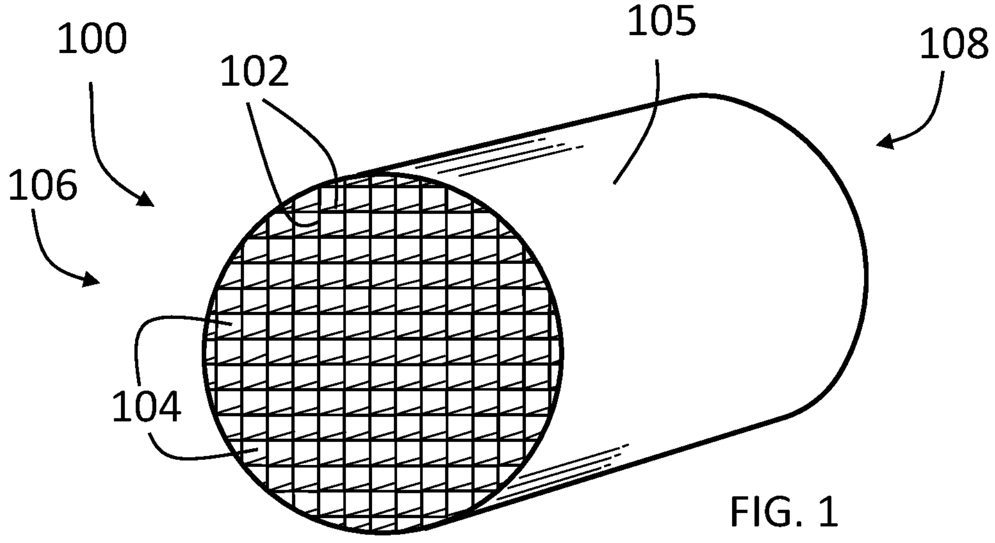
FIG. 1 schematically illustrates a honeycomb body according to one embodiment disclosed herein.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. Numerical values, including endpoints of ranges, can be expressed herein as approximations preceded by the term "about," "approximately," or the like. In such cases, other embodiments include the particular numerical values.

In various embodiments, porous ceramic spheroidal particles, ceramic articles comprising such porous ceramic particles, and methods for making such porous ceramic particles and for making such ceramic articles are disclosed. In some embodiments, the ceramic articles comprise porous ceramic honeycomb bodies. In some embodiments, select channels of the honeycomb bodies are plugged to arrange the honeycomb bodies as particulate or wall-flow filters. For convenience of discussion, the porous ceramic spheroidal particles may be referred to herein as "porous ceramic beads", "ceramic beads" or simply "beads". Thus, the ceramic beads referred to herein are spheroidal ceramic particles comprising a porous ceramic material that comprises one or more ceramic phases, such as cordierite.

As described herein, ceramic articles, such as ceramic honeycomb bodies, are formed by shaping and firing batch mixtures comprising porous ceramic beads. As a result, the material of the ceramic article, e.g., the porous ceramic walls of a honeycomb body, is formed as an interconnected network of the porous ceramic beads. In this way, the microstructure of the ceramic material exhibits a unique bimodal porosity set by a first porosity of the beads themselves ("intrabead porosity") and by a second porosity of interstices in the interconnected network formed by the beads ("interbead porosity"). That is, the microstructure of the porous ceramic material as described herein has an "intrabead" porosity defined by an open pore structure of the material of each individual bead, and an "interbead" porosity defined by interstices between beads in the interconnected network of beads. Correspondingly, the intrabead porosity, formed within the material of the beads themselves, necessarily has an intrabead median pore size that is smaller than the median particle size of the beads, while the interbead porosity, formed in the spaces between beads, has a relatively larger interbead median pore size (e.g., multiple times larger than the intrabead median pore size), which can approach the median particle size of the beads. That is, the interbead porosity is at least partially dependent on the packing of the beads in the interconnected network, and the packing is in turn at least partially determined by the size of the beads.

Advantageously, by providing the intrabead porosity as an open porosity in combination with the relatively larger pore sizes of the interbead porosity, the resulting bimodal porosity of the microstructure of the ceramic article described herein exhibit unique performance characteristics, such as when arranged as a honeycomb body of a particulate filter or catalyst substrate useful in the treatment, reduction, or abatement of one or more substances (e.g., pollutants) from a fluid stream (e.g., engine exhaust). For example, in some embodiments, the bimodal porosity enables honeycomb bodies to be arranged as particulate filters having high filtration efficiency (FE) even when clean (before ash/soot build up), and which maintain low pressure drop at all levels of ash/soot loading. That is, the open intrabead porosity provides high surface area to provide anchor sites for ash, soot, or other particulate and the relatively smaller pore sizes of the intrabead pore size distribution facilitates capillary action to assist in trapping ash, soot, or other particles at the anchor sites, while the relatively larger pore sizes of the interbead pore size distribution provide relatively large flow passages that maintain low pressure drop even at high particulate loading.

In some embodiments, the aforementioned bimodal porosity enables a high catalyst material loading to be employed without a significant tradeoff in pressure drop, particularly for a catalyst-loaded particulate filter. That is, the high open porosity offered by the combination of interbead and intrabead porosities provides a high pore volume into which the catalyst material can be loaded and/or a large pore surface area to which the catalyst can be bonded, all while preserving a high interconnectivity of the interbead pore channels. In addition, the relatively smaller pore sizes of the intrabead pore size distribution relative to the interbead pore size distribution facilitates capillary action to assist in drawing the catalyst material onto and/or into the beads, while the relatively larger pore sizes of the interbead pore size distribution provide relatively large flow passages that maintain low pressure drop.

Referring now to FIG. 1, a ceramic article is illustrated in the form of a honeycomb body 100, comprising intersecting walls 102 that form a plurality of channels 104. As described herein, the walls 102 comprise a porous ceramic material. The walls 102 and channels 104 in this way form a honeycomb structure that is encased by a skin or outer peripheral surface 105. The channels 104 extend in direction of the axis through the honeycomb body 100, e.g., parallel to one another, from a first end face 106 to a second end face 108. As described herein, the honeycomb body 100 can be utilized in a variety of applications, such as for use in a catalytic converter (e.g., the walls 102 acting as a substrate for catalytic material) and/or as a particulate filter (e.g., in which some of the channels 104 are plugged to trap particulate within the honeycomb walls 108). Such honeycomb bodies 100 can thus assist in the treatment or abatement of pollutants from a fluid stream, such as the removal of undesired components from the exhaust stream of a combustion engine of a vehicle. For example, the porous material of the walls 102 can be loaded with a catalytic material such as a three-way catalyst to treat one or more compounds in a fluid flow (e.g., engine exhaust) through the channels 104 of the honeycomb body 100.

Figure 2:
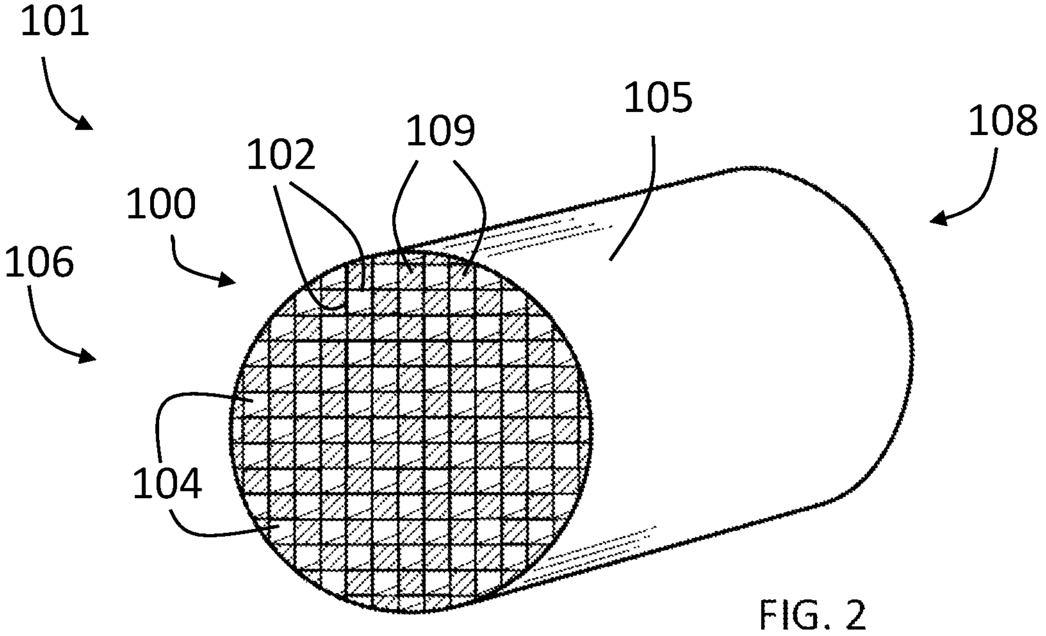
FIG. 2 illustrates a plugged honeycomb body according to one embodiment disclosed herein.
Figure 3:
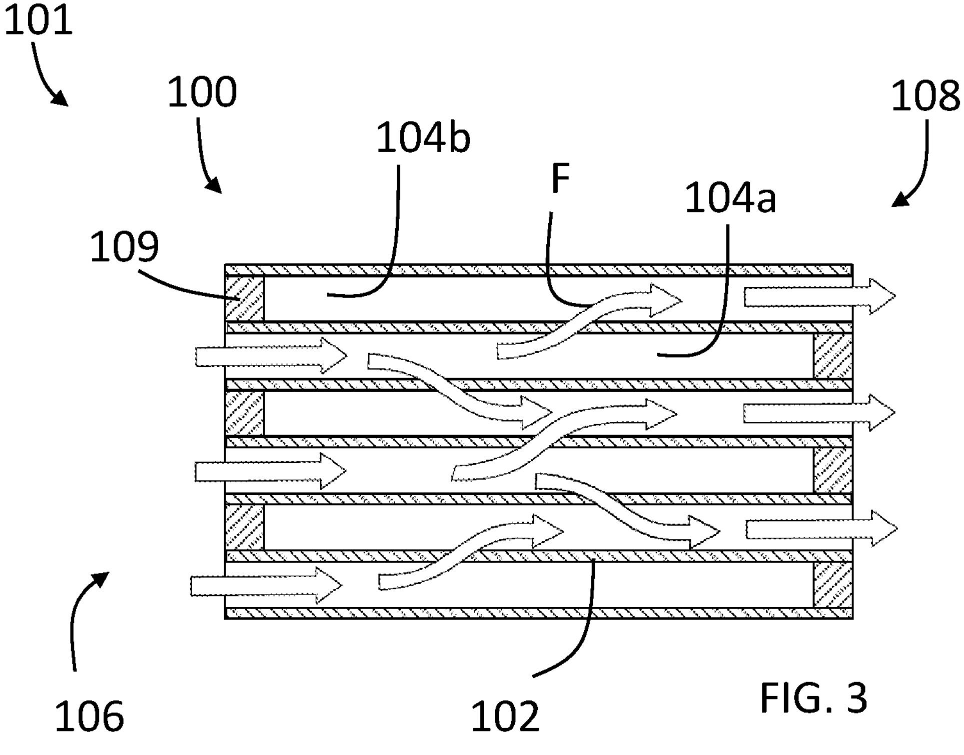
FIG. 3 schematically illustrates through-wall gas flow in a plugged honeycomb body according to one embodiment disclosed herein.

As shown in FIGS. 2-3, some of the channels 104 of the honeycomb body 100 can be plugged with plugs 109 in order to form a plugged honeycomb body 101. As a result of the plugging the channels are separated into "inlet channels" that are open at the inlet face (e.g., the first end face 106) and "outlet channels" that are open at the opposite outlet face (e.g., the second end face 108). For ease of discussion herein, the inlet channels are designated with reference numeral 104*a* and the outlet channels are designated with reference numeral 104*b*, with general reference to "the channels 104" including all channels regardless of whether they are inlet or outlet channels.

The plugged honeycomb body 101 can form part of, or alternatively be referred to, or considered as, a particulate filter or wall-flow filter (these terms being generally interchangeable). Plugging with plugs 109 can be performed using any suitable plugging process (e.g., patty plugging, slurry plugging, etc.) and plugging material (e.g., a cold set plugging cement). In some embodiments, some of the channels 104 are plugged at the first end 106, while some of the channels 104 not plugged at the first end 106 are plugged at the second end 108. Any suitable plugging pattern can be used. For example, alternating ones of the channels 104 can be plugged at the opposite ends 106, 108.

As shown in FIG. 3, alternatively plugging the channels 104 at opposite ends enables a fluid flow stream F (e.g., engine exhaust) to enter into the inlet channels 104*a* of the plugged honeycomb body 101 that are opened at the inlet side (e.g., the end face 106 in FIG. 3), then be directed through the porous material of the walls 102 to adjacent outlet channels 104*b* that are open at an outlet end (e.g., the end face 108 in FIG. 3). At least some particulate matter in the flow stream F will be prevented from flowing through the porous material of the walls 102 (e.g., those particles that become trapped in the pore structures of the walls 102), thereby treating the flow stream F as it exits the plugged honeycomb body 101.

Figure 4:
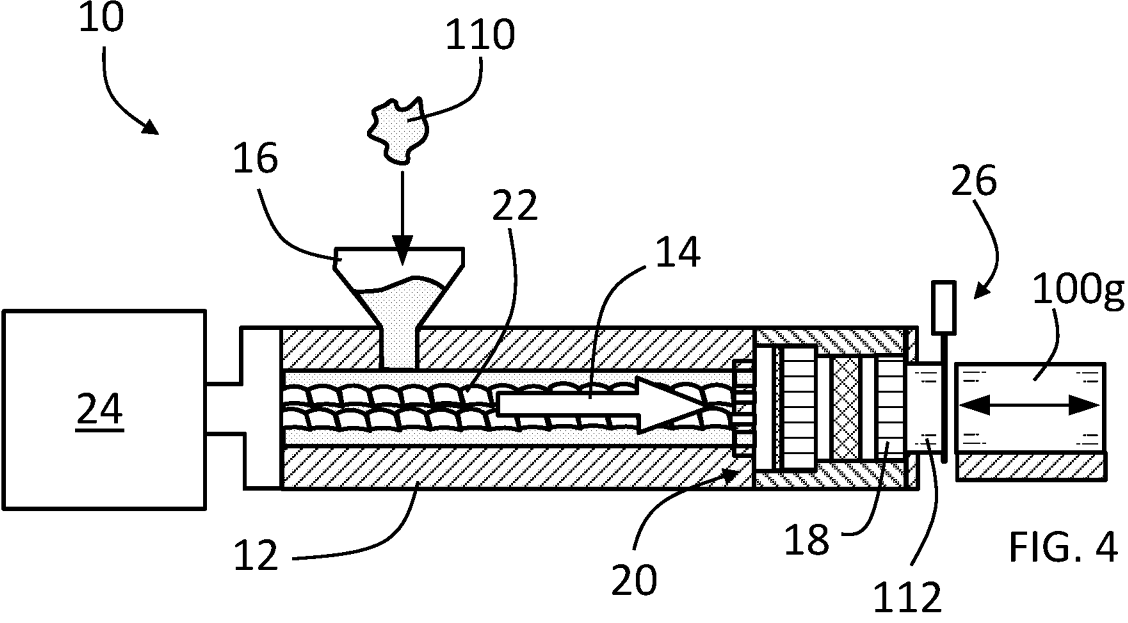
FIG. 4 schematically illustrates an extrusion system for forming green honeycomb bodies according to one embodiment disclosed herein.

The honeycomb body 100 can be formed in any suitable manner. For example, an extruding system (or extruder) 10 capable of at least partially forming the honeycomb body 100 is illustrated in FIG. 4. The extruder 10 comprises a barrel 12 extending in direction 14 (e.g., the direction of extrusion). At an upstream side of the barrel 12, a material supply port 16, e.g., which can comprise a hopper or other material supply structure, can be provided to supply a ceramic-forming mixture 110 (alternatively referred to as a batch mixture) into the extruder 10.

An extrusion die 18 is coupled at a downstream side of the barrel 12 to shape the batch mixture 110 into a desired shape that is extruded from the extruder 10 as an extrudate 112. For example, the extrusion die 18 can be a honeycomb extrusion die for producing the extrudate 112 as green honeycomb extrudate. The extrusion die 18 can be coupled to the barrel 12 by any suitable means, such as bolting, clamping, or the like. The extrusion die 18 can be preceded by other extruder structures in an extrusion assembly 20, such as a particle screen, screen support, a homogenizer, or the like to facilitate the formation of suitable flow characteristics, e.g., a steady plug-type flow front as the batch mixture 110 reaches the extrusion die 18.

The extruder 10 can be any type of extruder, such as a twin-screw or a hydraulic ram extruder, among others. In FIG. 4, the extruder 10 is illustrated as a twin-screw extruder comprising a pair of extruder screws 22 that are mounted in the barrel 12. A driving mechanism 24, e.g., located outside of the barrel 12, can be included to actuate the extrusion element(s), such as the ram of a ram extruder or the screws 22 in the embodiment of FIG. 4. The extrusion element of the extruder 10, e.g., the pair of extruder screws 22, ram, etc., can operate to move the batch mixture 110 through the barrel 12 with pumping and mixing action in the longitudinal direction 14, which also corresponds to the extrusion direction.

The extruder 10 further comprises a cutting apparatus 26. For example, the cutting apparatus 26 is configured to cut a green honeycomb body 100G from the extrudate 112. The green honeycomb body 100G generally resembles the honeycomb body 100, i.e., comprising a honeycomb structure of intersecting walls and channels, since the final ceramic honeycomb body 100 is made by further processing of the green body 100G. That is, after extrusion and cutting, the green body 100G can be further cut or ground to a desired axial length, dried, and fired, among other manufacturing steps, to produce the final ceramic honeycomb body. The green body 100G can be extruded with a skin (i.e., forming the skin 105) or the skin can be added in a subsequent manufacturing step.

The ceramic-forming mixture 110 can be introduced to the extruder 10 continuously or intermittently. The ceramic-forming mixture 110 comprises porous ceramic beads according to the various embodiments disclosed herein. The ceramic-forming mixture can further comprise one or more additional inorganic materials (e.g., alumina, silica, talc, clay or other ceramic materials, ceramic precursor materials or green agglomerated ceramic precursor powders), binders (e.g., organic binders such as methylcellulose), pore formers (e.g., starch, graphite, resins), a liquid vehicle (e.g., water), sintering aids, lubricants, or any other additives helpful in the creation, shaping, processing, and/or properties of the extrudate 112, the green honeycomb body 100G, and/or the ceramic honeycomb body 100.

According to embodiments described herein, the ceramic-forming mixture 110 comprises a plurality of porous ceramic beads, which ultimately form the porous ceramic material of the walls 102 of the honeycomb body 100. For example, as shown schematically in FIG. 5A and as a polished scanning electron microscope (SEM) cross-sectional view in FIG. 5B, the walls 102 have a microstructure that comprises an interconnected network 120 of porous ceramic beads 122. That is, a plurality of the beads 122 are bonded together into a continuous network, such as by sintering and/or reaction of ceramic and/or ceramic-forming materials during firing of the green body 100G. For example, the beads 122 can be directly sintered together and/or indirectly bonded together (e.g., via sintering and/or reaction of one or more other inorganic materials in the mixture 110). The extrusion die 18 or other shaping mechanism can be utilized to arrange the interconnected network 120 of the beads 122 to define the shape and/or dimensions of the honeycomb body 100, such as a wall thickness t of the wall 102 shown in FIGS. 5A-5B. A total volume of the wall 102 and/or of the interconnected network 120 can thus be defined by the wall thickness t, multiplied by the other cardinal dimensions of the wall 102 and/or the network 120 generally delineated by the outer bounds of the beads 122.

As described in more detail herein, the porous ceramic beads 122 may be referred to as or considered as "pre-reacted" beads since they already comprise one or more selected ceramic phases when incorporated in the batch mixture 110 (i.e., and thus, these ceramic phases are already present in the green body 100G before firing of the honeycomb body 100). The beads 122 can be fully reacted, such that continued firing does not result in a greater amount of the ceramic phase(s), or at least partially reacted so that one or more ceramic phases exist, but will continue to react when the beads 122 are subjected to further firing. In either event, the "pre-reacted" nature of the beads 122 can be used to preserve the spheroidal shape of the beads during the various manufacturing steps (e.g., batch paste mixing, extrusion, cutting, drying, and firing). For example, a partially or fully reacted ceramic have higher strength than unreacted agglomerates so that crushing of the beads 122 during processes such as extrusion is prevented. As another example, the ceramic beads 122, already having one or more reacted phases, more readily undergo continuation of reaction or sintering within each individual bead, as opposed to reaction with unreacted ceramic precursor materials in the other beads. For example, reaction of components from different beads may be limited as there are no material diffusion paths between beads that are not in contact with each other, and only limited diffusion paths for beads in point to point contact. In contrast, if a significant degree of matter transport between reactive components were enabled, e.g., at high temperature due to the presence of high quantities of glass or liquid, then the material would not have this confinement, which would promote the growth of large unstructured agglomerates or large elongated crystals, instead of maintaining the spheroidal bead shapes. By preserving the spheroidal shape of the beads 122, the aforementioned interconnected network 120 of the beads 122 can be created for the ceramic honeycomb body 100.

Figure 5A:
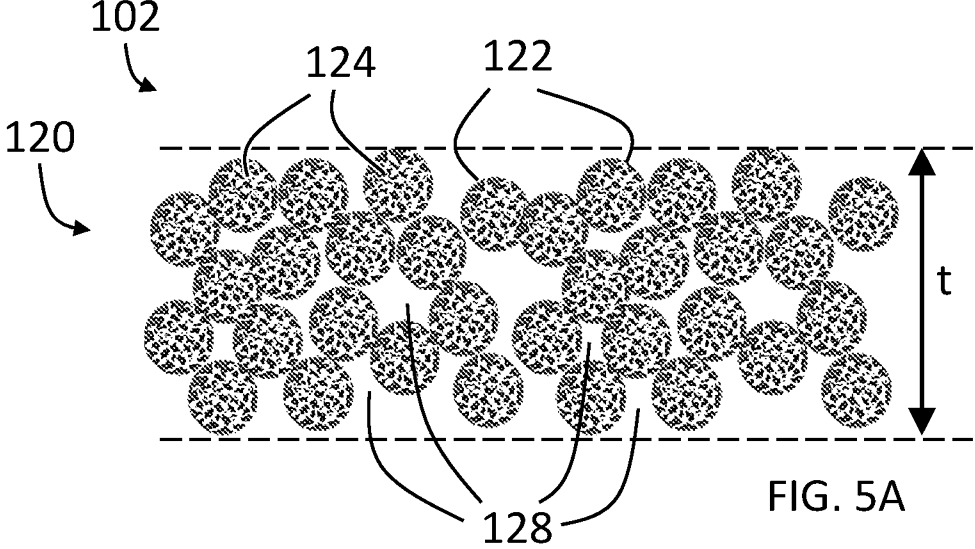
FIG. 5A schematically illustrates a portion of a wall of a ceramic honeycomb body comprising a network of spheroidal ceramic beads according to one embodiment disclosed herein.
Figure 5B:
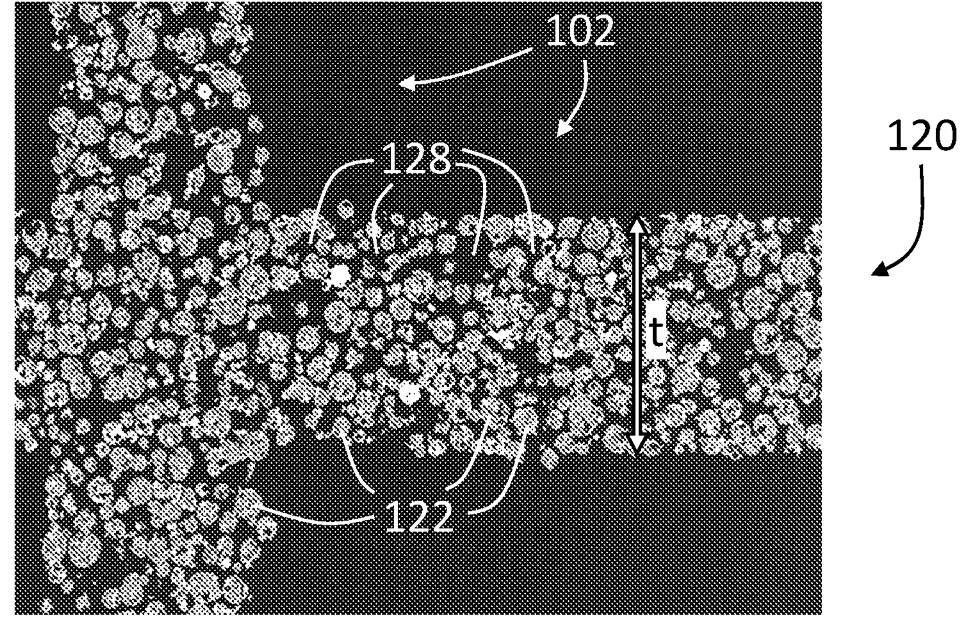
FIG. 5B shows a cross-sectional scanning electron microscope (SEM) image of a portion of intersecting walls of a ceramic honeycomb body according to one embodiment disclosed herein.
Figures 6, 7:
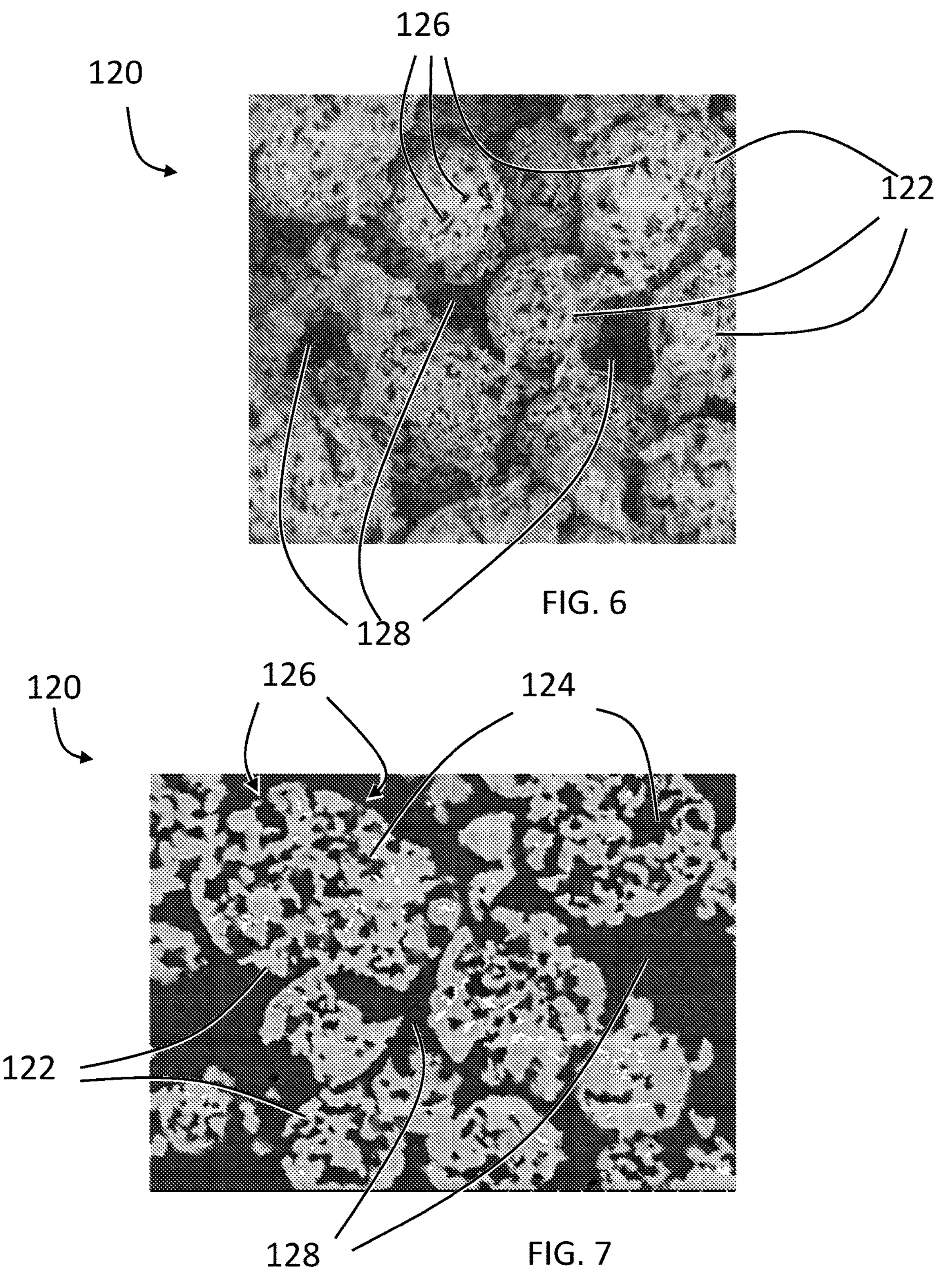
FIG. 6 shows a magnified view of a network of spheroidal ceramic beads according to one embodiment disclosed herein.
FIG. 7 shows a cross-sectional SEM image of a portion of a network of spheroidal ceramic beads according to one embodiment disclosed herein.

FIGS. 6 and 7 show a photograph and a polished SEM cross sectional view, respectively, of portions of interconnected networks 120 of the beads 122 according to some embodiments. Referring to FIGS. 5A-7, it can be seen that the porous ceramic beads 122 comprise an interconnected open pore structure 124, extending throughout each of the beads 122. The open pore structure 124 can comprise relatively elongated pore structures, e.g., channels, and relatively widened pore structures, e.g., pore voids or pore bodies, with the channels acting as pore necks or throats into the voids or bodies. The pore structure 124 is considered "open" since the pores within the beads 122 are in fluid communication with the exterior of the beads 122. For example, as shown in FIGS. 6 and 7, the pore structures 124 comprise openings 126 in the outer surfaces of the beads 122 that provide fluid communication between the interiors and exteriors of the beads 122. The pore structures 124 may also be considered "interconnected" as the pores throughout the beads 122 form a network that is in fluid communication with each other (e.g., directly and/or via mutual openness to the exterior of the beads 122). Thus, the open pore structures 124 described herein facilitate flow into, through, and out of the beads 122. According to some embodiments, at least 80%, or even at least 90% of the porosity of the beads 122 (with respect to a total volume of the beads 122) is an open porosity (as opposed to a closed porosity, which would not be in fluid communication with the exterior of the beads).

Referring again to FIGS. 5A-7, formation of the interconnected network 120 of beads 122 results in interstices 128 (which may be alternatively referred to as spaces or gaps) formed between neighboring ones of the beads 122. Thus, in three-dimensional space, the interstices 128 form an open and interconnected pore structure that is intertwined with, between and/or about the interconnected network 120 of the beads 122. Advantageously, and as discussed in more detail herein, the openness and interconnectedness of the open pore structures 124 of the beads 122 and the interstices 128 between the beads can be used to provide various characteristics and/or benefits for the honeycomb body 100, such as microstructure for the material of the walls 102 that has a unique bimodal open porosity.

The microstructure of the material of the walls 102 (formed by the interconnected network 120 of the porous ceramic beads 122) has a total porosity (that is, relative to a total volume of the microstructure/walls) that comprises an intrabead porosity defined by the porosity of the porous structure 124 of the beads 122, and an interbead porosity, defined by the interstices 128 in the interconnected network 120 between the beads 122. Correspondingly, the intrabead porosity, formed within the material of the beads, has an intrabead median pore size that is a fraction of the median particle size of the beads, while the interbead porosity, formed in the spaces between beads, has a relatively larger interbead median pore size (e.g., multiple times larger than the intrabead median pore size), which can approach the median particle size of the beads. Thus, the aforementioned bimodal porosity has both intrabead and interbead pore size distributions, which differ from each other in that the pore sizes of the intrabead porosity are, on average, smaller than the pore sizes of the interbead pore sizes. In other words, an intrabead median pore size of the intrabead pore size distribution is less than an interbead median pore size of the interbead pore size distribution.

The beads 122, formed as spheroidal ceramic particles, can have one or more shapes such as spheres, ellipsoids, oblate spheroids, prolate spheroids, or toroids. The beads can be formed as ceramic particles by firing green agglomerates of ceramic-forming raw materials under conditions (e.g., time and temperature) suitable to cause reaction of the ceramic-forming mixtures into one or more ceramic phases and/or sintering of ceramic grains together. For example, cordierite may form at firing temperatures between about 1200° C. to about 1420° C. In some embodiments firing of green agglomerates can range from about half an hour to about 6-8 hours at the selected firing temperature, with greater degrees of reaction (and thus higher percentages of ceramic phase(s) formed) at longer durations and higher temperatures.

In some embodiments, the median particle size or diameter of the beads (alternatively, median bead size or diameter) is at least 25 μm, such as at least 30 μm. In some embodiments, the median particle size of the beads is at most about 55 μm, such as 50 μm, or 45 μm. In some embodiments, the median particle size of the beads ranges from about 25 μm to 55 μm, such as from 30 μm to 55 μm, from 30 μm to 50 μm, from 30 μm to 45 μm, or from 30 μm to 40 μm. In some embodiments, beads having a median particle size of 25 μm are used in combination with beads having a median particle size larger than 25 μm, such as a first type of bead having a median particle size in the range from 15 μm to 20 μm used in combination with a second type of bead having a median particle size in the range from 30 μm to 50 μm.

Figures 8, 9A, 9B, 9C:
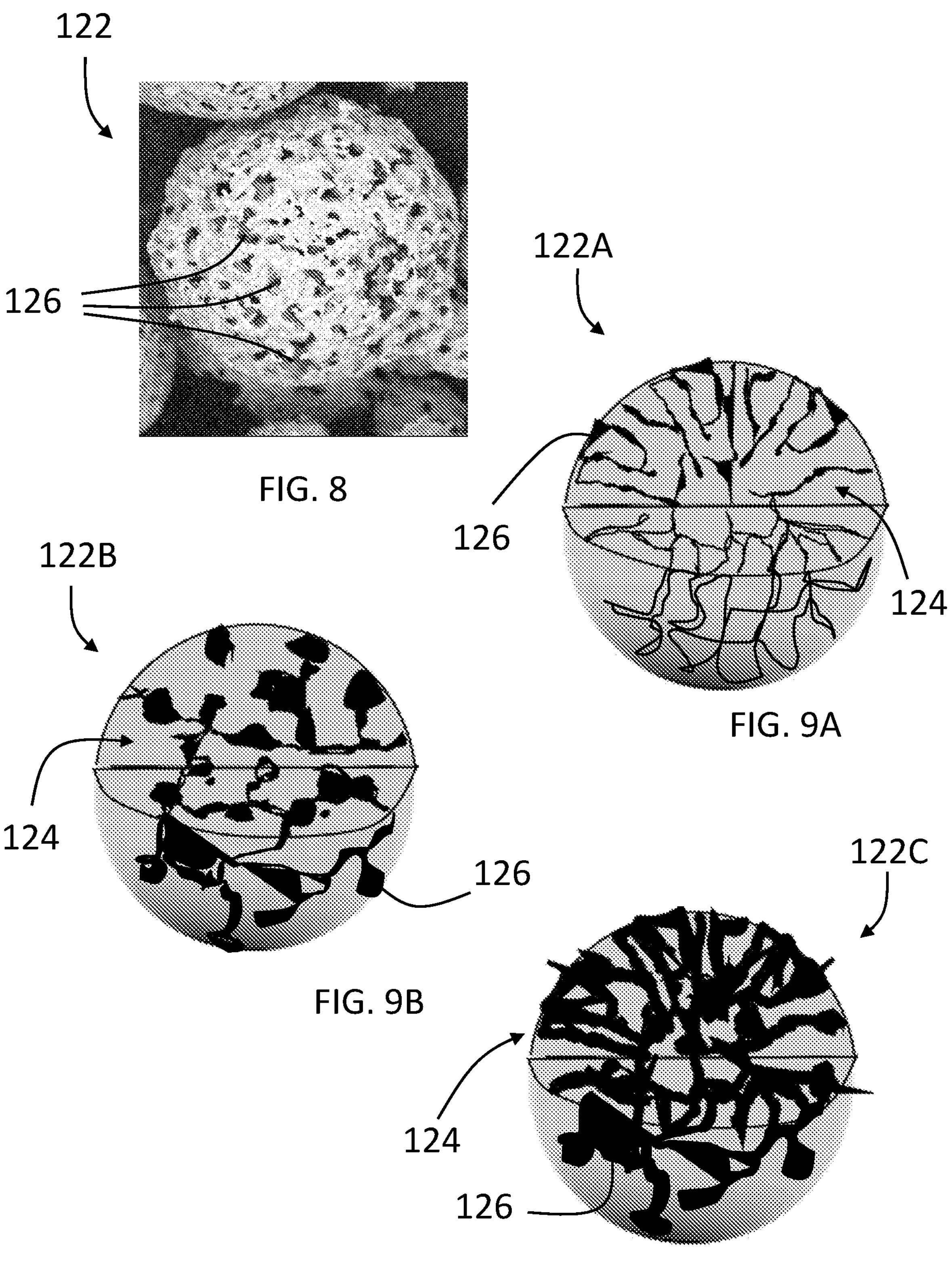
FIG. 8 shows a spheroidal ceramic bead according to one embodiment disclosed herein.
FIGS. 9A-9C schematically illustrate a first ceramic bead having a high open porosity formed by interconnected narrow pore channels, a second ceramic bead having a high open porosity formed by thin pore channels connected between relatively wide pore voids, and a third ceramic bead having a high open porosity formed by relatively wide interconnected pore channels and relatively wide pore voids.

An SEM image of an example of a representative one of the beads 122 is shown in FIG. 8. Various embodiments for the beads 122 are schematically illustrated in FIGS. 9A-9C, respectively identified as beads 122A-122C, in which the beads 122 are illustrated in partial cutaway to show both a portion of the exterior and of the interior of each bead. In particular, bead 122A has an open pore structure that comprises an interconnected plurality of relatively narrow pore channels extending throughout the bead 122A. The bead 122B comprises an open pore structure that comprises an interconnected plurality of relatively narrow pore channels interspaced with pore voids or bodies of relatively larger diameter. The bead 122C comprises an open pore structure that comprises an interconnected plurality of relatively broad pore channels interspaced with and connected between pore voids or bodies of relatively larger diameter. For example, the inclusion of relatively narrower pores (e.g., the channels of beads 122A and/or 122B) can be useful for increasing the pore surface area for any given porosity value, while relatively wider pores (e.g., the voids in beads 122B and/122C) can be useful for achieving increasingly larger porosities for the beads 122. As described herein, relatively wider (larger) pores can be particularly advantageous for hosting catalyst particles and/or storing ash, while increased pore surface area can be beneficial for providing anchor sites for ash or catalyst particle.

The beads 122 can be formed by preparing a batch mixture of ceramic-forming materials (e.g., ceramic and/or ceramic precursor materials), spheroidizing the batch mixture into green agglomerates, and then firing the green agglomerates to sinter and/or react the ceramic-forming materials into one or more selected ceramic phases, e.g., cordierite. For convenience of discussion herein (e.g., so as not to confuse with the batch mixture 110 utilized to form the honeycomb body 100), the batch mixture utilized to form the green agglomerates that are fired into the beads 122 may be referred to as a precursor slurry mixture or simply slurry mixture.

Figure 10:
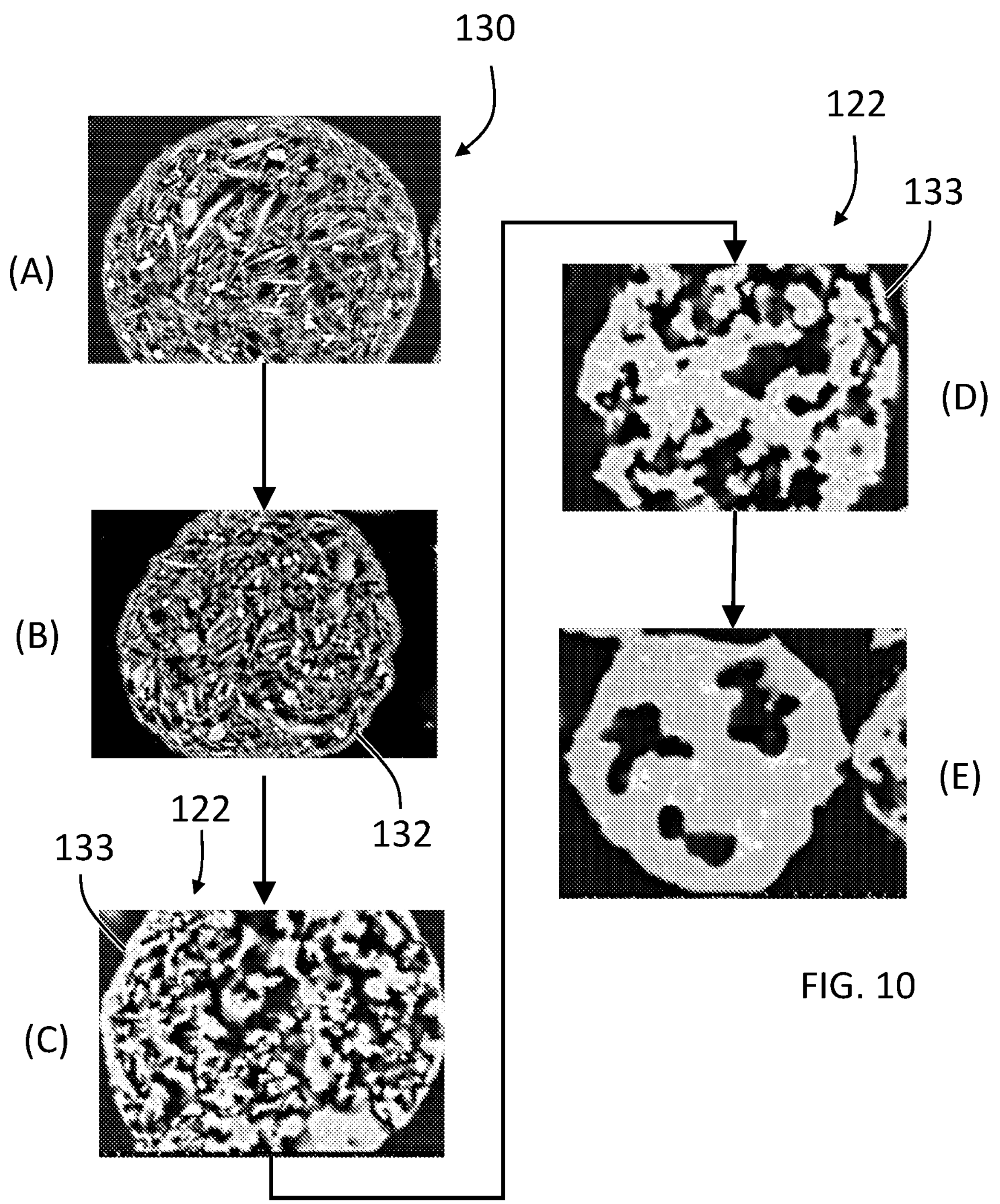
FIG. 10 illustrates various stages for making spheroidal ceramic beads according to one embodiment disclosed herein.

FIG. 10 illustrates representative stages (A)-(E) that can occur during manufacture of the beads 122 from green agglomerates according to some embodiments. The green agglomerates, e.g., arranged as a powder of spheroidal particles of agglomerated slurry mixture ingredients, can be fired to partial or full reaction to preserve the spheroidal shape of the green agglomerates for the ceramic beads 122 the result from firing. Firing may result in the green agglomerates undergoing a number of reactions, starting with the binder, dispersant, and other organic material burn out, water loss of the inorganic materials, and decomposition of any carbonates under release of $CO_2$. Finally, depending on the particular ceramic precursors present, the onset of solid state reactions may begin at temperatures of between about 1000° C. and 1200° C.

In stage (A) of FIG. 10, a green agglomerate 130 is formed as a spheroidal particle comprising ceramic-forming materials. The green agglomerates 130 can be formed from an agglomerate slurry mixture that comprises inorganic ceramic-forming materials (e.g., ceramic and/or ceramic precursor materials), such as talc, clay, alumina, boehemite, silica, magnesia (e.g., $Mg(OH)_2$ or MgO), spinel, etc., that will form the one or more ceramic phases of the ceramic beads 122 during firing, one or more binders (e.g., styrene acrylic polymer or other polymer) for temporarily holding the shape of the green agglomerates 130 before firing, pore formers (e.g., resin, starch, graphite) to add additional porosity to the beads 122 if desired, dispersant to maintain loose particle packing, and any other additives (e.g., surfactants or antifoaming agents) to facilitate agglomerate formation or ceramic sintering and/or reaction, and a liquid vehicle (e.g., water). As described in more detail herein, inorganic raw materials used for making 15-50 μm sized green agglomerates, which can be fired to form cordierite beads of similar size, can have raw material median particle sizes in the range of about 3-5 μm or smaller, with d90 values of the raw material ingredients typically less than 7 μm, which particle sizes assist in achieving high open porosities and other properties disclosed herein.

The green agglomerates 130 can be made by a spheroidizing process, such as spraydrying or rotary evaporation. For example, wet droplets dry in the spraydryer and/or during mixing and transform (e.g., shrink and/or condense) under water loss into the green agglomerate 130. Spraydrying and rotary evaporation can thus be used to efficiently produce a powder of dried green agglomerates 130. The drying can occur quickly under high air flow at elevated temperature. The spheroidal shape of the green agglomerate 130 (e.g., that exits the spraydryer nozzle and/or is formed by rotary evaporation) can exhibit high solid loading and a low density of raw material particle packing, particularly of platy raw material particles such as talc. In some embodiments, the solid loading is between about 10% and 30% by volume. The binder in the agglomerate slurry mixture assists in holding together the green agglomerates 130 so that the loose particle packing can be preserved.

The spheroidized green agglomerates 130 are then fired, i.e., subjected to a temperature for a duration sufficient to cause transformation of the ceramic-forming mixture into the porous spheroidal ceramic beads 122. To this end, stages (B)-(E) of FIG. 10 show the green agglomerates 130 after being fired for increasing amounts of time. Stage (B) shows an early firing stage in which binder materials are burned out and any remaining water is removed (including from hydrated materials), but at which chemical reactions between ceramic-forming precursor materials are not yet occurring.

As described in more detail herein, the removal of the liquid vehicle can cause a migration of the fine solid particles (e.g., less than 2 μm) toward the outer surface of the agglomerate as the liquid vehicle is wicked to the outer surface and evaporated. This may result in the formation of a green shell 132 of particles at the outer surface of the agglomerate. The thickness of the green shell 132 can be altered based on the raw materials in the agglomerate slurry. For example, silica soot, colloidal silica, and other fine oxide particles (e.g., median particle size less than μμm) may in particular contribute to the formation of the green shell 132 and increase the thickness of the green shell 132.

At stage (C) of FIG. 10, some solid state reactions have occurred between the different ceramic-forming precursor materials. At this stage, formation of one or more ceramic phases may have begun, and thus, the green agglomerate 130 has begun to transform into the ceramic bead 122. At this stage, reaction is limited to the contact points between adjacent precursor particles, so the ceramic precursors have not fully reacted to their corresponding ceramic phases. Further reaction of the ceramic precursors to achieve a greater amount of the selected ceramic phase is desirable in some embodiments to more fully establish the corresponding physical properties (e.g., strength) of the ceramic beads 122. However, as discussed in more detail below, at this stage, the particles forming the green shell 132 has begun reacting into a ceramic shell 133 that assists in stabilizing and strengthening the beads 122.

At stage (D), reaction of the ceramic precursor materials spreads from the initial contact points through the ceramic precursor particles. Accordingly, at stage (D), the one or more ceramic phases are fully or mostly formed and the physical properties of the beads 122 are largely established, e.g., thereby providing strength and toughness to prevent the beads 122 from being crushed during subsequent mixing and extrusion processes. At stage (D), the ceramic bead 122 also exhibits the open pore structure 124.

Without wishing to be bound by theory, it is believed that shrinkage of the bead 122 due to reaction of the ceramic precursors is limited at this stage, since the ceramic shell 133 assists in stabilizing and preserving the spheroidal shape as the green agglomerates 130 transition into the ceramic beads 122 during firing. However, if the green shell 132 is too thick, the resulting ceramic shell 133 may sinter together with few, or without any, of the openings 126, thereby inhibiting the formation of open pore channels to the exterior surface and resulting in hollow ceramic spheroidal particles. Accordingly, the ingredients of the agglomerate slurry mixture can be selected to provide a sufficient amount of fine particles that create the green shell 132 and resulting ceramic shell 133, but at a thickness that permits the formation of the openings 126 in the shell 133 during firing. Additionally or alternatively, the selection of the binder package and green agglomerate 130 formation conditions (e.g., spraydryer settings) can be selected to assist in migration of the fine raw material particles to the agglomerate surface to promote formation of the green shell 132 (so that the spheroid shape and size is preserved during firing), but only to a thickness that permits the openings 126 to still be formed in the shell 133 during solid state reaction of fine ceramic precursor materials during later firing and reaction stages.

As shown in stage (E) of FIG. 10, further firing, e.g., at higher temperatures, durations, and/or in presence of sinter aids (and/or glass or liquid formers) leads to sintering and shrinkage into a dense particle having low or even no open porosity (e.g., only closed porosity shown in the image of stage (E) of FIG. 10). In these advanced firing stages (e.g., being "overfired"), the spheroidal shape may no longer be preserved and the beneficial properties of high surface area and high open porosity may be lost.

Tables 1-4 provide various examples of slurry mixtures from which the green agglomerates 130 can be formed. For example, as described herein, the slurry mixtures can be formed in green agglomerates 130 via spheroidizing processes such as spraydrying or evaporative mixing. In particular, the slurry mixtures of Tables 1-4 pertain to green agglomerates that can be fired to form the porous ceramic beads 122 as cordierite-containing beads. All values in Tables 1-4 are given as weight percent, or weight percent super addition (wt % SA) as indicated. In Tables 1-3, the inorganic ingredients tally to 100 wt %, while in Table 4 the sum of the starch pore formers and inorganics is normalized to 100 wt %. The values provided in micrometers (μm) in parenthesis in the headings for some of the listed ingredients indicate an approximate median particle size for the corresponding ingredient. The slurry mixtures can be aqueous-based (water as a liquid vehicle) with a ceramic powder dispersant and/or binder to assist in stabilization, although oils, alcohols, or other liquid vehicles could be used with suitable additives to form spheroidal green agglomerates. For example, in some embodiments, 2-3% styrene acrylic copolymer (such as the Duramax B1002 material commercially available from The Dow Chemical Company) and 0.2%-1% ammonium salt of acrylic polymer (such as Duramax D-3005 material commercially available from The Dow Chemical Company) is added as a weight percent super addition (wt % SA) with respect to a total weight of the other ingredients, although other binders and dispersants can be added in similar amounts. Sodium stearate or other materials (e.g., other sources of sodium) can also be added as a sintering aid to assist in formation of the ceramic beads during firing of the green agglomerates.

TABLE 1

Slurry Mixtures with Clay

| Slurry Mixture Example No. | (wt %) Kaolin Clay (2.5 μm) | Kyanite Clay (7 μm) | $Mg(OH)_2$ (3 μm) | Silica (2.5 μm) | Alumina (1.5 μm) | Talc (4.5 μm) | Talc (10 μm) | Sodium Stearate | (wt % SA) Binder | Dispersant |
|---|---|---|---|---|---|---|---|---|---|---|
| S1 | 72.67 | | 18.04 | 9.29 | | | | | 2 | 0.2 |
| S3 | 71.94 | | 17.86 | 9.2 | | | | 1 | 2 | 0.2 |
| S8 | 72.67 | | 18.04 | 9.29 | | | | | 3 | 1 |
| S9 | | 57 | | 0.52 | | 42.47 | | | 2 | 0.2 |
| S12 | 73.8 | | 10.65 | | | | 15.55 | | 2 | 0.3 |
| S13 | 72.67 | | 18.04 | 9.29 | | | | | 2 | 0.2 |

TABLE 1-continued

Slurry Mixtures with Clay

| Slurry Mixture Example No. | Kaolin Clay (2.5 μm) (wt %) | Kyanite Clay (7 μm) (wt %) | $Mg(OH)_2$ (3 μm) (wt %) | Silica (2.5 μm) (wt %) | Alumina (1.5 μm) (wt %) | Talc (4.5 μm) (wt %) | Talc (10 μm) (wt %) | Sodium Stearate (wt %) | Binder (wt % SA) | Dispersant (wt % SA) |
|---|---|---|---|---|---|---|---|---|---|---|
| S17 | 73.8 | | 10.65 | | | 15.55 | | | 2 | 0.2 |
| S18 | 47.6 | | 20.3 | | 32.1 | | | | 2 | 0.2 |

TABLE 2

Slurry Mixtures with Hydrous Clay, Hydrated Alumina, and Silica Soot

| Slurry Mixture Example No. | Hydrous Clay (3.5 μm) (wt %) | Silica Soot (0.5 μm) (wt %) | Alumina (1.5 μm) (wt %) | Alumina (3.5 μm) (wt %) | Hydrated Alumina (0.1 μm) (wt %) | Talc (4.5 μm) (wt %) | Talc (10 μm) (wt %) | Sodium Stearate (wt %) | Binder (wt % SA) | Dispersant (wt % SA) |
|---|---|---|---|---|---|---|---|---|---|---|
| S2 | 11.58 | 14.25 | 14.55 | | 18.42 | 40.2 | | 1 | 2 | 0.2 |
| S4 | 11.7 | 14.4 | 14.7 | | 18.6 | 40.6 | | | 2 | 0.2 |
| S5 | 11.35 | 13.97 | 14.26 | | 18.05 | 39.4 | | 3 | 2 | 0.2 |
| S7 | 11.7 | 14.4 | 14.7 | | 18.7 | 25.3 | 15.2 | | 3 | 0.2 |
| S14 | 11.58 | 14.25 | | 14.55 | 18.42 | 40.2 | | 1 | 2 | 0.2 |

TABLE 3

Slurry Mixtures with Spinel

| Slurry Mixture Example No. | Kaolin Clay (2.5 μm) (wt %) | $Mg(OH)_2$ (3 μm) (wt %) | Silica (2.5 μm) (wt %) | Silica Soot (0.5 μm) (wt %) | Alumina (1.5 μm) (wt %) | Talc (4.5 μm) (wt %) | Spinel (3.5 μm) (wt %) | Binder (wt % SA) | Dispersant (wt % SA) |
|---|---|---|---|---|---|---|---|---|---|
| S10 | | | 51.3 | | 6.16 | | 42.5 | 2 | 0.2 |
| S11 | 58.1 | | | | | 31.9 | 10 | 3 | 0.2 |
| S19 | | | 40.96 | | 1.7 | 16.7 | 40.62 | 2 | 0.2 |
| S20 | 55.47 | 13.7 | | 16.81 | 0.41 | 3.97 | 9.65 | 2 | 0.2 |

TABLE 4

Slurry Mixtures with Pore Former

| Slurry Mixture Example No. | Kaolin Clay (2.5 μm) (wt %) | $Mg(OH)_2$ (3 μm) (wt %) | Silica (2.5 μm) (wt %) | Silica Soot (0.5 μm) (wt %) | Rice Starch (wt %) | Corn Starch (wt %) | Binder (wt % SA) | Dispersant (wt % SA) |
|---|---|---|---|---|---|---|---|---|
| S6 | 69.43 | 17.24 | 8.87 | | 4.45 | | 0 | 0.2 |
| S15 | 66.5 | 16.5 | 8.5 | | 8.5 | | 3 | 0.2 |
| S16 | 63.2 | 15.7 | | 8.1 | | 13 | 3 | 1 |

As outlined in Tables 1-4, various combinations of inorganic precursor materials can be utilized as cordierite precursors in green agglomerates that are useful for making cordierite beads when fired. In general, the cordierite-forming slurry mixtures comprise a silica source, an alumina source, and a magnesia source. For example, the silica source can be a clay (such as kaolin clay, kyanite clay, and/or hydrous clay), silica, silica soot, talc, clay, or other or silicon-containing compound. The alumina source can be, for example, a clay (such as kaolin clay, kyanite clay, or hydrous clay), alumina, hydrated alumina, spinel, or other aluminum-containing compound. The magnesia source can be, for example, talc, spinel, magnesium hydroxide, or other magnesium-containing compound. The ceramic precursors, e.g., the silica source, alumina source, and magnesia source, can be combined in amounts according to stochiometric ratios to create the desired ceramic phase, or phases, such as cordierite having the general formula of $Mg_2Al_4Si_5O_{18}$, including in amounts that provide phases stable with small deviations in stoichiometry, composition, and substitution. For example, in some embodiments the sources of alumina, silica, and magnesia are provided in ratios to form the desired primary ceramic phase, e.g., cordierite, in an amount of at least 80 wt % of the ceramic article (and/or cordierite in an amount of at least 90 wt % of crystalline phases). In some embodiments, the silica source, alumina source, and magnesia source are selected as cordierite precursors to provide a cordierite composition consisting essentially of from about 49 to about 53 percent by weight $SiO_2$, from about 33 to about 38 percent by weight $Al_2O_3$, and from about 12 to about 16 percent by weight MgO.

Figure 11:
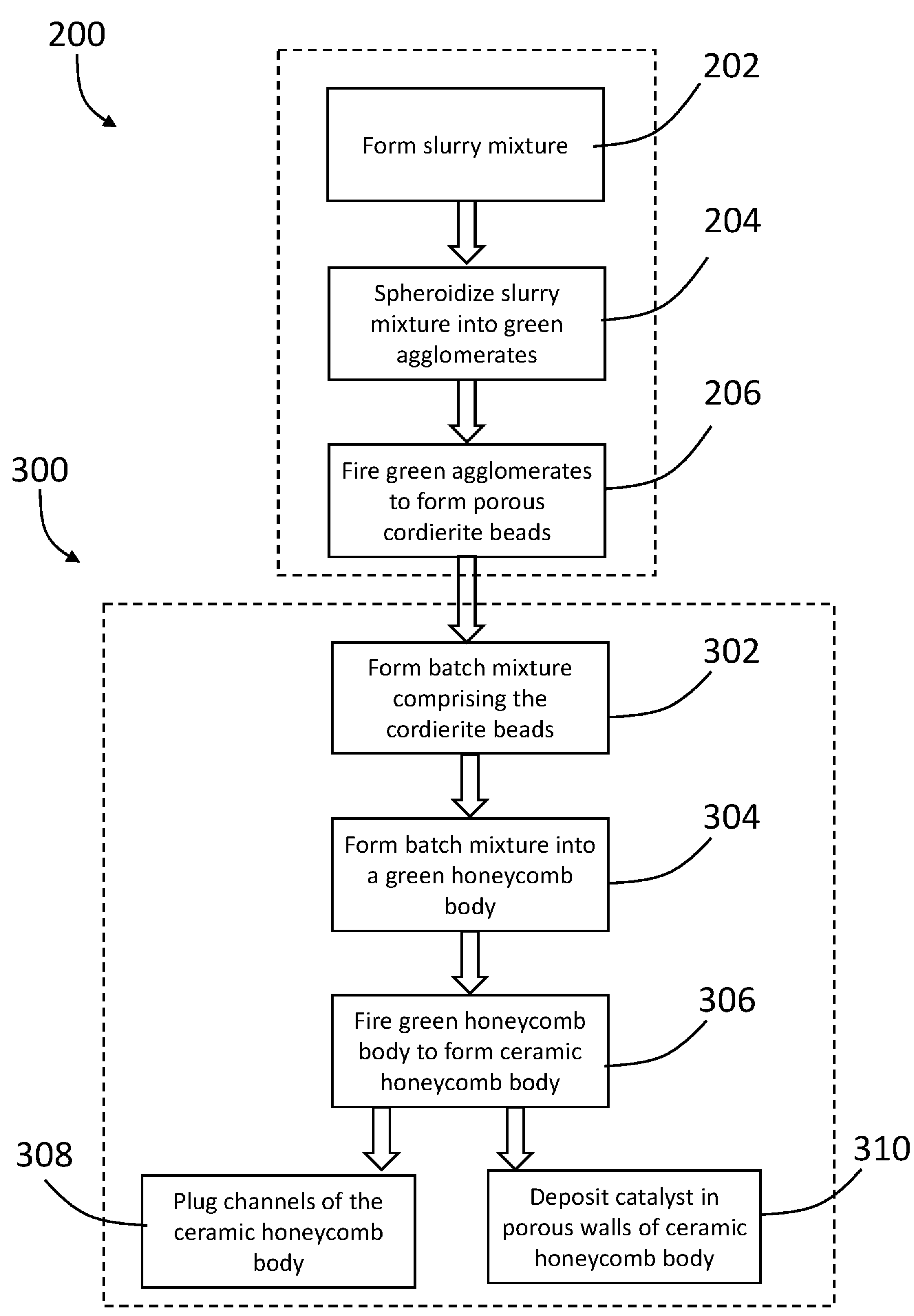
FIG. 11 shows a flow chart of a method for making spheroidal ceramic beads, and for manufacturing ceramic honeycomb bodies from batch mixtures comprising the spheroidal ceramic beads.
Figure 12A:
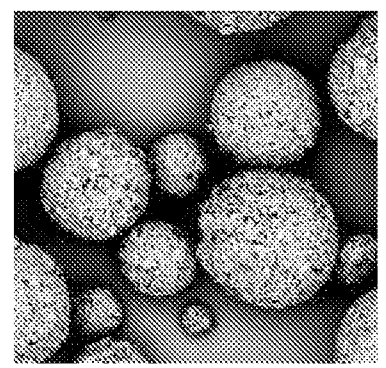
FIGS. 12A-12H are SEM images showing on-surface views and cross-sectional views of green agglomerates according to various embodiments disclosed herein.
Figure 12A:
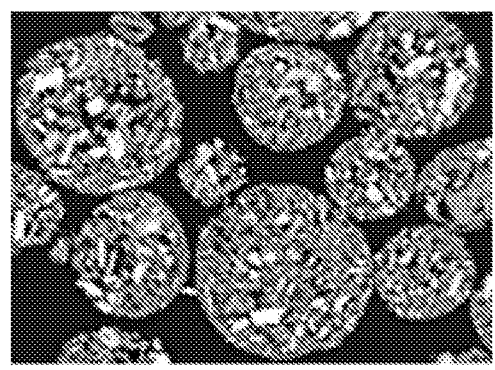
Figure 12B:
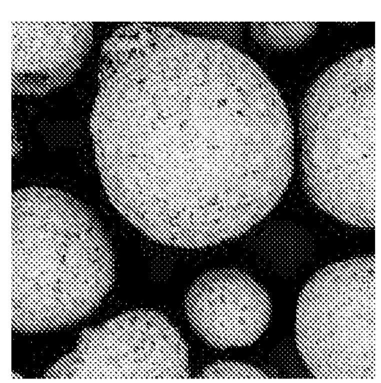
Figure 12B:
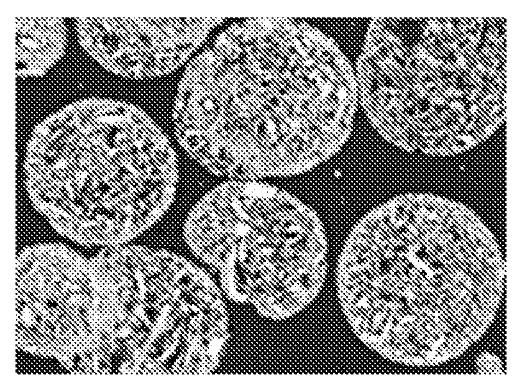
Figure 12C:
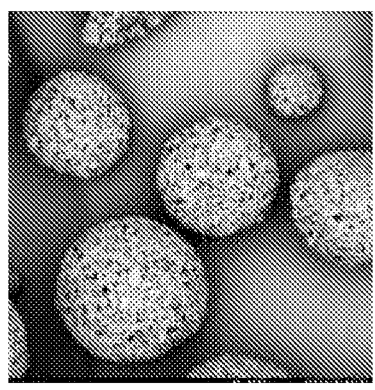
Figure 12C:
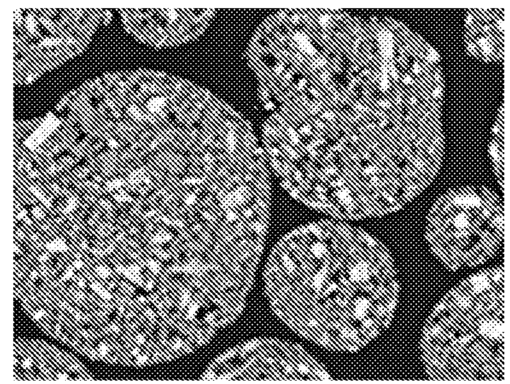
Figure 12D:
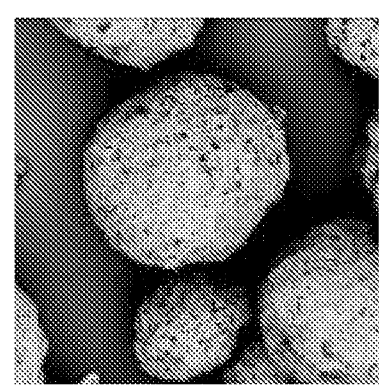
Figure 12D:
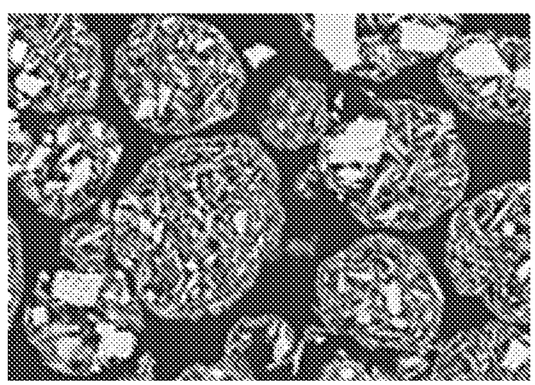
Figure 12E:
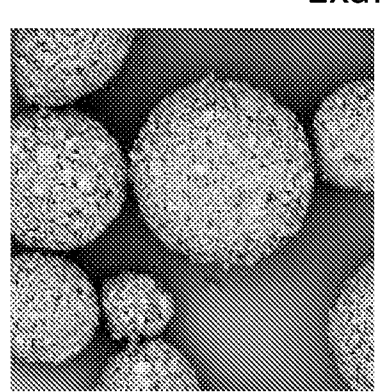
Figure 12E:
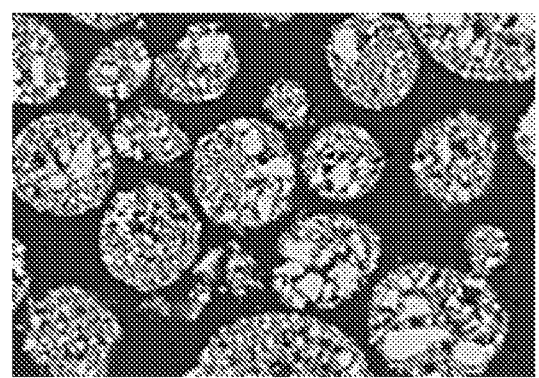
Figure 12F:
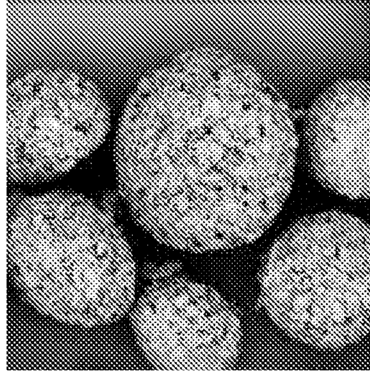
Figure 12F:
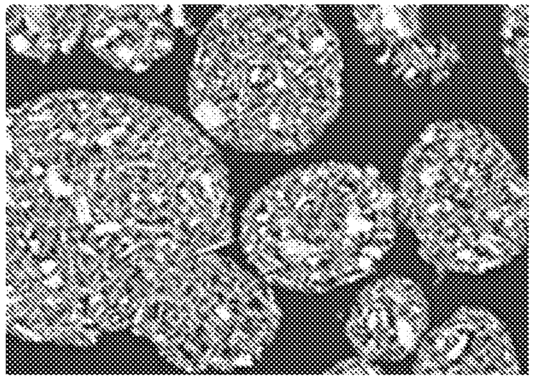
Figure 12G:
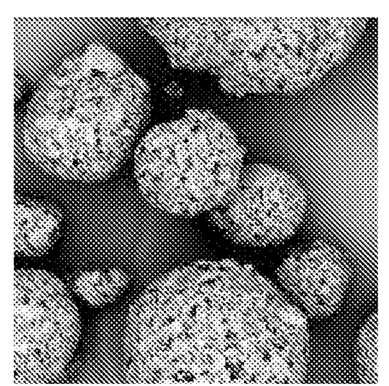
Figure 12G:
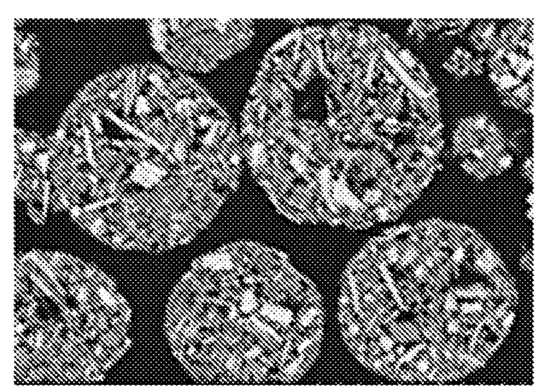
Figure 12H:
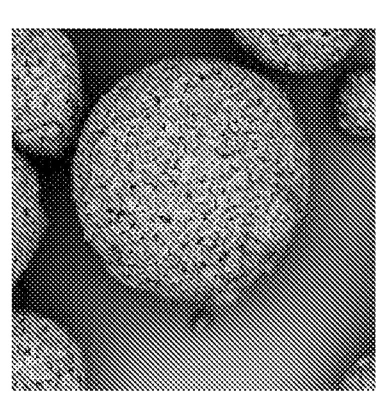
Figure 12H:
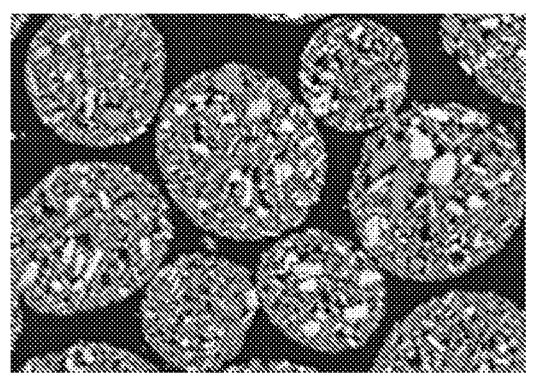
Figure 13A:
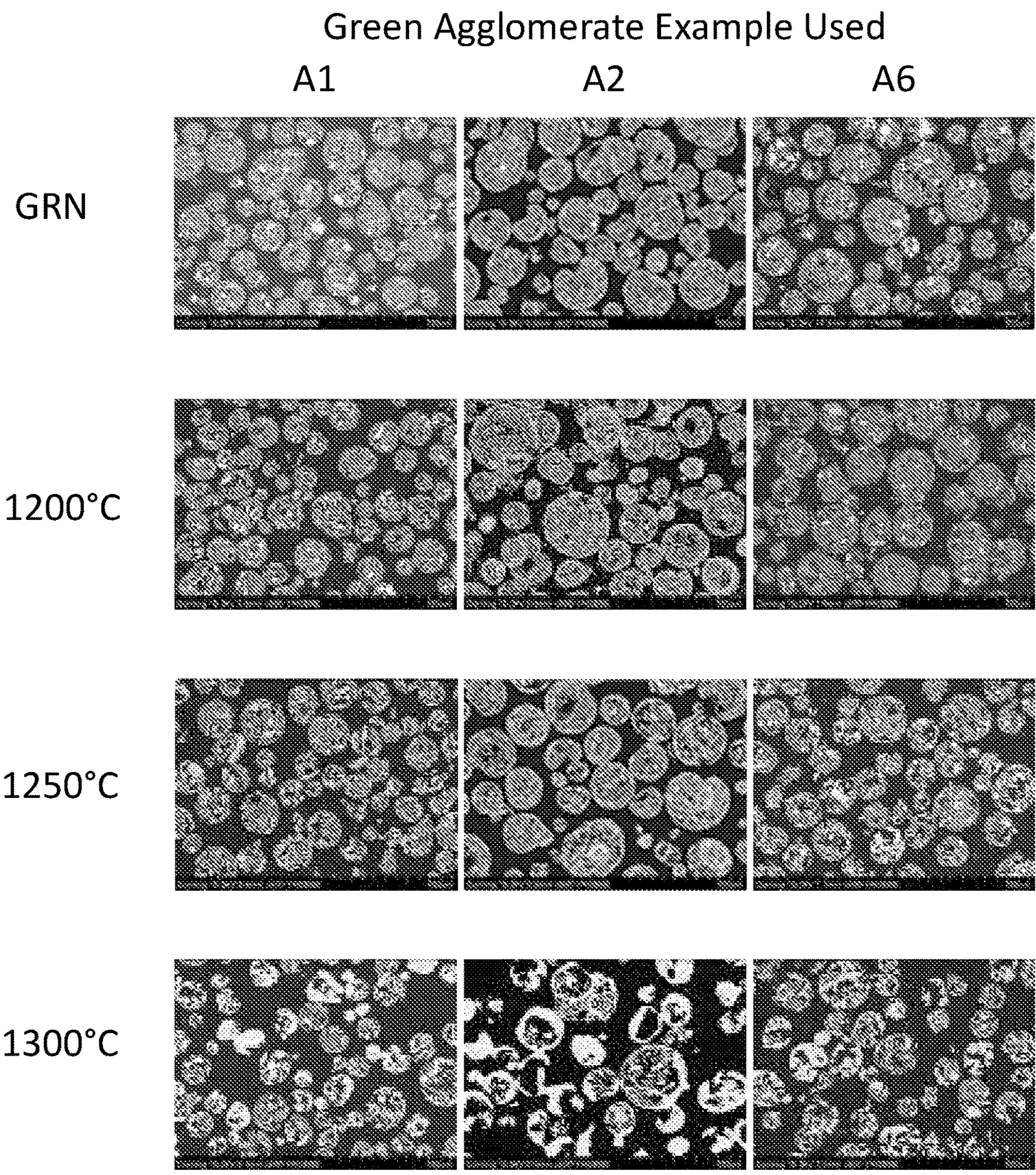
FIGS. 13A-13D show cross-sectional SEM images of green agglomerates and resulting ceramic beads formed by firing at various top temperatures according to various embodiments disclosed herein.
Figure 13B:
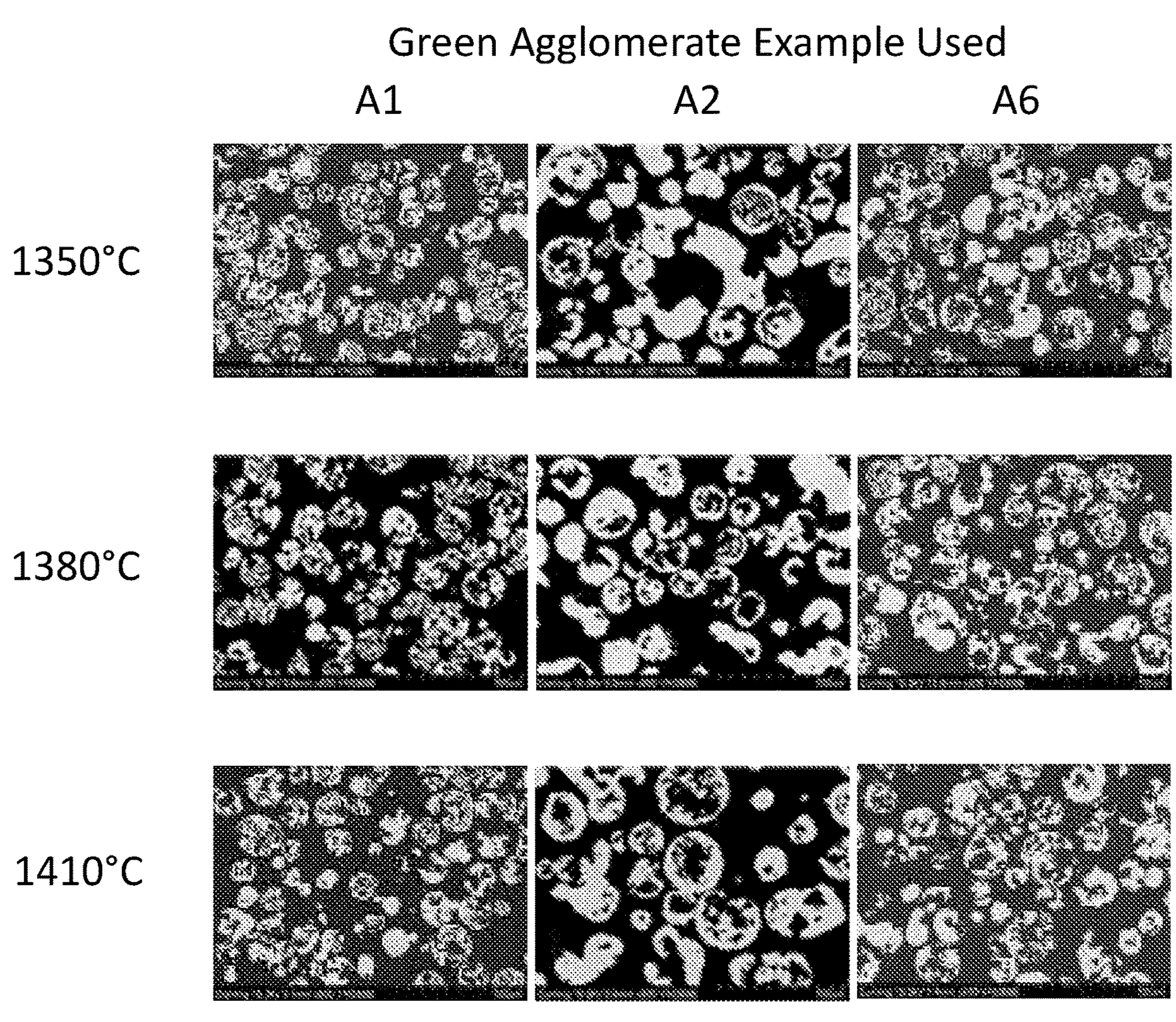
Figure 13C:
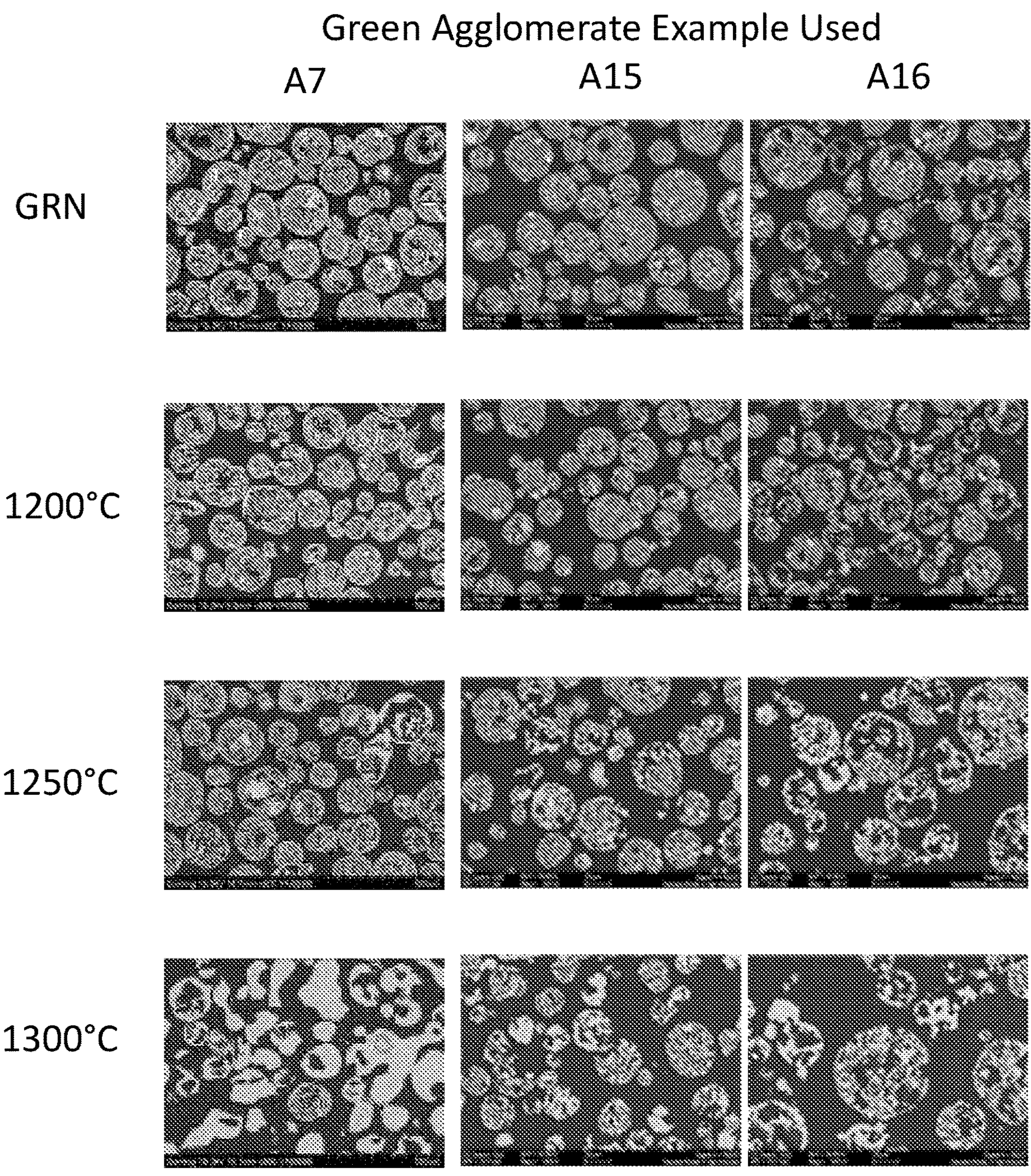
Figure 13D:
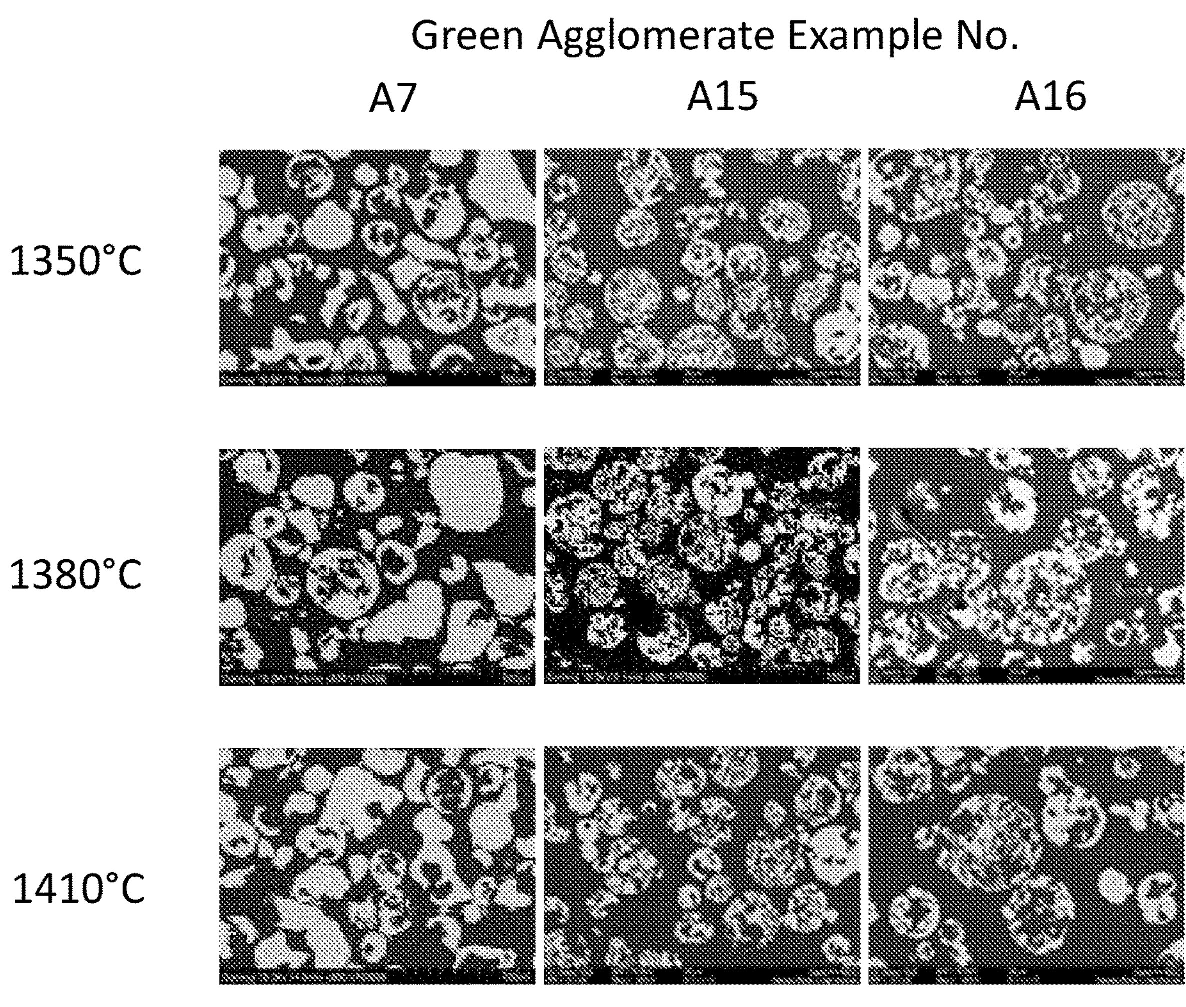

FIG. 11 shows a flowchart of a method 200 for forming porous spheroidal cordierite beads (e.g., the beads 122) and a method 300 for manufacturing a honeycomb body (e.g., the honeycomb body 100) comprising a sintered network (e.g., the network 120) of the porous spheroidal cordierite beads. At step 202, a slurry mixture is formed of ceramic-forming raw material ingredients (e.g., in accordance to any of the Examples S1-S20). At step 204, the slurry mixture is spheroidized into green agglomerates (e.g., the green agglomerates 130). In some embodiments, the spheroidizing is performed by spraydrying. In some embodiments, the spheroidizing is performed by a rotary evaporation process. Other processes can be used, such as dry powderization, freeze drying, laser melting, melt spinning, or liquid jetting. The green agglomerates can be at least partially dried as part of the spheroidizing process or following the spheroidizing process. At step 206, the green agglomerates are fired at conditions (times and temperatures) sufficient to convert the green agglomerates into porous cordierite beads (e.g., the beads 122).

At step 302, porous cordierite beads, e.g., resulting from the method 200, can be used as the primary inorganic material in a batch mixture (e.g., the batch mixture 110). In addition to the porous spheroidal cordierite beads, the batch mixture can comprise other ingredients such as an organic binder, inorganic binder materials (e.g., reactive cordierite-forming materials), pore formers (e.g., starch, graphite, etc.), oil or other lubricants, and a liquid carrier such as water. At step 304, the batch mixture is shaped (e.g., extruded via the honeycomb extrusion die 18), into a green honeycomb body (e.g., the green honeycomb body 100G). The green honeycomb body is converted into a ceramic honeycomb body (e.g., the honeycomb body 100) by firing under conditions (time and temperature) sufficient to sinter the porous cordierite beads together and/or react and/or sinter any additional reactive inorganic binder materials in the batch mixture.

Additional steps such as drying and cutting may be performed before firing. Since the cordierite beads have already been reacted to form cordierite and any other selected ceramic phases, the firing temperature and/or firing duration at step 306 can be significantly reduced in comparison to honeycomb bodies that are formed from reactive precursor materials. As described herein, since the cordierite beads have already been reacted, the beads have sufficient strength to survive the honeycomb body manufacturing processes, e.g., mixing in an extruder and extrusion through a honeycomb extrusion die, without losing the spheroidal shape. Similarly, since the beads have already been reacted, the beads will largely retain their size and shape during firing of the honeycomb body in step 306, thereby creating a microstructure for the honeycomb bodies that comprises an interconnected network of porous ceramic beads sintered together (e.g., the interconnected network 120).

Optionally, at step 308, channels (e.g., the channels 104) of the ceramic honeycomb body can be plugged to form a plugged honeycomb body (e.g., the plugged honeycomb body 101). For example, plugged honeycomb bodies can be used as a particulate, or wall flow, filter. Optionally, at step 310, a catalytic material can be deposited into and/or onto the porous walls (e.g., the walls 102) of the ceramic honeycomb body, e.g., by washcoating or other process. In some embodiments, the honeycomb body is both plugged and loaded with a catalytic material.

EXAMPLES

Various examples that were made for the green agglomerates 130 made from the slurry mixtures of Tables 1-4, porous ceramic beads 122 made from the green agglomerates 130, batch mixtures 110 comprising the porous ceramic beads 122, and honeycomb bodies 100 made from the batch mixtures 110 will now be described.

Green Agglomerates

Aqueous-based agglomerate slurry mixtures comprising cordierite-precursor materials stabilized by small levels of organic binder and dispersant were used as feedstock in spraydrying processes. In particular, Table 5 illustrates various examples of green agglomerates that were manufactured at different solid loadings using the slurry mixtures of Tables 1-4. The raw materials were slowly added under mixing to the water, using a high power turbomixer (rotostator). Raw materials were aspirated directly into the slurry tank under the water level to avoid raw material particle clustering in the slurry. The binder and dispersant were then added.

TABLE 5

Solid Loading for Green Agglomerate Powder Examples

| | Slurry Mixture Used | Solids Loading (% volume) |
|---|---|---|
| Green Agglomerate Powder Example No. | | |
| A1-10 | S1 | 10 |
| A1-15 | S1 | 15 |
| A1-21 | S1 | 21 |
| A2 | S2 | 20 |
| A3 | S3 | 20 |
| A4 | S4 | 20 |
| A5 | S5 | 20 |
| A6 | S6 | 15 |
| Green Agglomerate Example No. | | |
| A7 | S7 | 20 |
| A8 | S8 | 25 |
| A9 | S9 | 20 |
| A10 | S10 | 20 |
| A11 | S11 | 20 |
| A12 | S12 | 17 |
| A13 | S13 | 21 |
| A14 | S14 | 20 |
| A15 | S15 | 15 |
| A16 | S16 | 20 |
| A17 | S17 | 24.5 |
| A18 | S18 | 24 |
| A19 | S19 | 30 |
| A20 | S20 | 22 |

Examples A1-10, A1-15, and A1-21 were made from the same slurry mixture (S1) at different solid loadings (10 vol %, 15 vol %, and 21 vol %, respectively). Examples A1-10, A1-15, and A1-21 may be referred to herein collectively as "Examples A1". Similar to the different solid loadings for Examples A1, the solid loadings for green agglomerates formed from any other slurry mixture, e.g., the slurry mixtures A2-A20, can differ from those given in Table 5. Furthermore, the solids loading depicted in Table 5 are intended as estimates, which may vary, e.g., by up to 0.5% volume when the slurry mixtures are actually made. In some embodiments, the solid loading in a spraydried slurry mixture is from about 8% by volume to about 35% by volume, such as from 10% volume to 30% volume.

A medium scale industrial spraydryer with a 2-fluid fountain nozzle or rotary atomizer was used for spraydrying the different combinations of slurry mixture and solid loading of Table 5 to form the green agglomerates. Rates of 6 kg/h to 20 kg/h were used. Spraydryer settings for forming the green agglomerates included an inlet temperature of 200° C., cyclone temperature of 98° C., an inlet air velocity corresponding to a velocity head loss of 330-360 inches $H_2O$ (8382 mm $H_2O$ to 9144 mm $H_2O$), and cyclone air velocity corresponding to a head loss of about 5 inches $H_2O$ (127 mm $H_2O$).

Two-point collection was used on chamber and cyclone of the medium scale spraydryer to separate the smaller particle sizes (captured in the cyclone) from the relatively larger particles (captured in the main chamber). Different size and shaped spraydryers, as well as different nozzle configuration and spray drying parameters, would provide different size distributions. For example, a taller spraydry tower may be capable of providing more refinement and may not require two point collection to reach the same particle size distribution.

Table 6 summarizes particle size distribution values collected for the green agglomerates of Table 5 as recorded for particles collected in both the chamber and the cyclone for the spraydrying equipment utilized. In particular, Table 6 includes values for d10, d50, and d90, along with calculated values for (d90−10)/d50 (i.e., which may be referred to as "$d_{breadth}$" or the "breadth" of the corresponding particle size distribution) and d50-d10/d50 (i.e., which may be referred to herein as "$d_f$" or "$d_{factor}$"). As used herein, d10 refers to the particle size at which 10% of particles in the distribution are smaller (90% are larger), d50 refers to the median particle size (50% of the particles are larger, 50% are smaller), and d90 refers to the particle size at which 90% of the particles in the distribution are smaller (10% are larger).

TABLE 6

Green Agglomerate Particle Size Distributions

| Green Agglom. Powder No. | SL in % vol | Chamber d10 (μm) | Chamber d50 (μm) | Chamber d90 (μm) | Chamber (d90 − d10)/d50 | Chamber (d50 − d10)/d50 | Cyclone d10 (μm) | Cyclone d50 (μm) | Cyclone d90 (μm) | Cyclone (d90 − d10)/d50 | Cyclone (d50 − d10)/d50 |
|---|---|---|---|---|---|---|---|---|---|---|---|
| A1-10 | 10 | 22.98 | 32.54 | 48.39 | 0.78 | 0.29 | 5.05 | 13.91 | 27.17 | 1.59 | 0.64 |
| A1-15 | 15 | 25.65 | 35.82 | 52.85 | 0.76 | 0.28 | 6.72 | 21.33 | 39.86 | 1.55 | 0.68 |
| A1-21 | 21 | 27.68 | 40.28 | 60.56 | 0.816 | 0.313 | 10.88 | 26.24 | 45.91 | 1.335 | 0.585 |
| A2 | 20 | 24.5 | 35.74 | 53.74 | 0.818 | 0.314 | 9.59 | 20.43 | 38.3 | 1.405 | 0.531 |
| A3 | 20 | 26.86 | 37.43 | 54.34 | 0.734 | 0.282 | 7.26 | 20.04 | 36.29 | 1.449 | 0.638 |
| A4 | 20 | 30.13 | 44.94 | 69.3 | 0.872 | 0.33 | 12.8 | 24.44 | 43.3 | 1.248 | 0.476 |
| A5 | 20 | 27.78 | 39.59 | 58.26 | 0.770 | 0.298 | 10.57 | 24.52 | 43.53 | 1.34 | 0.57 |
| A6 | 15 | 26 | 37.95 | 56.37 | 0.800 | 0.315 | 2.39 | 4.57 | 8.68 | 1.38 | 0.48 |
| A7 | 20 | 30.05 | 42.3 | 62.14 | 0.759 | 0.290 | 12.13 | 24.65 | 44.82 | 1.33 | 0.51 |
| A8 | 25 | 31.53 | 47.29 | 72.95 | 0.876 | 0.333 | 12.58 | 27.12 | 50.35 | 1.393 | 0.536 |
| A9 | 20 | 26.38 | 39.69 | 60.62 | 0.863 | 0.335 | 9.63 | 21.05 | 38.92 | 1.391 | 0.543 |
| A10 | 20 | 23.15 | 32.4 | 47.58 | 0.754 | 0.285 | 3.35 | 8.38 | 22.78 | 2.319 | 0.6 |
| A11 | 20 | 30.28 | 46.23 | 73.34 | 0.931 | 0.345 | 10.34 | 24.18 | 46.4 | 1.491 | 0.572 |
| A12 | 17 | 26.04 | 38.49 | 58.31 | 0.838 | 0.323 | 7.07 | 19.56 | 37.24 | 1.542 | 0.639 |
| A13 | 21 | 28.2 | 40.41 | 60.26 | 0.793 | 0.302 | 11.19 | 27.92 | 48.32 | 1.33 | 0.599 |
| A14 | 20 | 24.73 | 35.66 | 53.59 | 0.809 | 0.307 | 10.90 | 22.37 | 39.51 | 1.28 | 0.51 |
| A15 | 15 | 27.14 | 39.33 | 58.64 | 0.801 | 0.31 | 10.57 | 23.51 | 42.35 | 1.352 | 0.55 |
| A16 | 20 | 26.7 | 52.2 | 97.22 | 1.351 | 0.489 | 6.74 | 16.07 | 36.73 | 1.866 | 0.581 |
| A17 | 24.5 | 23.24 | 33.09 | 49.32 | 0.788 | 0.298 | 4.87 | 16.91 | 33.55 | 1.696 | 0.712 |

Capturing particles at both chamber and cyclone outlets of the spraydryer facilitated the ability to select or engineer the particle size distribution of the agglomerates and/or beads made from the agglomerates, as desired. For example, the cyclone collection point captured a smaller sized fraction of particles, while the chamber captured a larger sized fraction of particles. Further engineering of the particle size distribution can be accomplished by sorting or sieving the particles (e.g., the green agglomerates or fired beads) by removing the coarse (large) and/or fine (small) tail of the particle size distribution. In this way, narrow particle size distributions can be obtained for the green agglomerates (and resulting ceramic beads after firing). In some embodiments, a powder of green agglomerates is formed (e.g., by sorting and/or sieving) such that the median particle size (d50) of the green agglomerates in the powder ranges from about 10 μm to 80 μm, about 15 μm to 60 μm, or even about 20 μm to 50 μm. In some embodiments, the breadth (given by (d90−d10)/d50) of the particle size distribution of the green agglomerates 130 is less than 1.5, less than 1.0, less than 0.9, or even less than 0.8. In some embodiments, the $d_{factor}$ (given by (d50−d10)/d50) of the particle size distribution of the green agglomerates is less than 0.5, less than 0.4, or even less than 0.3. Additionally or alternatively, air-classification, sieving or other processes can be used to remove one or more particle size ranges from a resulting particle size distribution to tailor the particle size distribution.

FIGS. 12A-12H shows representative examples of green spraydried agglomerates A1, A2, A8, A9, A10, A11, A12, and A13 of Table 6 as taken from the chamber (not cyclone) of the spraydryer. More particularly, FIGS. 12A-12H show a surface SEM image and a polished cross-sectional SEM image for each of these green agglomerate examples. For the observation of polished sections, the powder was infiltrated with epoxy, sliced and polished.

From FIGS. 12A-12H, it can be seen that spherical particles were consistently obtained despite the variety of different raw material mixtures (in accordance with Tables 1-4). However, the combinations of different raw materials used affected the particle packing density and formation of green shell from fine particles (e.g., as described above with respect to the green shell 132). Of note, green agglomerate example A2 evidences the relationship between high amounts of very fine raw material ingredients and the thickness of the green shell structure 132, as green agglomerate example A2 used a comparably large amount of very fine ingredients (e.g., silica soot having a median particle size of approximately 0.5 μm and hydrated alumina having a median particle size of approximately 0.1 μm per Table 2), which resulted in the thickest and most prominent green shell.

Cordierite Beads

Next, the green agglomerate powders were converted in a firing process into cordierite bead powders. The green agglomerate powders were fired in a variety of ways, including on alumina trays or setters, in batch furnaces, and/or in rotary calciners. The particular firing equipment did not appear to significantly affect the resulting cordierite beads, although rotary calcining did assist in preventing sticking (sintering) of some Examples. For example, green agglomerate Examples A1, A2, A3, A4, A17, and A20 could all be converted by firing on trays and did not show significant sticking of the green agglomerates to each other or to the tray. Powders the other green agglomerate Examples benefited from rotary calcining to avoid sticking to the furnace ware.

For batch rotary calcining, an electrically heated tube furnace was used in batch mode with rotation rates of 1-3 rpm. Alumina tubing of about 5 inches diameter and 1 meter length was used. Typical furnace loading was 1.5 kg-2 kg. The furnaces were loaded, heated with their load at a rate of 100-150° C./h to a temperature of between about 600-700° C. without closing the furnace tube (thus allowing air circulation and elimination of organic binder burn out products) and then at the same rate with closed tube ends to a top temperature of 1350° C.-1410° C. with a hold (or "soak") for a desired duration and then cooled at rates of between 100° C./h−150° C./h to room temperature. Typical hold times at the top temperature were in the range of about 4 h-16 h.

For continuous rotary calcining, the green agglomerates were fed into the hot zone of the furnace and the fired powder was collected at the tube outlet.

Green agglomerate powder was also loaded into 11.5 inch by 19 inch by 5 inch dense alumina setter boxes, although any size setter box or tray can be used. Typical setter box loading for the tested examples was 4 kg-7 kg. One or both of temperature and firing duration can be decreased to assist in the avoidance of sticking (sintering) of the spherical particles to each other or to the tray, thereby preserving the resulting cordierite beads as individual spheroidal particles.

As above, the green agglomerates can be converted during high temperature firing through a number of decomposition, solid state reaction, and sintering steps into partially to fully reacted cordierite spheroidal particles (cordierite beads). Depending on the nature of the agglomerate slurry mixture raw materials, full conversion of the precursor spheres required different temperatures and calcining times.

Evolution of the microstructures was tracked for the green agglomerate powder Examples and resulting cordierite beads as a function of firing temperature, with resulting pore size and porosity values displayed in Tables 7A-7D. Porosity and pore sizes in the beads were systematically evaluated by mercury intrusion porosimetry (MIP) and, for selected powders, also by SEM and tomography. For example, tomography was used to verify that beads made from slurry mixtures S1 and S6 had less than 1% closed porosity. SEM was performed on images having many bead cross-sections to deduce statistical values for porosity and pore sizes.

Porosity values were generated via MIP measurements taken of the fired cordierite beads using an Autopore IV 9500 porosimeter. In particular, the powder of fired cordierite beads was filled into a test vessel, sealed, and then the mercury pressure was increased and infiltration measured. In accordance with MIP techniques, as the pressure was increased, the voids between the beads was first quickly filled at relatively low pressure, and then progressively smaller and smaller intrabead pores were next infiltrated. At increasing pressure, increasingly smaller pore bottlenecks were overcome and the porosity beyond the bottleneck was infiltrated. Thus a dependency of mercury pressure and pore bottleneck size (the bottleneck size reported in Tables 7A-7D as "intrabead pore size") was obtained. Accordingly, as only open porosity can be infiltrated and measured by MIP techniques, the porosity values in Tables 7A-7D all relate to open porosities.

A bimodal pore size distribution was obtained for each measured powder, having a first peak at a relatively small median pore size and a second peak at a relatively larger median pore size. The median pore size may be referred to herein as the D50 (with a capital "D", in contrast to the median particle size d50, which is designated with a lowercase "d"). The second peak corresponding to the large "pore sizes" corresponded to the voids or openings between the beads in the powder bed packing in the sealed vessel (e.g., which resemble, and would become the interstices 128 defining the interbead porosity if the beads 122 were sintered together into the network 120), while the smaller first peak of pore sizes corresponded to the intrabead porosity in the beads. Examples of similar bimodal pore size distributions having interbead and intrabead porosities that result from sintering the beads 122 into the network 120 are described in more detail below with respect to FIG. 17. Using a simple separation of the overall porosity into its contributions from the powder/bead bed packing (first, large peak) and the intrabead porosity (second, smaller peak) enabled the intrabead porosity in the bead and the intrabead pore size to be isolated, with the corresponding values summarized in Tables 7A-7D. The unit of "hours" may be abbreviated by "hr" or simply "h" in any of the Tables herein.

TABLE 7A

Ceramic Bead Properties at Different Firing Temperatures

| Green Agglomerate Powder Used | Approximate Green Agglomerate Median Particle Size (μm) | Firing Temp. (° C.) | Firing Time (hr) | Intrabead Porosity per bead (% relative individual bead volume) | Intrabead Median Pore Size (μm) |
|---|---|---|---|---|---|
| A1-15 | 35.8 | 1000 | 8 | 59.2 | 0.6 |
| | | 1100 | 8 | 57.4 | 0.6 |
| | | 1150 | 8 | 56.4 | 0.8 |
| | | 1200 | 8 | 54.4 | 0.8 |
| | | 1250 | 8 | 41.4 | 1.5 |
| | | 1300 | 8 | 34.0 | 1.5 |
| | | 1350 | 8 | 25.7 | 2.1 |
| | | 1380 | 8 | 25.0 | 2.1 |
| | | 1410 | 8 | 22.6 | 2.5 |
| A2 | 35.7 | 1000 | 8 | 52.6 | 0.4 |
| | | 1100 | 8 | 51.3 | 0.4 |
| | | 1150 | 8 | 50.7 | 0.6 |
| | | 1200 | 8 | 49.5 | 0.8 |
| | | 1250 | 8 | 46.8 | 1.1 |
| | | 1300 | 8 | 19.1 | 3.2 |
| | | 1350 | 8 | 13.3 | 3.2 |
| | | 1380 | 8 | 12.9 | 3.2 |
| | | 1410 | 8 | 11.9 | 3.2 |
| A3 | 37.4 | 1000 | 8 | 56.9 | 0.4 |
| | | 1100 | 8 | 53.1 | 0.4 |
| | | 1150 | 8 | 51.8 | 0.8 |
| | | 1200 | 8 | 50.1 | 0.8 |
| | | 1250 | 8 | 34.2 | 1.5 |
| | | 1300 | 8 | 31.1 | 1.8 |
| | | 1350 | 8 | 22.2 | 2.4 |
| | | 1380 | 8 | 23.0 | 2.6 |
| | | 1410 | 8 | 23.5 | 2.9 |
| A4 | 44.9 | 1000 | 8 | 53.6 | 0.4 |
| | | 1100 | 8 | 50.9 | 0.4 |
| | | 1150 | 8 | 49.9 | 0.6 |
| | | 1200 | 8 | 48.4 | 0.6 |
| | | 1250 | 8 | 37.1 | 1.5 |
| | | 1300 | 8 | 29.8 | 2.4 |
| | | 1350 | 8 | 24.3 | 3.2 |
| | | 1380 | 8 | 19.1 | 3.3 |
| | | 1410 | 8 | 16.5 | 3.3 |

TABLE 7B

Ceramic Bead Properties at Different Firing Temperatures

| Green Agglomerate Powder Used | Approximate Green Agglomerate Median Particle Size (μm) | Firing Temp. (° C.) | Firing Time (hr) | Intrabead Porosity per bead (% relative individual bead volume) | Intrabead Median Pore Size (μm) |
|---|---|---|---|---|---|
| A5 | 39.6 | 1000 | 8 | 50.6 | 0.4 |
| | | 1100 | 8 | 45.6 | 0.6 |
| | | 1150 | 8 | 45.8 | 0.6 |
| | | 1200 | 8 | 44.6 | 0.8 |
| | | 1250 | 8 | 42.2 | 1.3 |
| | | 1300 | 8 | 6.8 | 3.2 |
| | | 1350 | 8 | 2.2 | 3.2 |
| | | 1380 | 8 | 2.9 | 3.3 |
| | | 1410 | 8 | 3.0 | 3.3 |
| A6 | 37.9 | 1000 | 8 | 56.4 | 0.6 |
| | | 1100 | 8 | 54.5 | 0.6 |
| | | 1150 | 8 | 53.7 | 0.8 |
| | | 1200 | 8 | 49.7 | 0.8 |
| | | 1250 | 8 | 46.3 | 1.1 |
| | | 1300 | 8 | 34.8 | 1.8 |
| | | 1350 | 8 | 28.1 | 2.3 |
| | | 1380 | 8 | 23.2 | 2.5 |
| | | 1410 | 8 | 24.4 | 3.0 |
| A7 | 42.3 | 1000 | 8 | 53.0 | 0.5 |
| | | 1100 | 8 | 49.1 | 0.6 |
| | | 1150 | 8 | 49.0 | 0.6 |
| | | 1200 | 8 | 48.2 | 0.8 |
| | | 1250 | 8 | 44.9 | 1.0 |

TABLE 7B-continued

Ceramic Bead Properties at Different Firing Temperatures

| Green Agglomerate Powder Used | Approximate Green Agglomerate Median Particle Size (μm) | Firing Temp. (° C.) | Firing Time (hr) | Intrabead Porosity per bead (% relative individual bead volume) | Intrabead Median Pore Size (μm) |
|---|---|---|---|---|---|
| | | 1300 | 8 | 7.2 | 3.3 |
| | | 1350 | 8 | 7.7 | 3.2 |
| | | 1380 | 8 | 11.5 | 3.2 |
| | | 1410 | 8 | 8.0 | |
| A8 | 47.3 | 1000 | 8 | 57.8 | 0.4 |
| | | 1100 | 8 | 56.7 | 0.6 |
| | | 1150 | 8 | 54.5 | 0.6 |
| | | 1200 | 8 | 52.6 | 0.8 |
| | | 1250 | 8 | 47.9 | 1.1 |
| | | 1300 | 8 | 41.7 | 1.5 |
| | | 1350 | 8 | 37.6 | 1.5 |
| | | 1380 | 8 | 39.1 | 1.8 |
| | | 1410 | 8 | 37.7 | 2.1 |

TABLE 7C

Porous Ceramic Bead Properties at Different Firing Temperatures

| Green Agglomerate Powder Used | Approximate Green Agglomerate Median Particle Size (μm) | Firing Temp. (° C.) | Firing Time (hr) | Intrabead Porosity per bead (% relative individual bead volume) | Intrabead Median Pore Size (μm) |
|---|---|---|---|---|---|
| A9 | 39.7 | 1000 | 8 | 53.7 | 0.6 |
| | | 1100 | 8 | 49.9 | 0.6 |
| | | 1150 | 8 | 50.0 | 0.8 |
| | | 1200 | 8 | 47.8 | 0.8 |
| | | 1250 | 8 | 43.3 | 1.1 |
| | | 1300 | 8 | 29.1 | 2.3 |
| | | 1350 | 8 | 16.9 | 4.4 |
| | | 1380 | 8 | 14.3 | |
| | | 1410 | 8 | 6.0 | 4.7 |
| A10 | 32.4 | 1000 | 8 | 68.0 | 0.5 |
| | | 1100 | 8 | 42.0 | 0.6 |
| | | 1150 | 8 | 36.7 | 0.6 |
| | | 1200 | 8 | 34.2 | 0.8 |
| | | 1250 | 8 | 32.6 | 0.8 |
| | | 1300 | 8 | 28.5 | 1.1 |
| | | 1350 | 8 | 25.9 | 1.1 |
| | | 1380 | 8 | 23.6 | 1.5 |
| | | 1410 | 8 | 18.4 | 1.8 |
| A11 | 46.2 | 1000 | 8 | 57.4 | 0.4 |
| | | 1100 | 8 | 57.0 | 0.6 |
| | | 1150 | 8 | 53.3 | 0.6 |
| | | 1200 | 8 | 45.6 | 1.0 |
| | | 1250 | 8 | 43.5 | 1.1 |
| | | 1300 | 8 | 38.8 | 1.5 |
| | | 1350 | 8 | 38.6 | 1.8 |
| | | 1380 | 8 | 34.8 | 1.8 |
| | | 1410 | 8 | 37.0 | 2.2 |
| A12 | 38.5 | 1000 | 8 | 55.2 | 0.6 |
| | | 1100 | 8 | 55.3 | 0.6 |
| | | 1150 | 8 | 48.2 | 0.6 |
| | | 1200 | 8 | 38.0 | 0.8 |
| | | 1250 | 8 | 32.6 | 1.0 |
| | | 1300 | 8 | 19.5 | 1.8 |
| | | 1350 | 8 | 13.5 | 1.8 |
| | | 1380 | 8 | 10.0 | 2.7 |
| | | 1410 | 8 | 10.8 | 2.9 |

TABLE 7D

Porous Ceramic Bead Properties at Different Firing Temperatures

| Green Agglomerate Powder Used | Approximate Green Agglomerate Median Particle Size (μm) | Firing Temp. (° C.) | Firing Time (hr) | Intrabead Porosity per bead (% relative individual bead volume) | Intrabead Median Pore Size (μm) |
|---|---|---|---|---|---|
| A13 | 40.4 | 1000 | 8 | 57.5 | 0.4 |
| | | 1100 | 8 | 55.3 | 0.6 |
| | | 1150 | 8 | 50.8 | 0.6 |
| | | 1200 | 8 | 50.1 | 0.8 |
| | | 1250 | 8 | 44.8 | 1.0 |
| | | 1300 | 8 | 41.9 | 1.3 |
| | | 1350 | 8 | 33.2 | 1.8 |
| | | 1380 | 8 | 16.4 | 2.3 |
| | | 1410 | 8 | 18.3 | 2.5 |
| A14 | 35.7 | 1000 | 8 | 52.7 | 0.4 |
| | | 1100 | 8 | 48.0 | 0.6 |
| | | 1150 | 8 | 49.5 | 0.6 |
| | | 1200 | 8 | 48.6 | 0.8 |
| | | 1250 | 8 | 45.4 | 1.1 |
| | | 1300 | 8 | 11.6 | 3.2 |
| | | 1350 | 8 | 12.0 | |
| | | 1380 | 8 | 7.4 | |
| | | 1410 | 8 | 9.3 | 3.2 |
| A15 | 39.3 | 1000 | 8 | 51.9 | 0.6 |
| | | 1100 | 8 | 54.8 | 0.6 |
| | | 1150 | 8 | 52.3 | 0.6 |
| | | 1200 | 8 | 52.1 | 0.6 |
| | | 1250 | 8 | 43.5 | 1.1 |
| | | 1300 | 8 | 35.9 | 1.1 |
| | | 1350 | 8 | 29.7 | 1.8 |
| | | 1380 | 8 | 29.8 | 2.1 |
| | | 1410 | 8 | 27.8 | 2.4 |
| A16 | 52.2 | 1000 | 8 | 57.3 | 0.6 |
| | | 1100 | 8 | 52.9 | 0.6 |
| | | 1150 | 8 | 52.4 | 0.6 |
| | | 1200 | 8 | 48.6 | 0.6 |
| | | 1250 | 8 | 47.5 | 1.1 |
| | | 1300 | 8 | 39.9 | 1.1 |
| | | 1350 | 8 | 35.8 | 5.1 |
| | | 1380 | 8 | 35.3 | 5.1 |
| | | 1410 | 8 | 35.0 | 5.3 |

In a fired powder, each bead is expected to deviate by some degree, so the reported intrabead material porosities can be considered herein on average for the beads (e.g., some beads within a sample, or within a honeycomb body manufactured utilizing the ceramic beads, can have intrabead porosities that are less than or more than the indicated intrabead material porosity).

As above, since mercury infiltration was utilized, the porosity and pore size values of Tables 7A-7D refer to the open accessible channels in the porosity. The data was generally consistent with the microscopy observations (e.g., via analysis of SEM images). In some embodiments, the porosity of the material of the beads (intrabead porosity of each bead relative to the volume of each bead), when fully reacted, is at least 15%, at least 20% or even at least 25%, such as from about 15% to 60%, 15% to 50%, 15% to 40%, 20% to 60%, 20% to 50%, 20% to 40%, 25% to 60%, 25% to 50%, or 25% to 40%.

Instead of performing a detailed compositional analysis of the fired beads to assess whether or not the beads have been fully reacted, the top temperature and hold time of firing can be used as a surrogate to indicate whether the precursors in the green agglomerates have been sufficiently reacted into the cordierite beads. In some embodiments, the cordierite beads resulting from firing green agglomerates at a temperature of at least 1300° C. for a time of at least 8 hours will be considered as sufficiently fully reacted. Accordingly, in some embodiments the cordierite beads, after being fired at a temperature of at least 1300° C. for at least 8 hours, have an open intrabead porosity (relative to the volume of each bead) of at least 15%, at least 20% or even at least 25%, such as from about 15% to 60%, 15% to 50%, 15% to 40%, 20% to 60%, 20% to 50%, 20% to 40%, 25% to 60%, 25% to 50%, or 25% to 40%. Accordingly, green agglomerate Examples A1, A2, A3, A4, A6, A8, A9, A10, A11, A12, A13, A15, and A16 all exhibited high open porosities at sufficiently high levels of reaction in these embodiments.

The cordierite beads can also be assessed based on their stability against densification. For example, in some embodiments, the cordierite beads are made from green agglomerates that result in ceramic beads having an open intrabead porosity of at least 20%, when fired at a top temperature of 1350° C. for 8 hours, such as Examples A1, A3, A4, A6, A8, A10, A11, A13, A15, and A16, which all exhibited relatively low tendency to densification at higher firing temperatures. In some embodiments, the cordierite beads are made from green agglomerates that result in ceramic beads having an open intrabead porosity of at least 20% when fired at a top temperature of at least 1400° C., such as Examples A1, A3, A6, A8, A11, A15, and A16, which all exhibited particularly excellent resistance to densification at even the highest range of useable firing temperatures.

Porosity data showed that green agglomerate powder Examples utilizing slurries similar to Example A1 (e.g., Examples A6, A15, and A16 were made from slurry mixtures that comprised starch, but otherwise resembled the slurry mixture A1) maintained consistently high porosities across the entire temperature range tested. That is, the porosity decreased more slowly (less densification) with increasing temperature than observed in other Examples (i.e., Examples A1, A6, A15, and A16 were less sensitive to higher temperature firing). In this way, Examples A1, A6, A15, and A16 may be particularly well suited for embodiments, in which full reaction (e.g., via higher top temperatures and/or longer hold times) of the cordierite beads is desired.

The rice starch in Examples A6 and A15 did not appear to have a significant impact on open pore channel size or open porosity (in comparison to Example A1 which was made from a similar slurry mixture with no starch), as median open pore size was approximately 2 μm to 3 μm for the beads 122 made from Examples A1, A6, and A15. Addition of corn starch in Example 16 did not appear to affect the overall open porosity, but, having a larger median particle size than rice starch, did substantially enlarge the median open pore size, e.g., to more than 5 micrometers. Thus, the addition of corn starch, or other starches having relatively larger particle sizes, may be advantageous in embodiments in which larger intrabead pore sizes are desired. The beads 122 made from Example A16 showed a particularly broad pore size distribution with pore channels covering a size range from about 2 μm to 10 μm. The addition of larger talc particles (e.g., in Example A7) compared to small talc based (e.g., Examples A2 and A4) also appeared to drive earlier and faster loss of the open porosity in the fired cordierite beads 122, thus forming only a small amount of open porosity around 1300° C. (e.g., the green shell transforming into dense ceramic shell). Examples show that magnesium hydroxide in the precursor slurry was generally correlated to relatively higher open porosity in the fired beads. Accordingly, magnesium hydroxide is included as the magnesia source in some embodiments, particularly where higher intrabead porosities are desired. In contrast, it appeared that pure oxide precursor mixtures, such as MgO, $SiO_2$, $Al_2O_3$, or mixed oxides such as $MgAl_2O_4$, interact primarily via solid state diffusion and reaction at contact points between the beads with insignificant or without any glass or liquid formation and therefore react only at very high temperatures in comparison to other Examples, which lead these beads to sinter immediately under shrinkage with comparatively little or no development of intrabead porosity.

FIGS. 13A-13D show the microstructural evolution of representative examples of green agglomerates and resulting ceramic beads as a function of firing temperature. More particularly, FIGS. 13A-13D shows polished SEM cross-sectional views of green agglomerate particles ("GRN") and resulting beads fired at temperatures of 1200° C., 1250° C., 1300° C., 1350° C., 1380° C., and 1410° C. for 4 h. For green particles containing bonded water in form of hydroxides, hydrated oxides, etc., all water was released below the temperature of 1200° C. shown in FIGS. 13A-13D. For green agglomerate powders comprising starch additions, burn out of starches also occurred below 1200° C., which left distinguishable pores (e.g., having larger median pore sizes) at the locations of starch burn out visible in the corresponding examples of FIGS. 13A-13D. In general, for all of the analyzed green agglomerate Examples, there were no other significant microstructural changes compared to the green agglomerates until approximately temperatures at or above 1200° C.

Reactions towards formation of cordierite generally started above 1200° C. under formation of larger pores and interconnected pore channels. As noted herein, the formation of a ceramic shell (e.g., due to the migration of fine green particles toward the external surface of the green agglomerates during drying) assisted in preventing shrinkage of the beads during firing. As a result, instead of undergoing densification, porosity within the beads generally coarsened (enlarged) with increasing temperatures from between about 1200° C. to about 1300° C. or 1400° C., such that larger, interconnected pore channels initially developed over the temperature range shown for many of the examples in FIGS. 13A-13D. However, as further described herein, as temperature increased, diffusional transport and viscous flow of glass or liquid can take place for some examples in the time frames used for firing (e.g., eight hours or less), which caused densification of the porous sphere into a dense sphere under shrinkage.

Fired cordierite beads made from green agglomerates that comprised starch (e.g., beads from Examples A6, A15, and A16) initially showed the presence of relatively larger pores in the range of 1200° C. to 1250° C. The fraction of those larger pores increased with the starch fraction, see beads made from Examples A6 and A15 for example. The size of the pores can also be influenced by the type of the starch. For example, rice starch (Examples A6 and A15) has smaller particles than corn starch (Example A16), and thus produces beads with generally smaller pores during starch burn out.

At temperatures around 1300° C., porosity starts to decrease in some types of the particles, while it is preserved in others up to about 1400° C. For example, cordierite beads made from green agglomerate powder Example A1 significantly preserved high open porosity until 1410° C. with only minor densification. In comparison, cordierite beads formed from green agglomerate powder example A2, which exhibited a thick outer layer of fine particles forming the green shell 132, described above, developed the hard ceramic shell 133 during firing, yielding only a very low level of open porosity. At 1300° C., beads formed from green agglomerate Example A2 began to significantly shrink, densify, and sinter together. Beads formed from green agglomerate powder Example A6 (which comprises starch) had more porosity than the starch-free examples (e.g., Example A1), but also exhibited an earlier sintering onset that drove the formation of increasingly larger pores at or above 1350° C. Porosity and pore size of beads made from green agglomerate Example A15 appeared significantly consistent with those made from Examples A1 and A6 across the illustrated temperature range of FIGS. 13A-13B. Beads made from green agglomerate powder example A16 exhibited a high open porosity with large pores due to presence of corn starch, with porosity and pore channels remaining significantly stable up to 1410° C. While beads made from green agglomerate powder Example A7 initially had microstructures comparable to those made from green agglomerate powder Example A2 (which had a similar slurry mixture as example A7), starting at around 1300° C., the beads resulting from Example A7 became increasingly densified. Beads resulting from green agglomerate Example A7 thus provide an example of spherical, dense particles after firing at higher temperatures (e.g., about 1300° C.).

The ceramic phases present in the fired powders were identified by X-ray diffraction (XRD). A Bruker D4 diffraction system equipped with a multiple strip LynxEye high speed detector was utilized. It was generally found, regardless of green agglomerate Example used, that the amorphous (glassy) content decreased quickly during firing between 950° C. and 1150° C., and then stabilized at around 10 wt % glass for firing at 1250° C. and above with subsequent cooling. In-situ XRD showed that the amorphous/glass phase can reach up to 50% at intermediate calcining steps for some compositions. The measured amount of glass in the calcined powders frequently depends on the cooling rate of the powders. For quenched powders, we observed for firing <1350C, up to 30% amorphous/glass, while for powders that were slowly cooled, the glass amount was less than 7%. Cordierite (including polymorph indialite) formation onset temperature was from about 1200° C. to 1250° C. Secondary phases and their exact quantities may vary for the beads 122 made from each green agglomerate powder, and may be the result of the raw material impurities and/or stoichiometry. The secondary phases include sapphirine, mullite, spinel, pseudobrookite, or others.

Table 8 provides example ceramic phase compositions that resulted for the beads produced at the two highest firing temperatures of Tables 7A-7D (1380° C. and 1410° C.). Blanks in Table 8 indicate that the data was incomplete or unavailable. Only phases of cordierite (with its polymorph indialite), sapphirine, and spinel are shown in Table 8. As indialite is polymorph of cordierite, any general reference to the amount of "cordierite" herein includes the sum of both the cordierite and indialite phases. Rietveld refinement was used for quantification of the phase contributions, which typically only included the crystalline phases (no glass). An estimate of the glass phase is provided based on a fit of the amorphous background, thus with an understanding that the estimates of glass levels may have a higher error bar than the crystalline phases.

TABLE 8

Ceramic Bead Porosity Characteristics and Phase Compositions

| Green Agglomerate Example Used | Bead Firing Conditions Temp. (° C.) | Time (hr) | Intrabead Porosity (% relative individual bead volume) | Intrabead median Pore Size (μm) | Glass (wt %) | Cordierite Cordierite (wt %) | Indialite (wt %) | Sapph. (wt %) | Spinel (wt %) |
|---|---|---|---|---|---|---|---|---|---|
| A1 | 1380 | 8 | 30.0 | 2.1 | 13.11 | 64.18 | 17.4 | 1 | 0.5 |
| | 1410 | 8 | 31.4 | 2.5 | 9.08 | 76.53 | 11.7 | 0 | 0 |
| A2 | 1380 | 8 | 12.9 | 3.2 | 14.84 | 62.34 | 13.7 | 6.6 | 2.3 |
| | 1410 | 8 | 11.9 | 3.2 | 6.34 | 76.04 | 11 | 5.3 | 1.3 |
| A3 | 1380 | 8 | 23 | 2.6 | 13.35 | 64.83 | 18.7 | 0 | 0 |
| | 1410 | 8 | 23.5 | 2.9 | 7.82 | 76.62 | 12.2 | 0 | 0 |
| A4 | 1380 | 8 | 19.1 | 3.3 | 13.35 | 64.83 | 18.7 | 0 | 0 |
| | 1410 | 8 | 16.5 | 3.3 | 7.39 | 74.78 | 11 | 5.8 | 1 |
| A5 | 1380 | 8 | 2.9 | 3.3 | 12.76 | 68.89 | 10 | 6 | 2.4 |
| | 1410 | 8 | 3 | 3.3 | 6.72 | 76.75 | 10.3 | 4.6 | 1.7 |
| A6 | 1380 | 8 | 23.2 | 2.5 | 16 | 75 | 4 | 3 | 0.3 |
| | 1410 | 8 | 24.4 | 3 | 9.8 | 64 | 21 | 1.2 | 0.1 |
| A7 | 1380 | 8 | 9.9 | 3.2 | 8.09 | 73.9 | 8.9 | 4.5 | 3.7 |
| | 1410 | 8 | 8 | | 6.71 | 60.38 | 27.5 | 1.9 | 3.6 |
| A8 | 1380 | 8 | 39.1 | 1.8 | 8.43 | 83.91 | 3.4 | 0.6 | 0 |
| | 1410 | 8 | 37.7 | 2.1 | 7.85 | 84.84 | 3.3 | 0.3 | 0 |
| A9 | 1380 | 8 | 24.2 | | 6.07 | 82.75 | 4.5 | 1.5 | 1.4 |
| | 1410 | 8 | 6 | 4.7 | 8.62 | 84.58 | 2.9 | 0.5 | 0.3 |
| A10 | 1380 | 8 | 23.6 | 1.5 | 6.74 | 42.05 | 5.6 | 5.5 | 18.5 |
| | 1410 | 8 | 18.4 | 1.8 | 9.17 | 50.43 | 17.9 | 3.3 | 9.5 |
| A11 | 1380 | 8 | 34.8 | 1.8 | 12.85 | 80.73 | 3.8 | 0.9 | 0 |
| | 1410 | 8 | 37 | 2.2 | 11.39 | 82.56 | 3.7 | 0.6 | 0 |
| A12 | 1380 | 8 | 17.4 | 2.7 | 10.22 | 79.43 | 3.2 | 2.4 | 0.2 |
| | 1410 | 8 | 10.8 | 2.9 | 8.85 | 82.37 | 3.2 | 1.4 | 0.2 |
| A13 | 1380 | 8 | 16.4 | 2.3 | 6.58 | 77.99 | 5.9 | 2.8 | 0.4 |
| | 1410 | 8 | 18.3 | 2.5 | 5.25 | 86.24 | 2.9 | 1.3 | 0.2 |
| A14 | 1380 | 8 | 7.4 | | 8.36 | 68.6 | 8.4 | 8.8 | 3.7 |
| | 1410 | 8 | 9.3 | 3.2 | 10.38 | 56.75 | 25.4 | 5.4 | 1.8 |
| A15 | 1380 | 8 | 32.5 | 2.3 | 4.1 | 86 | 5.9 | 1.1 | 0.2 |
| | 1410 | 8 | 29.9 | 2.7 | 5.2 | 86 | 4.5 | 0.7 | 0.1 |
| A16 | 1380 | 8 | 36.5 | 4.9 | 5 | 84 | 5.8 | 1.1 | 0.3 |
| | 1410 | 8 | 37.3 | 5.6 | 6.2 | 86 | 4.5 | 1.5 | 0.1 |
| A17 | 1380 | 1 | | | 12 | 76 | | 6.1 | 1 |
| | 1410 | 1 | 22.6 | 2.6 | 16 | 85 | | 0 | 0 |
| A18 | 1380 | 1 | | | | 8.1 | | | |
| | 1410 | 1 | 0 | 0 | | 54 | | | |
| A19 | 1380 | 1 | 0 | 0 | 22 | 12 | | | |
| | 1410 | 1 | 0 | 0 | 42 | 15 | | | |

Examples A18 and A19 were highly under-reacted after the firing conditions given in Tables 7A-7D and 8, leading to the failure to develop any significant porosity upon firing and high levels of cristobalite, quartz, alumina, spinel, and sapphirine. As a result, some compositions (such as Examples A18 and A19) may require very high temperatures and/or significantly longer hold times to form cordierite. For example, much longer firing times, e.g., up to 15 h or even 20 h could be required to complete reaction of the reactive ceramic precursors in Examples such as A18 and A19. Most clay, talc or clay-talc derived mixtures transformed readily into cordierite under the conditions of Tables 7A-7D and 8, thereby transforming into porous cordierite beads. Only a few Examples, see for Example A2, developed a porous structure that was not an open porosity (i.e., a closed porosity, which was not visible based on MIP data, but was identified from a combination of SEM and tomography data analysis).

Ceramic beads formed having high percentages of cordierite phase showed consistently higher open porosities at all tested temperatures. In other words, the high-percentage cordierite composition beads were generally not as sensitive to firing temperature (i.e., generally exhibited a high resistance to densification even at higher temperatures), while the lower-cordierite beads were more highly sensitive to densification at higher temperatures. In this way, green agglomerate powders that result in higher percentages of cordierite phase are advantageous in some embodiments to ensure that the beads can be fully reacted. Fully reacted beads may be particularly advantageous to enable higher temperature firing of final ceramic honeycomb bodies 100 without densification of the beads during the final honeycomb body firing. In some embodiments, the beads 122 comprise at least 75 wt %, at least 80 wt %, or even at least 85 wt % cordierite (again, inclusive of the wt % indialite).

Firing was also conducted for the green agglomerate powder examples at very slow heating rates (10° C./h to 20° C./h) and the resulting differential scanning calorimetry (DSC) results were analyzed. At relatively low temperature (e.g., between about 250° C. and 450° C.), binder/dispersant burn-out was observed. The main mass release for most green agglomerate powders was observed at about 400° C. In the temperature range of about 400° C. to about 1000° C., decomposition reactions of hydroxides and carbonates were observed, as water and/or $CO_2$ were being released. Hydrated raw materials include hydrated alumina, magnesium hydroxide, clay, and talc. During slurry preparation and spraydrying, the bonded water is significantly or even fully preserved, so that the spraydried green agglomerate powders contain the hydrated compounds. The decompositions of these components are observable as endothermic reactions. Decomposition of hydrated alumina was observed about 300° C., magnesium hydroxide at about 400° C., clay dehydration at about 520° C., and talc dehydration at about 920° C., although the water loss temperatures can be shifted due to batch interactions.

Various mechanisms were investigated for their effect on establishing and maintaining a high open porosity during firing. In a first investigation, DSC was used to identify water and $CO_2$ release event in the spraydried agglomerates. The effects of the release of water, CO, and/or $CO_2$ during decomposition of the hydrated species and carbonates was then correlated with porosity data of the partially fired agglomerates to see step-changes in porosity evolution in the beads that are correlated to the water or $CO_2$ loss, e.g., to see if the formation of water vapor or other gas bubbles lead to the formation of high intrabead porosity. It was found that high water loss at comparatively high, intermediate, or low top firing temperatures was not a driver for the formation of intrabead porosity during firing of the green agglomerate Examples. Similar results were found regardless of carbonate level in the green agglomerate powder used. Ultimately, no correlation was found between water or other gas releasing raw materials (e.g., carbonates) in the green agglomerate powders and the development of intrabead porosity.

In a second investigation, it was assessed whether intermediate glass or liquids were contributing to or inhibiting the development of intrabead porosity during firing. In-situ X-ray diffraction (XRD) and DSC were used to identify the glass formation onset temperature in some green agglomerate powder examples as indicated in the Tables. The slurry mixtures used to make these agglomerate powders included various raw material combinations and compositions with and without sodium (Na) addition. DSC and in-situ XRD showed that partial melting in the temperature range of 1265° C.-1300° C. was not necessarily related to final intrabead porosities. Limited to no impact was found from the addition of sodium in Examples A2 and A3 compared to sodium-free A1 and A4, and a comparatively earlier onset of glass formation. A significant correlation was not found between the formation of glass/liquid and the intrabead porosity. Modification of firing cycles around the glass formation threshold for various green agglomerate powders was also found to not impact the development of intrabead porosity.

In a third investigation, a clear correlation was discovered between the poor (low density) particle packing of platy raw materials (e.g., talc) and development of intrabead porosity during firing. However, it was found to be insufficient to merely have large, platy raw materials. Use of overly large platy raw materials led in some cases to fired beads that were no longer spherical, and/or that fractured into segments (e.g., beads made from agglomerate Example A7, formed from a clay-silica-alumina-talc mixture that contained 15% of large talc, and beads made from agglomerate Example A12, formed from a clay and $Mg(OH)_2$ mixture that also comprised large talc particles. In some embodiments, the maximum dimension of the platy raw materials is within at most 40%, at most 35%, at most 30%, or even at most 25% of the median particle size of the fired beads. For example, platy raw materials having a median particle size of at most about 10 μm were found to be suitable for beads in the range of about 30 μm to 40 μm in median particle size, but not for beads of smaller median bead (particle) size. Additionally, high levels of platy raw materials did not necessarily promote formation of intrabead porosity during firing, as some beads fired from green agglomerates comprising a high-talc slurry mixture (e.g., beads made from green agglomerate Examples A17 and A18) preserved a blocky shape and did not develop any intrabead porosity. As described herein above, in general the use of magnesium hydroxide, and in particular high levels of magnesium hydroxide (e.g., as the only magnesia source) promoted formation of high open intrabead porosity.

Shrinkage of the spraydried green particles during firing by sintering and/or solid state reaction was also avoided by addition of a sufficient fraction of fine particle to the slurry from which the green agglomerates are made. As described with respect to FIG. 10, outward migration of the fine particles as a result of drying during formation of the green agglomerates resulted in formation of the green shell 132, which upon firing converted into the ceramic shell 133. The shell of fine particles can be made sufficiently thick to rigidify the spherical particle and thereby protect it from shrinkage during sintering and solid state reaction, which assists in preserving the size and porosity of the beads during high temperature firing. However, as shown with respect to beads created from the green agglomerate powder Example A2, overly thick shells of the fine particles may promote sintering, densification, and/or high closed porosity.

Table 9 shows some representative firing conditions that were useful for fully reacting various green agglomerate powders, although other conditions are possible as described herein.

TABLE 9

| Example Firing Conditions for Obtaining Fully Reacted Beads | | | | | |
|---|---|---|---|---|---|
| Example Cordierite Bead No. | Green Agglomerate Powder | Furnace Type(s) | Ramp Rate (° C./h) | Top Temperature (° C.) | Top Soak Time (hours) |
| B1 | A1 | Tray, Rotary | 150 | 1380 | 8 |
| B2 | A2 | Tray, Rotary | 150 | 1365 | 8 |
| B3 | A3 | Tray, Rotary | 150 | 1380 | 8 |
| B4 | A4 | Tray, Rotary | 150 | 1365 | 8 |
| B6 | A6 | Tray | 150 | 1380 | 8 |
| B8 | A8 | Tray, rotary | 150 | 1410 | 8 |
| B15 | A15 | Tray | 150 | 1380 | 8 |
| B16 | A16 | Tray | 150 | 1380 | 8 |
| B17 | A17 | Tray, Rotary | 150 | 1350 | 6 |
| B18 | A18 | Rotary | 150 | >1415 | >8 |
| B19 | A19 | Tray, Rotary | 150 | >1415 | >8 |
| B20 | A20 | Tray, Rotary | 150 | 1380 | 8 |

As evidenced by Table 9, it was possible to transform powders of many of the green agglomerate powders into cordierite beads using firing cycles with heating rates of approximately 150° C./h, top temperatures between about 1350° C. and 1415° C., and/or hold times between 6-8 hours (although). In some embodiments the heating rates range from 100° C./h to 200° C./h, although other suitable rates are possible. Green agglomerates comprising both spinel and silica were shown to benefit from generally higher temperatures and/or longer hold times to achieve full reaction. Powders with talc, clay, and hydrated alumina constituents converted at generally lower top temperatures and/or shorter hold times, e.g., 1350° C.-1380° C. in 4-6 hours. A continuous rotary calciner was also able to successfully react the green agglomerates and create high percentages of cordierite at these temperatures with soak times of as short as 20 minutes to 1 hour.

In general, it was found that heating rates below 200° C./h up to the top temperature (e.g., to temperatures of at least 1250° C.) enabled the formation of fully reacted ceramic beads, while preserving the porous structure of the beads. Higher heating rates, e.g., of 300° C./h to the top temperature (e.g., to temperatures of at least 1250° C.) were found to lead to an increased loss of the porosity in the beads. Without wishing to be bound by theory, it is believed that the densification at higher heating rates may be due to significant glass formation and accelerated sintering and reactions. In some embodiments, top temperatures of at least 1100° C., at least 1200° C., at least 1250° C., or at least 1300° C. are suitable. In some embodiments, hold times between about 4 and 12 hours are suitable.

Table 10 shows values of d10, d50, d90, d90-d10, and (d90-d10)/d50 that were obtained for cordierite beads formed from various green agglomerate powders of Table 5 fired according to the conditions of Table 9. Multiple runs were made for some of the Examples to illustrate that there will be some variation in the properties of cordierite beads made from the same or similar green agglomerate powders under the same or similar firing conditions.

TABLE 10

| Particle Size Distributions for Cordierite Beads | | | | | | | | |
|---|---|---|---|---|---|---|---|---|
| Example | Chamber | | | | Cyclone | | | |
| Cordierite Bead No. | d10 (μm) | d50 (μm) | d90 (μm) | (d90 − d10)/d50 | d10 (μm) | d50 (μm) | d90 (μm) | (d90 − d10)/d50 |
| B1 | 27.68 | 40.28 | 60.56 | 0.816 | 10.88 | 26.24 | 45.91 | 1.335 |
| B1 | 25.42 | 35.35 | 51.43 | 0.736 | 7.57 | 21.89 | 39.14 | 1.442 |
| B1 | 25.22 | 36.01 | 53.51 | 0.786 | 7.4 | 21.88 | 38.8 | 1.435 |
| B1 | 28 | 40.1 | 59.52 | 0.786 | 8.71 | 23.82 | 43.12 | 1.445 |
| B1 | 23.24 | 33.09 | 49.32 | 0.788 | 4.87 | 16.91 | 33.55 | 1.696 |
| B1 | 23.38 | 33.37 | 49.93 | 0.796 | 4.91 | 19.33 | 36.11 | 1.614 |
| B1 | 26.64 | 39.04 | 58.8 | 0.824 | 9.46 | 24.11 | 42.92 | 1.388 |
| B1 | 27.21 | 39.16 | 58.14 | 0.79 | 8.21 | 22.07 | 40.29 | 1.454 |
| B1 | 29.26 | 42.09 | 62.3 | 0.785 | 2.3 | 4.02 | 7.59 | 1.316 |
| B1 | 28.99 | 41.03 | 60.05 | 0.757 | 11.2 | 25.02 | 43.35 | 1.285 |
| B2 | 28.86 | 42.34 | 64.68 | 0.846 | 10.43 | 22.8 | 43.2 | 1.437 |
| B2 | 26.24 | 38.86 | 59.52 | 0.856 | 9.64 | 20.79 | 38.35 | 1.381 |
| B2 | 25.9 | 36.36 | 53.49 | 0.759 | 11.23 | 22.33 | 38.59 | 1.225 |
| B2 | 30.94 | 45.85 | 73.25 | 0.923 | 12.92 | 26.84 | 48.2 | 1.314 |
| B3 | 26.86 | 37.43 | 54.34 | 0.734 | 7.26 | 20.04 | 36.29 | 1.449 |
| B4 | 30.13 | 44.94 | 69.3 | 0.872 | 12.8 | 24.44 | 43.3 | 1.248 |
| B6 | 27.78 | 39.59 | 58.26 | 0.77 | 10.57 | 24.52 | 43.53 | 1.344 |
| B17 | 31.52 | 48.12 | 75.47 | 0.913 | 9.04 | 32.37 | 57.83 | 1.507 |
| B18 | 23.19 | 34.12 | 51.74 | 0.837 | 3.99 | 12.33 | 28.86 | 2.017 |
| B19 | 23.01 | 33.63 | 50.6 | 0.82 | 9.59 | 20.43 | 38.3 | 1.405 |
| B19 | 29.21 | 44.08 | 66.58 | 0.848 | 11.91 | 26.17 | 51.47 | 1.512 |
| B19 | 24.5 | 35.74 | 53.74 | 0.818 | 9.7 | 20.76 | 39.55 | 1.438 |
| B19 | 31.3 | 45.84 | 69.38 | 0.831 | 11.98 | 24.26 | 46.24 | 1.412 |
| B19 | 29.41 | 43.52 | 65.2 | 0.822 | 11.56 | 23.59 | 44.68 | 1.404 |

TABLE 10-continued

Particle Size Distributions for Cordierite Beads

| Example | Chamber | | | | Cyclone | | | |
|---|---|---|---|---|---|---|---|---|
| Cordierite Bead No. | d10 (μm) | d50 (μm) | d90 (μm) | (d90 − d10)/d50 | d10 (μm) | d50 (μm) | d90 (μm) | (d90 − d10)/d50 |
| B19 | 25.75 | 36.74 | 55.03 | 0.797 | 12.06 | 24.04 | 41.09 | 1.208 |
| B19 | 26.98 | 38.45 | 56.61 | 0.771 | 12.02 | 24.2 | 42.99 | 1.28 |
| B20 | 25.23 | 36.29 | 53.92 | 0.791 | 9.33 | 24.22 | 42.99 | 1.39 |
| B20 | 29.1 | 42.42 | 63.45 | 0.81 | 9.69 | 25.29 | 47.67 | 1.502 |

Green agglomerate powder Examples A1, A2, A3, A4, A6, and A17 successfully produced Example cordierite beads B1, B2, B3, B4, B6, and B17, respectively, as porous cordierite beads having high open porosities. However, the Example cordierite beads B18, B19, and B20 produced respectively from green agglomerate powder Examples A18, A19, and A20 were all highly dense cordierite beads having low open porosity.

The evolution of cordierite beads made from some of the green agglomerate powder Examples during firing was described above with respect to Tables 7A-7D and FIGS. 13A-13D. Relatedly, cordierite beads B1, B2, B6, and B17 had microstructures corresponding to those made from the same green agglomerate Example at the corresponding temperature in the evolution of Tables 7A-7D and FIGS. 13A-13D. For example, beads B1 (which from Tables 7A-7D was formed by firing green agglomerate Example A1 at a top temperature of 1380° C.), had a microstructure corresponding to the same stage of evolution as green agglomerate Example A1 fired at top temperature 1380° C. in FIG. 13B. Thus, in accordance with the above description of FIGS. 13A-13D, cordierite bead Example B1 exhibited large open porosity and narrow interconnected open pore channels (e.g., akin to representative beads 122A and/or 122B of FIGS. 9A and/or 9B), while cordierite beads B6, B15, and B16 exhibited large open, interconnected porosity and large interconnected open pore channels (e.g., akin to representative bead 122C of FIG. 9C). Cordierite bead example B2, corresponding to a stage of evolution of green agglomerate powder Example A2 between 1350° C. and 1380° C. of FIG. 13B, exhibited a thick outer ceramic shell with high intrabead porosity, but low interconnectivity and low intrabead pore access (e.g., few or none of the openings 126).

The powders of fired cordierite beads made from green agglomerate powder Examples A1-A20 were characterized by SEM and image analysis for the sphericity. The bead sphericity for the spraydried beads was determined to be greater than 0.9 on a scale ranging from 0 (infinitely long rods or plates) to 1 (perfect spheres), obtained by SEM image analysis as the aspect ratio between minimum and maximum bead dimensions. Additionally, Table 11 shows circularity and mean roundness values calculated for a representative sampling of cordierite beads made from green agglomerate Examples A1, A8, A10, A11, and A12, as indicated.

TABLE 11

Circularity and Mean Roundness of Calcined Cordierite Beads

| Green Agglomerate Powder Example Used to Make Beads | Firing Temperature/Hold Time | Circularity | Mean Roundness |
|---|---|---|---|
| A1-10 | 1380° C./8 h | 0.95 | 0.85 |
| A1-10 | 1380° C./8 h | 0.96 | 0.88 |
| A1-10 | 1380° C./8 h | 0.95 | 0.83 |
| A10 | 1380° C./8 h | 0.97 | 0.86 |
| A11 | 1380° C./8 h | 0.94 | 0.81 |
| A8 | 1380° C./8 h | 0.96 | 0.84 |
| A8 | 1410° C./8 h | 0.96 | 0.85 |
| A12 | 1380° C./8 h | 0.94 | 0.82 |

Circularity in Table 11 was calculated as $$\frac{\text{circumference of circle with same area as bead}}{\text{cross-sectional perimeter of filled bead}}$$

and roundness was calculated as $$\frac{\text{diameter of circle with same area as bead}}{\text{largest cross-sectional dimension (diameter) of bead}}.$$

For circularity, the two variables were determined as the average of all beads in an analysis of SEM images of the representative powder sample. For roundness, the values were calculated by first measuring the largest dimension of each bead to individually calculate a roundness for each bead, and then averaging the individually recorded roundness values to produce the mean roundness values in Table 11.

In addition to high open porosities, the ceramic beads 122 disclosed herein can have high internal surface areas. High internal surface area provides particular advantages in some applications for the honeycomb bodies 100, such as when the honeycomb body is arranged as a particulate filter or catalyst support. As described herein, the high surface area may be particularly advantageous when the beads 122, having high internal surface area and high open intrabead porosity, are paired with the interbead porosity created by the interstices 128 when the beads 122 are sintered into the network 120.

Tomograms of the material of the beads were produced and analyzed to further evaluate properties of the beads 122, such as the intrabead surface area (i.e., the surface area of the pore structures 124 internal to each bead 122). The intrabead median pore size and closed intrabead porosity were also estimated. The internal pore structures and outer surface of representative samples of the beads were analyzed to estimate an external or outer surface area of the outer surface of the beads and the internal or intrabead surface area within the beads. Tables 12A and 12B provide the slurry mixture Example and firing conditions used to create the beads in the representative powder samples analyzed, as well as the median green agglomerate size corresponding to each analyzed powder sample. The surface areas in Table 12B were derived from single point or Brunauer-Emmett-Teller (BET) methodologies, as indicated. The internal surface area was also evaluated in Table 12A as to whether it was contributed by open or closed pore structures. Table 12A lists the ratio of total internal to external bead surface area and also the ratio for open internal surface area to external bead surface area. The estimated extra surface area calculated in Table 12B was determined by subtracting the estimated outer surface area (thus corresponding to the approximate total surface area of a dense bead) from the BET surface area of the porous beads (which have both an outer surface area and the internal surface area attributable to the open porosity). For example, the outer surface area of a bead can be estimated by approximating the bead as sphere. Since smaller beads have less volume in which to form surface area, the estimated extra surface area was also normalized to the size of the beads by dividing the extra surface area by the median agglomerate size for each bead in Table 12B.

Tomography data was useful for identifying trends, but not the precise values, since the tomography resolution used (0.3 μm/voxel) does not allow to account for pores and channels smaller than about 0.6 μm. Table 13B lists both BET multi-point and single point surface area measurements for various ceramic beads. BET measurements have the advantage to include even smallest pore channels and therefore have better precision; however, they provide only the total overall surface area of intrabead and outside bead surface area. However, the trends of both measurements were in agreement (and also in agreement with the simple model of Table 13, described below), for example, showing that beads made from agglomerates A1 and A8 have significant contributions of intrabead surface area compared to beads made from agglomerates A2, A12, and A13. It was also evidenced that relatively smaller beads made from agglomerate Examples A1 (e.g., median particle size of about 18 μm) have substantially less surface area than the relatively larger (e.g., 30-35 μm) median particle size beads made from the same agglomerate Examples A1.

In some embodiments, the ratio of the open intrabead surface area to outer surface area of the porous ceramic beads is at least 5:1, at least 6:1, at least 7:1, at least 8:1, at least 9:1, or even at least 9.5:1, including any range including these ratios as end points, such as from 5:1 to 10:1, from

TABLE 12A

Surface Areas of Bead Powder Sample By Tomography

| Green Agglomerate Used to Form Cordierite Beads | Nominal Median Green Agglomerate Size | Firing: Top Temp. and Hold Time | Tomogram-Derived Open Intrabead Porosity (relative to individual bead volume) | Tomogram-Derived Closed Intrabead Porosity (relative to individual bead volume) | Tomogram-Derived Intrabead median Pore Size (μm) | Tomogram-Derived Estimated Ratio of Total Open and Closed Intrabead Surface Area to Outer Bead Surface Area | Tomogram-Derived Estimated Ratio of Open Intrabead Surface Area to Outer Bead Surface Area |
|---|---|---|---|---|---|---|---|
| A1-10 | 30.01 μm | 1410° C./4 h | 38.50% | <2.5% | 1.8 | 9.1 | 9 |
| A1-15 | 28.29 μm | 1410° C./4 h | 38.50% | <2.5% | 1.8 | 9.1 | 9 |
| A1-10 | 27.21 μm | 1410° C./4 h | 38.50% | <2.5% | 1.8 | 9.1 | 9 |
| A8 | 43.98 μm | 1410° C./8 h | 32.80% | <2.5% | 3.3 | 9.7 | 9.5 |
| A8 | 41.01 μm | 1410° C./8 h | 32.80% | <2.5% | 3.3 | 9.7 | 9.5 |
| A8 | 32.73 μm | 1410° C./8 h | 32.80% | <2.5% | 3.3 | 9.7 | 9.5 |
| A2 | 53.31 μm | 1380° C./10 h | 16.10% | 33% | 4.4 | 6.2 | 4.1 |

TABLE 12B

Surface Areas of Ceramic Bead Powder Sample By BET

| Green Agglomerate Used to Form Cordierite Beads | Nominal Median Green Agglomerate Size | Firing Conditions: Top Temp. and Hold Time | BET (multi-point) Surface Area ($m^2/g$) | Single Point Surface Area ($m^2/g$) | Estimated Extra Surface Area Compared to Dense Bead ($m^2/g$) | Estimated Extra Surface Area Compared to Dense Bead and Normalized to Median Agglomerate Size (($m^2/g$)/(μm)) |
|---|---|---|---|---|---|---|
| A1 | 35 μm | 1410° C./8 h | 0.7756 | 0.7448 | 0.7056 | 2.02E−02 |
| A1 | 30 μm | 1410° C./8 h | 0.67 | 0.6382 | 0.6457 | 2.15E−02 |
| A1 | 18 μm | 1410° C./8 h | 0.4379 | 0.3992 | 0.3179 | 1.77E−02 |
| A8 | 45 μm | 1410° C./8 h | 0.6795 | 0.6582 | 0.6195 | 1.38E−02 |
| A8 | 25 μm | 1410° C./8 h | 0.3819 | 0.3582 | 0.3019 | 1.21E−02 |
| A13 | 28 μm | 1410° C./8 h | 0.5053 | 0.4689 | 0.4253 | 1.52E−02 |
| A2 | 50 μm | 1380° C./10 h | 0.4035 | 0.3779 | 0.3635 | 7.27E−03 |
| A12 | 38 μm | 1410° C./8 h | 0.3128 | 0.2867 | 0.2528 | 6.65E−03 |
| A12 | 38 μm | 1380° C./8 h | 0.3331 | 0.307 | 0.2731 | 7.19E−03 |

5:1 to 9.5:1, from 5:1 to 9:1, from 6:1 to 10:1, from 6:1 to 9.5:1, from 6:1 to 9:1, from 7:1 to 10:1, from 7:1 to 9.5:1, from 7:1 to 9:1, from 8:1 to 10:1, from 8:1 to 9.5:1, from 8:1 to 9:1, from 9:1 to 10:1, from 9:1 to 9.5:1, or even from 9.5:1 to 10:1. In some embodiments, the closed porosity of the porous ceramic beads is at most 5%, at most 4%, at most 3%, or even at most 2.5%, including ranges with these values as end points, such as from 0% to 5%, from 0% to 4%, from 0% to 3%, or from 0% to 2.5%.

It can be seen that beads made from slurry mixture Examples S1 and S8 have very high relative internal to external surface areas, attributable to the relatively small median pore sizes and high open porosities. Due to the small amount of closed porosity in the beads made from slurry mixture Examples S1 and S8, the calculated surface area ratios are significantly unchanged for high-open porosity beads, such as those made from green agglomerate Examples A1 and A8, when the surface area due to closed porosity is excluded. In comparison, the beads made from green agglomerate Example A2 (slurry mixture S2) had a relatively high closed porosity (e.g., due to the formation of the ceramic shell 133 as described herein) and large median pore size. As a result, the analyzed sample made from slurry mixture S2 shows only internal surface six times as much as the external bead surface area, which is further reduced to a ratio of four times when closed porosity is excluded. In general, the internal surface area decreases as the number of pores decreases and the size of the pores increases, while the open internal surface area decreases with respect to increasing closed porosity.

As described above, there are tradeoffs when considering either tomography-derived and BET surface area values. To further identify and evaluate trends, a simple model was also developed to experimentally verify the observations from the other techniques. As such, the values of the simple model given in Table 13 are not expected to generate accurate predictions for any given scenario, but instead to provide insight when considering trends among the various scenarios.

According to the simple model, a simple approximation can be calculated from the surface area of the bead ($SB=4\pi r^2$), the volume of the bead $$\left(VB = \frac{4}{3}\pi r^3\right),$$

the volume of pores/channels in the bead (VP=% P*VB), the volume of pores/channels in the bead $$\left(V_{ch} = \pi L\left(\frac{D_{50}}{2}\right)^2\right),$$

the average surface area of each pore/channel in the bead $$\left(S_{ch} = 2\pi L\left(\frac{D_{50}}{2}\right)\right),$$

the number of pores/channels in the bead $$\left(N_{ch} = \frac{VP}{V_{ch}}\right),$$

and the total surface area of all pores/channels ($SN_{ch}=N_{ch}*S_{ch}$) to obtain the approximate total surface area of the bead ($S=SN_{ch}+SB$), where r is ½ the median particle size (d50) of the bead, % P is the porosity of the bead, L is the average length of the pores/channels through the bead, and $D_{50}$ is median diameter of the pores/channels. Furthermore, the BET can be estimated from the model by $$\frac{SN_{ch} + SB}{\rho * VB * (1 - \%\ P)},$$

where ρ is the density of the ceramic material. Table 13 summarizes model calculations, showing the effect of changing input values for r, % P, and median pore size (D50) on the internal/external surface area ratio and estimated BET value. For Table 13 it is assumed that p is 2.52 g/cm³ and that the pores/channels extend through the entire bead, thus assuming L on average is equal to r.

TABLE 13

Bead Internal and External Surface Area Model Calculations

| Variable | | Case 1 | Case 2 | Case 3 | Case 4 | Case 5 | Case 6 | Case 7 | Case 8 | Case 9 |
|---|---|---|---|---|---|---|---|---|---|---|
| ½ Median Particle Size | input r (μm) | 15 | 15 | 15 | 15 | 15 | 15 | 15 | 10 | 20 |
| Porosity | input % P (%) | 20 | 10 | 0 | 30 | 40 | 20 | 20 | 20 | 20 |
| Median Pore Size | input $D_{50}$ (μm) | 1 | 1 | 1 | 1 | 1 | 2 | 5 | 1 | 1 |
| External Surface Area | SB ($\mu m^2$) | 2790 | 2790 | 2790 | 2790 | 2790 | 2790 | 2790 | 1240 | 4960 |
| Bead Volume | VB ($\mu m^3$) | 13950 | 13950 | 13950 | 13950 | 13950 | 13950 | 13950 | 4133 | 33067 |
| Porosity Volume | VP ($\mu m^3$) | 2790 | 1395 | 0 | 4185 | 5580 | 2790 | 2790 | 827 | 6613 |
| Average Channel Volume | $V_{ch}$ ($\mu m^3$) | 12 | 12 | 12 | 12 | 12 | 47 | 294 | 8 | 16 |
| Average Channel Surface Area | $S_{ch}$ ($\mu m^2$) | 47 | 47 | 47 | 47 | 47 | 94 | 236 | 31 | 63 |
| Number of Channels | $N_{ch}$ | 240 | 120 | 0 | 360 | 480 | 60 | 10 | 107 | 427 |
| Internal Surface Area | $SN_{ch}$ ($\mu m^2$) | 11304 | 5652 | 0 | 16956 | 22608 | 5652 | 2261 | 3349 | 26795 |
| Total Surface Area | $SN_{ch}$ + SB ($\mu m^2$) | 14094 | 8442 | 2790 | 19746 | 25398 | 8442 | 5051 | 4589 | 31755 |

TABLE 13-continued

Bead Internal and External Surface Area Model Calculations

| | Variable | Case 1 | Case 2 | Case 3 | Case 4 | Case 5 | Case 6 | Case 7 | Case 8 | Case 9 |
|---|---|---|---|---|---|---|---|---|---|---|
| Internal to External Surface Area Ratio | $(SN_{ch} + SB)/SB$ | 5.1 | 3.0 | 1.0 | 7.1 | 9.1 | 3.0 | 1.8 | 3.7 | 6.4 |
| Model Estimated BET | $(SN_{ch} + SB)/(\rho*VB*(1 - \% P))$ | 0.50 | 0.27 | 0.08 | 0.80 | 1.20 | 0.30 | 0.18 | 0.55 | 0.48 |
| Estimated BET for Dense Bead | SB/VB | 0.08 | 0.08 | 0.08 | 0.08 | 0.08 | 0.08 | 0.08 | 0.12 | 0.06 |

Alternate methods of forming spheroidal ceramic beads (other than by spraydrying) were also explored. In one experiment, the same slurry mixtures used in spraydrying (i.e., Examples S1-S20) were dried in an oven, on a heating plate, and/or in a microwave, and the resulting cake broken into a powder by milling and/or sieving. The powder was then fired to make cordierite particles. However, as a result of the milling and/or sieving, the cordierite particles contained large proportions of large irregularly shaped agglomerates and small fragmented shards or particles. These particles were not spheroidal and failed to exhibit the advantageous intrabead and interbead porosities described herein.

In another experiment, the slurry mixtures (e.g., Examples S1-S20) were rapidly dried by rotary evaporating. Although somewhat more irregular (e.g., oblong, oblate, tear shaped, etc.), spheroidal shaped green agglomerate particles generally similar to spraydried agglomerate Examples A1-A20 were obtained by rotary evaporation of solvent from the slurry mixtures, sieving the dried powder to a target particle size, and firing the sieved powder at top temperatures above 1300° C. to react the precursor raw materials into cordierite. This alternate process also provided similar microstructure to the spraydried powder examples with advantageously high open porosity and pore size distribution as described herein.

Figure 14:
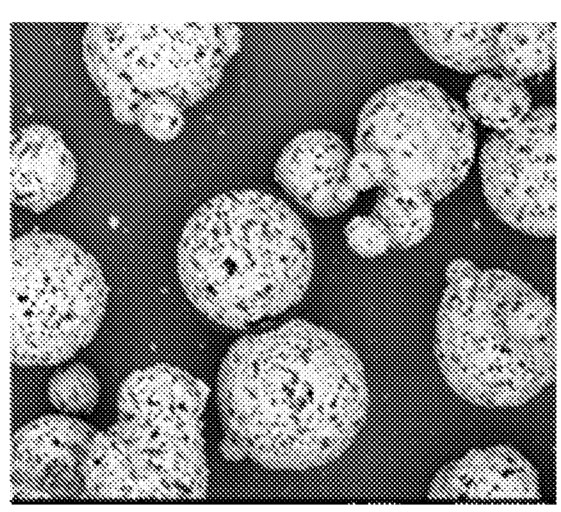
FIG. 14 shows SEM images of fired agglomerated powders obtained by firing spraydried green agglomerates, and firing of a first type and a second type of green agglomerates made by an agglomeration process in a rotary evaporator.
Figure 14:
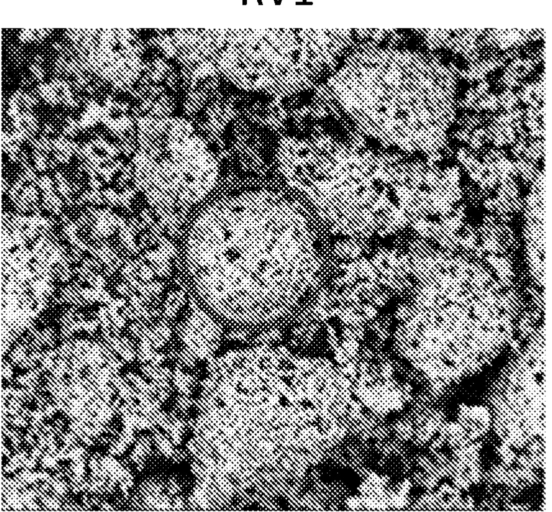
Figure 14:
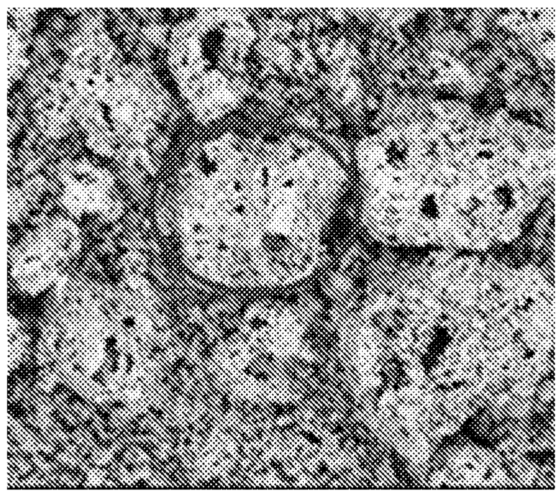

FIG. 14 shows the microstructure of three cordierite beads made by firing: (i) Example A8 made from slurry mixture S8 using the spraydry process described above; (ii) Example RV1 that was made from slurry mixture S8 using the rotary-evaporation process; and (iii) Example RV2 that was also made from slurry mixture S8 using the rotary-evaporation process, but further comprising a pore former addition of 20 vol % corn starch. As shown, green agglomerates with similar pore structure can be made with the rotary evaporation technique. Furthermore, RV2 shows that addition of pore former, such as corn starch, can create comparatively larger pores, such as in the 5-10 μm range for corn starch. In other embodiments, smaller and larger starch particles can be used to form smaller and larger pores, respectively.

Porosity and pore size of the cordierite beads of FIG. 14 were determined by mercury intrusion porosimetry. As shown in Table 14, there was significant similarity in the porosity and pore size values for green agglomerate Example A8 derived by spraydrying and for Example RV1 derived by the alternative rotary-evaporation process, thereby indicating that rotary-evaporation is a suitable alternative process to spraydrying.

TABLE 14

Porosity and Median Pore Size as Determined by MIP.

| Green Agglomerate Example Used for Cordierite Bead | Pore Former (vol %) | Bead Porosity (relative to volume of bead) | Median Pore Size (μm) |
|---|---|---|---|
| A8 | 0 | 39 | 1.8 |
| RV1 | 0 | 41 | 1.8 |
| RV2 | 20 | 47 | 5.8 |

Honeycomb Bodies

After creating powders of cordierite beads (e.g., cordierite beads 122) from the powders of green agglomerates (e.g., the green agglomerates 130), the various cordierite beads were included as ingredients in batch mixtures (e.g., the batch mixtures 110) that were extruded to form green honeycomb bodies (e.g., the green honeycomb bodies 100G). The green honeycomb bodies were cut to length, dried, and then fired to form ceramic honeycomb bodies (e.g., the honeycomb bodies 100). The honeycomb bodies can be fired at temperatures lower than or similar to those used to fire the cordierite beads, such as in the range of approximately 1350° C. to 1410° C. In some embodiments, the batch mixture, before addition of a liquid carrier and with respect to a total weight of inorganic components in the batch, comprises at least 50 wt %, at least 55 wt %, at least 60 wt %, at least 70 wt %, at least at least 75 wt %, at least 80 wt %, at least 85 wt %, or even at least 90 wt % of the porous ceramic beads, including ranges including these values as endpoints, such as from 55 wt % to 95 wt %, from 55 wt % to 90 wt %, from 55 wt % to 85 wt %, from 55 wt % to 80 wt %, from 60 wt % to 95 wt %, from 60 wt % to 90 wt %, from 60 wt % to 85 wt %, from 60 wt % to 80 wt %, from 70 wt % to 95 wt %, from 70 wt % to 90 wt %, from 70 wt % to 85 wt %, from 70 wt % to 80 wt %, from 75 wt % to 95 wt %, from 80 wt % to 95 wt %, or from 80 wt % to 90 wt %. An inorganic binder, such as one or more ceramic precursor materials or shear binder agglomerates as described herein, can be added relative to the porous ceramic beads in an amount to bring the total of these components to 100 wt %, such as in an amount of at least 5 wt %, at least 10 wt %, at least 15 wt %, at least 20 wt %, or at least 25 wt %, such as from 5 wt % to 25 wt %, from 5 wt % to 20 wt %, from 5 wt % to 15 wt %, from 5 wt % to 10 wt %, from 10 wt % to 25 wt %, from 10 wt % to 20 wt %, from 10 wt % to 15 wt %, from 15 wt % to 25 wt %, or from 20 wt % to 25 wt %. Pore formers can be added as a super addition in any suitable amount, such as at least 10 wt %, at least 20 wt %, at least 30 wt %, or at least 40 wt % super addition, including any range with these values as end points. Extrusion aids, such as oil, can be added as a super addition in any suitable amount, such as at least 0.5 wt %, at least 0.75 wt %, or at least 1 wt % super addition, including any range with these values as end points. An organic binder, such as methylcellulose, can be added as a super addition in any suitable amount, such as from 6 wt % to 10 wt % super addition, or more.

In contrast to a traditional reactive cordierite batch, which may require long and slow heating cycles to avoid defects, such as crack formation, the use of already-reacted ("pre-reacted") cordierite beads enabled comparatively quick firing of the honeycomb bodies, with fast ramping up to the top temperature. Firing trials for full size honeycomb bodies with ramp rates of 50° C./h, 100° C./h, 150° C./h, 200° C./h and 300° C./h did not show any appreciable difference in the resulting quality of the fired ware. The fired ware showed consistently excellent quality, free of cracks, in both electric kilns and gas kilns. In some embodiments, the heating ramp rate is at least 50° C./h, at least 100° C./h, at least 150° C./h, at least 200° C./h, or even at least 300° C./h. Compared to traditional reactive cordierite batches, hold times at top temperatures were also extremely short, such as 4 h at 1380° C., when using a 300° C./h ramp rates. Thus, the complete firing cycle could be completed in 20 hours, instead of 50 h, 60 h, 80 h, or even 100 h for traditional reactive batch products.

In a first investigation, honeycomb bodies were extruded as 1" or 2" diameter parts by a ram extruder, or as a 2" diameter part by a twin screw extruder, and dried in a microwave dryer followed by a hot air drying oven, as applicable. For ram extrusions, the paste was first thoroughly mixed, such as by being passed through the twin screw with screens and a large open die and/or several times through a spaghetti die prior to pressing it through the ram extruder. For twin screw extrusions, the batch mixture paste was directly filled into the feeder for the extruder barrel. In general, a screen package was used to protect the extrusion die and provide homogeneous batch paste flow. In addition, the fired cordierite beads were sieved, e.g., via a 270 or 325 size mesh in an automated sieve, as applicable, to remove large size agglomerates, thereby avoiding clogging of the extrusion die slots during extrusion.

The extruded green honeycomb bodies were fired at temperatures between 1340° C. and 1420° C. for four to six hours. At these times and temperatures, the cordierite beads were generally fully reacted before addition to the batch mixtures, which kept firing times for the honeycomb bodies short as no further solid state reactive transformation was needed in the beads (only reaction of any reactive inorganic binder materials added to the batch mixture and/or sintering between the beads). Firing was accomplished in air without specific oxygen control. Heating rates were typically between 100° C./h and 300° C./h (although slower heating rates and/or holds were employed between about 400° C. and 1000° C. during organic burn out).

The ease of extrusion was found to be related to the ratio of the width of the slots of the extrusion die and the particle size distribution for the beads used in the batch mixture. Extrusions were performed with a variety of different dies, including 600/4, 200/8, 300/8, 300/13, 300/14, and 300/15 dies (in accordance with die nomenclature, the first numeral referring to the approximate number of cells per square inch (cpsi) of the die and the second numeral referring to the approximate slot width of the die), although other die configurations can be utilized. In some embodiments (e.g., for dies having thinner slots, such as the 300/8 configuration), the median particle size of the cordierite beads in the batch mixture (e.g., which can make up 80 wt % or more of the inorganics in the batch mixture) was greater than 15% or even 20% of the width of the die, with d90 values for the cordierite beads being from 20% to 40% of the slot width. For example, the width of the slot in a 300/8 die may be approximately 200 μm, with median bead size (d50) values for the cordierite beads being upwards of 50 μm, and the d90 values of the cordierite beads exceeding 50 μm, 60 μm, or even 70 μm. In some embodiments, it was particularly advantageous to maintain the d90 or d95 size of the cordierite beads to less than one-third of the slot width (e.g., from 20% to 33%) in order to prevent blockage of the slots by the larger beads.

Corn starch, rice starch, pea starch, and graphite were used as pore formers, although other pore formers can also be used to create porosity. Methylcellulose performed successfully as an organic binder for enabling extrudability and maintaining the shape of the green honeycomb bodies. Use of oil in amounts up to 10 wt % super addition (relative to the total weight of inorganics) and sodium stearate up to 2 wt % super addition (relative to the total weight of inorganics) were explored, and for some oils and some ratios of oil and sodium stearate significantly improved the extrudability of the batch mixture. Additions of tall oil, stearic acid, and lubricating oil with an antioxidant addition ("MOX oil") were explored. The MOX oil performed consistently well, both alone and with addition of sodium stearate. However, as described herein, many batch mixtures required an unexpectedly high water call to successfully produce honeycomb bodies. Higher feed rates than comparable traditional reactive-ingredient batch mixtures were also possible.

Tables 15A-15E list a first set of batch mixtures and extrusion conditions that were used to successfully form (extrude) honeycomb bodies. The green extruded honeycomb bodies were converted into ceramic honeycomb bodies by subsequent firing steps. The honeycomb bodies comprised intersecting walls having with about 13-15 mil ("300/13", "300/14" and/or "300/15" configuration) or 8 mil ("300/8 configuration") nominal wall thickness, as indicated, although other wall thickness can be used. The honeycomb bodies had approximately 300 cells per square inch (300 cpsi), although other cpsi values, such as from 200-1000 cpsi can alternatively be used. The batch mixtures of the Examples of Tables 15A-15E comprised reacted cordierite beads, e.g., fully-reacted cordierite beads, having mean bead (particle) sizes ranging from 18 μm to 50 μm. In some batch mixtures of the Examples of Tables 15A-15E, inorganic reactive binder materials (e.g., talc, alumina, silica, etc.) were added to the batch mixture along with the spheroidal cordierite beads. In some of the batch mixtures of Tables 15A-15E, shear binder agglomerates (described in more detail below) that contained inorganic binder materials were used in addition to and/or in lieu of separate inorganic binder materials.

TABLE 15A

| Cordierite Bead-Containing Honeycomb Extrudate Examples | | | | | | | | |
|---|---|---|---|---|---|---|---|---|
| | | Honeycomb Extrudate Example Number: | | | | | | |
| | | H1 | H2 | H3 | H4 | H5 | H6 | H7 |
| EXTRUSION TYPE (2") TWS - Twin Screw Extruder | | TWS | TWS | TWS | TWS | TWS | TWS | TWS |
| GEOMETRY (targeted cells per square inch/ wall thickness in mils) | | 300/8 | 300/8 | 300/8 | 300/8 | 300/8 | 300/8 | 300/8 |
| INORGANICS (weight percent) | | | | | | | | |
| Green Agglomerate for Cordierite Beads (median bead size) [Bead Firing Temp/Time] | A1-10 (18 µm) | | | | | | 42.5 | |
| | A1-10 (30 µm) [1410° C./8 h] | | | 85 | 85 | 85 | 42.5 | |
| | A1-10 (35 µm) [1410° C./8 h] | 85 | 85 | | | | | |
| | A8 (45 µm) [1410° C./8 h] | | | | | | | 85 |
| Green Agglomerate for Shear Binder (median agglomerate size) | A2 from cyclone (20 µm) | 15 | 15 | 15 | 15 | 15 | 15 | 15 |
| PORE FORMERS (weight percent super addition) | | | | | | | | |
| Rice Starch | | 15 | | | | | | |
| Crosslinked Pea starch | | 20 | 20 | 20 | 20 | 25 | 25 | 25 |
| Graphite | | 9 | 9 | 9 | 9 | 9 | 9 | 9 |
| ORGANIC BINDERS (weight percent super addition) | | | | | | | | |
| Hydroxypropyl Methylcellulose F240 | | 9 | 9 | 9 | 9 | 9 | 9 | 9 |
| LIQUID ADDITIONS (weight percent super addition) | | | | | | | | |
| Tall Oil | | | | 1 | 1 | 2 | 2 | 2 |
| Oleic acid | | 1 | 1 | | | | | |
| Sodium Stearate | | | | 1 | | | | |
| Water Call | | 37 | 35 | 40 | 48 | 44 | 44 | 44 |

TABLE 15B

| Cordierite Bead-Containing Honeycomb Extrudate Examples | | | | | | | | | | |
|---|---|---|---|---|---|---|---|---|---|---|
| | | Honeycomb Extrudate Example Number: | | | | | | | | |
| | | H8 | H9 | H10 | H11 | H12 | H13 | H14 | H15 | H16 |
| EXTRUSION TYPE (1" or 2") | | 2" | 2" | 1" | 1" | 2" | 2" | 2" | 2" | 2" |
| TWS - Twin Screw Extruder RAM - Ram Extruder | | RAM | RAM | RAM | RAM | RAM | RAM | TWS | TWS | TWS |
| GEOMETRY (approx. cells per square inch/wall thickness range in mils) | | 300/13 | 300/13 | 300/13 | 300/13 | 300/13 | 300/13 | 300/8 | 300/8 | 300/8 |
| INORGANICS (weight percent) | | | | | | | | | | |
| Green Agglomerate for Cordierite Beads (median bead size) [Bead Firing Temp/Time] | A1 (40 µm) | 85 | 85 | 90 | 90 | | | | | |
| | A2 (40 µm) | | | | | 90 | 90 | | | |
| | A8 (45 µm) [1410° C./8 h] | | | | | | | 85 | 85 | |
| | A2 (48 µm) [1380° C./10 h] | | | | | | | | | 85 |
| Green Agglomerate for Shear Binder (median agglomerate size) | A1-21 (40 µm) | 15 | 15 | | | 10 | 10 | | | |
| | A2 (20 µm) | | | | | | | 15 | 15 | 15 |

TABLE 15B-continued

| Cordierite Bead-Containing Honeycomb Extrudate Examples | | | | | | | | | | |
|---|---|---|---|---|---|---|---|---|---|---|
| | | Honeycomb Extrudate Example Number: | | | | | | | | |
| | | H8 | H9 | H10 | H11 | H12 | H13 | H14 | H15 | H16 |
| Inorganic Binder Mixture (median particle size) | Talc (4.5 µm) | | | 1.67 | 6.36 | | | | | |
| | Silica Soot (0.5 µm) | | | 4.10 | | | | | | |
| | Spinel (3.5 µm) | | | 4.06 | | | | | | |
| | Alumina (0.5 µm) | | | 0.17 | 4.23 | | | | | |
| PORE FORMERS (weight percent super addition) | | | | | | | | | | |
| Crosslinked Pea Starch | | | | 15 | 8 | 8 | 12 | 20 | | 20 |
| Corn Starch | | | | | | | | | 20 | |
| Graphite | | | | 7 | 4 | 4 | 6 | 9 | 9 | 9 |
| ORGANIC BINDERS (weight percent super addition) | | | | | | | | | | |
| Hydroxypropyl Methylcellulose F240 | | 4 | 3 | 2 | 3 | 2 | 2 | 3 | 3 | 3 |
| Hydroxypropyl Methylcellulose TYA | | 8 | 6 | 4 | 6 | 4 | 4 | 6 | 6 | 6 |
| LIQUID ADDITIONS (weight percent super addition) | | | | | | | | | | |
| Colloidal Silica | | | | | 10.6 | | | | | |
| Tall Oil | | 1 | 0.75 | 0.5 | 0.75 | 0.5 | 0.5 | 0.75 | 0.75 | 0.75 |
| Water Call | | 62 | 65.5 | 89 | 53 | 45 | 51 | 45 | 45 | 43 |

TABLE 15C

| Cordierite Bead-Containing Honeycomb Extrudate Examples | | | | | | | | | | | |
|---|---|---|---|---|---|---|---|---|---|---|---|
| | | Honeycomb Extrudate Example Number: | | | | | | | | | |
| | | H17 | H18 | H19 | H20 | H21 | H22 | H23 | H24 | H25 | H26 |
| EXTRUSION TYPE (2") TWS - Twin Screw Extruder RAM - Ram Extruder | | RAM | TWS | TWS | RAM | RAM | RAM | TWS | TWS | TWS | TWS |
| GEOMETRY (approx. cells per square inch/ wall thickness in mils) | | 300/14 | 300/14 | 300/14 | 300/14 | 300/14 | 300/14 | 300/14 | 300/14 | 300/8 | 300/8 |
| INORGANICS (weight percent) | | | | | | | | | | | |
| Green Agglomerate for Cordierite Beads (median bead size) [Bead Firing Temp/Time] | A1 (50 µm) [1380° C./8 h] | 85 | | | | | | | | | |
| | A2 (48 µm) [1350° C./8 h] | | | | 90 | 90 | 90 | | 85 | | 85 |
| | A2 (45 µm) [1365° C./8 h] | | 85 | 85 | | | | | | | |
| | A1 (30 µm) [1380° C./8 h] | | | | | | | 85 | | 85 | |
| Green Agglomerate for Shear Binder (median agglomerate size) | A2 from cyclone (20 µm) | 15 | 15 | 15 | 10 | 10 | 10 | 15 | 15 | 15 | 15 |
| PORE FORMERS (weight percent super addition) | | | | | | | | | | | |
| Corn starch | | | | 16 | | | | | | | |
| Crosslinked pea starch | | 18 | 16 | | 16 | 18 | 18 | 18 | 22 | 18 | 22 |
| Graphite | | 9 | 8 | 8 | 8 | 9 | 9 | 9 | 9 | 9 | 9 |
| ORGANIC BINDERS (weight percent super addition) | | | | | | | | | | | |
| Hydroxypropyl Methylcellulose F240 | | 3 | 3 | 3 | 2 | 3 | 3 | 3 | 3 | 3 | 3 |
| Hydroxypropyl Methylcellulose TYA | | 6 | 6 | 6 | 4 | 6 | 6 | 6 | 6 | 6 | 6 |

TABLE 15C-continued

| Cordierite Bead-Containing Honeycomb Extrudate Examples | | | | | | | | | | |
|---|---|---|---|---|---|---|---|---|---|---|
| | Honeycomb Extrudate Example Number: | | | | | | | | | |
| | H17 | H18 | H19 | H20 | H21 | H22 | H23 | H24 | H25 | H26 |
| LIQUID ADDITIONS (weight percent super addition) | | | | | | | | | | |
| Colloidal Silica | | | | 2 | | | | | | |
| Tall Oil | 0.75 | 0.75 | 0.75 | 0.75 | 0.75 | 0.75 | 0.75 | 0.75 | 0.75 | 0.75 |
| Water Call | 57.5 | 32 | 34 | 50 | 34 | 40 | 55 | 48-50 | 50 | 43 |

TABLE 15D

| Cordierite Bead-Containing Honeycomb Extrudate Examples | | | | | | | | | | | | |
|---|---|---|---|---|---|---|---|---|---|---|---|---|
| | | Honeycomb Extrusion Example No. | | | | | | | | | | |
| | | H32 | H33 | H34 | H35 | H36 | H37 | H38 | H39 | H40 | H41 | H42 |
| EXTRUSION TYPE (2") RAM - Ram Extruder (after thorough mixing in a twin screw apparatus) | | RAM | RAM | RAM | RAM | RAM | RAM | RAM | RAM | RAM | RAM | RAM |
| GEOMETRY (approx. cells per square inch/ wall thickness in mils) | | 300/15 | 300/15 | 300/15 | 300/8 | 300/15 | 300/8 | 300/15 | 300/8 | 300/15 | 300/15 | 300/8 |
| Cordierite Bead | | | | | | | | | | | | |
| Green Agglomerate Ex. (approx. median particle size) | Bead Firing Conditions (Temp./Time) | Weight Percent | | | | | | | | | | |
| A11 (38 μm) | 1160° C./8 h | 85 | | | | | | | | | | |
| A7 (46 μm) | 1380° C./6 h | | 85 | | | | | | | | | |
| A12 (44 μm) | 1380° C./6 h | | | 85 | 85 | | | | | | | |
| A16 (43 μm) | 1380° C./8 h | | | | | 75 | 75 | | | | | |
| A15 (37 um) | 1380° C./6 h | | | | | | | 75 | 75 | | | |
| A14 (44 μm) | 1350° C./8 h | | | | | | | | | 80 | | |
| A9 (38 μm) | 1350° C./8 h | | | | | | | | | | 80 | 80 |
| Green Agglomerate as Inorganic Shear Binder (median particle size) | | Weight Percent | | | | | | | | | | |
| A2 (20 μm) | | 15 | 15 | 15 | 15 | 25 | 25 | 25 | 25 | 20 | 20 | 20 |
| Pore Formers | | Weight Percent Super Addition | | | | | | | | | | |
| Crosslinked Pea Starch | | 25 | 25 | 25 | 25 | 25 | 25 | 25 | 25 | 25 | 25 | 25 |
| Graphite | | 9 | 9 | 9 | 9 | 7 | 7 | 7 | 7 | 7 | 7 | 7 |
| Organic Binder, Aids, and Liquid Additions | | Weight Percent Super Addition | | | | | | | | | | |
| Hydroxypropyl Methylcellulose F240 LF | | 9 | 9 | 9 | 9 | 7 | 7 | 7 | 7 | 7 | 7 | 7 |
| Sodium Stearate | | 1.4 | 1.4 | 1.4 | 1.4 | 1.4 | 1.4 | 1.4 | 1.4 | 1.4 | 1.4 | 1.4 |
| MOX Oil | | 4.13 | 4.13 | 4.13 | 4.13 | 4.13 | 4.13 | 4.13 | 4.13 | 4.13 | 4.13 | 4.13 |
| Water Call | | 44 | 45 | 35 | 35 | 36.1 | 36.5 | 40 | 41 | 38 | 34.5 | 34.5 |

TABLE 15E

| Cordierite Bead-Containing Honeycomb Extrudate Examples | | | | | | | | | | | |
|---|---|---|---|---|---|---|---|---|---|---|---|
| | | Honeycomb Extrusion Example No. | | | | | | | | | |
| | | H43 | H44 | H45 | H46 | H47 | H48 | H49 | H50 | H51 | H52 |
| EXTRUSION TYPE (2") RAM - Ram Extruder (after thorough mixing in a twin screw apparatus) | | RAM | RAM | RAM | RAM | RAM | RAM | RAM | RAM | RAM | RAM |
| GEOMETRY (approx. cells per square inch/ wall thickness in mils) | | 300/15 | 300/15 | 300/15 | 300/8 | 300/15 | 300/8 | 300/8 | 300/8 | 300/8 | 300/8 |
| Cordierite Bead | | | | | | | | | | | |
| Green Agglomerate Ex. (approx. median particle size) | Bead Firing Conditions (Temp./Time) | Weight Percent | | | | | | | | | |
| A8 (43 μm) | 1250° C./8 h | 85 | | | | | | | | | |
| A8 (24 μm) | 1160° C./8 h | | 85 | | | | | | | | |
| A8 (36 μm) | 1410° C./8 h | | | 60 | 60 | | | | | | |
| A8 (32 μm) | 1340° C./8 h | | | | | 80 | | | | | |
| A8 (40 μm) | 1410° C./8 h | | | | | | 80 | 80 | 80 | 80 | 80 |
| Green Agglomerate as Inorganic Shear Binder (median particle size) | | Weight Percent | | | | | | | | | |
| A2 (20 μm) | | 15 | 15 | 40 | 40 | 20 | 20 | 20 | 20 | 20 | 20 |
| Pore Formers | | Weight Percent Super Addition | | | | | | | | | |
| Crosslinked Pea Starch | | 25 | 25 | 25 | 25 | 25 | 25 | 25 | 28 | 32 | 28 |
| Graphite | | 9 | 9 | 7 | 7 | 9 | 9 | 9 | 10 | 12 | 10 |
| Organic Binder, Aids, and Liquid Additions | | Weight Percent Super Addition | | | | | | | | | |
| Hydroxypropyl Methylcellulose F240 LF | | 9 | 9 | 7 | 7 | 7 | 7 | 7 | 7 | 7 | 7 |
| Sodium Stearate | | 1.4 | 1.4 | 1.4 | 1.4 | 1.4 | | | 1.4 | 1.4 | |
| MOX Oil | | 4.13 | 4.13 | 4.13 | 4.13 | 4.13 | 4.13 | 7 | 4 | 4 | 4 |
| Water Call | | 44 | 44 | 35 | 35 | 42 | 48 | 48 | 50 | 52 | 50 |

As used herein, the term "shear binder agglomerates" or simply "shear binders" refers to green spheroidal particles that were formed from slurry mixtures described herein (i.e., in accordance with slurry mixture Examples S1-S20), and in significantly the same manner as the green agglomerates 130 described herein, although higher solid loadings can be used during spraydrying or other spheroidizing processes. That is, the shear binder agglomerates referred to herein are substantially the same as the disclosed green agglomerates (thus, for example, the green agglomerates A1-A20, or others, can be used as shear binder agglomerates). In some embodiments, the shear binders are made from the same slurry mixtures as the green agglomerate samples described herein, but optionally at higher solid loadings. For example, solid loadings of between 15-50 vol % can be used to form shear binder agglomerates useful as an inorganic-type binder ingredient during manufacture of honeycomb bodies (in comparison to about 10-30 vol % solid loading used for the green agglomerates).

The shear binder agglomerates aid in sintering of the beads by providing additional inorganic material concentrated at, or extending between, contact points with the beads due to shearing (or deformation) of the shear binder agglomerates during mixing with the beads. In accordance with the purpose of acting as an inorganic binder for the beads, and despite the fact that various organic components may be present in the shear binder agglomerates (e.g., a binder or dispersant as shown in Tables 1-4), the total weight of the shear binder agglomerates is considered herein as part of the total weight of inorganics in the batch mixture. Accordingly, in many of the Examples in which shear binder agglomerates are employed, the weight of the beads and the weight of the shear binder agglomerates sum to 100% as the total weight of inorganics in the batch mixture.

The corresponding slurry mixture used for the shear binder agglomerates are indicated for the relevant Examples in Tables 15A-15E. Same or different shear binder compositions can be used as the calcined cordierite beads for any given honeycomb extrusion. Successful combinations were made from fired cordierite beads obtained without any Na-addition, but combined with shear binder green agglomerates that did contain a small amount of Na (e.g., less than 2 wt % with respect to the total weight of inorganics in the shear binder agglomerates). Such combinations produced comparatively low CTE and enabled the use of comparatively low honeycomb firing temperatures and/or shorter hold times, such as via glass formation at pore contact points.

The required water calls were much higher for the batch mixtures comprising cordierite beads having high open porosity (e.g., in comparison to traditional reactive raw material batches or batch mixtures having dense or closed-porosity beads). For example, in some embodiments the water call was greater than 30 wt %, greater than 40 wt %, or even greater than 50 wt %, as super addition with respect to the total weight of inorganics. Without wishing to be bound by theory, the high water amounts are believed to be necessary to fill the intrabead porosity of the beads, which acts with high capillarity force and pulls water into the intrabead pore structures of the beads. As such, the required water level for extrusion generally increased with increasing open intrabead porosity of the cordierite beads and with the median particle size of the beads. In general, friction in the batch and wall drag of the extrusion paste along the die wall were very low, so high amounts of oils or other lubricants were of limited benefit, particularly for dies having wider slots (e.g., the 300/13 and 300/14 dies tested).

Figure 15A:
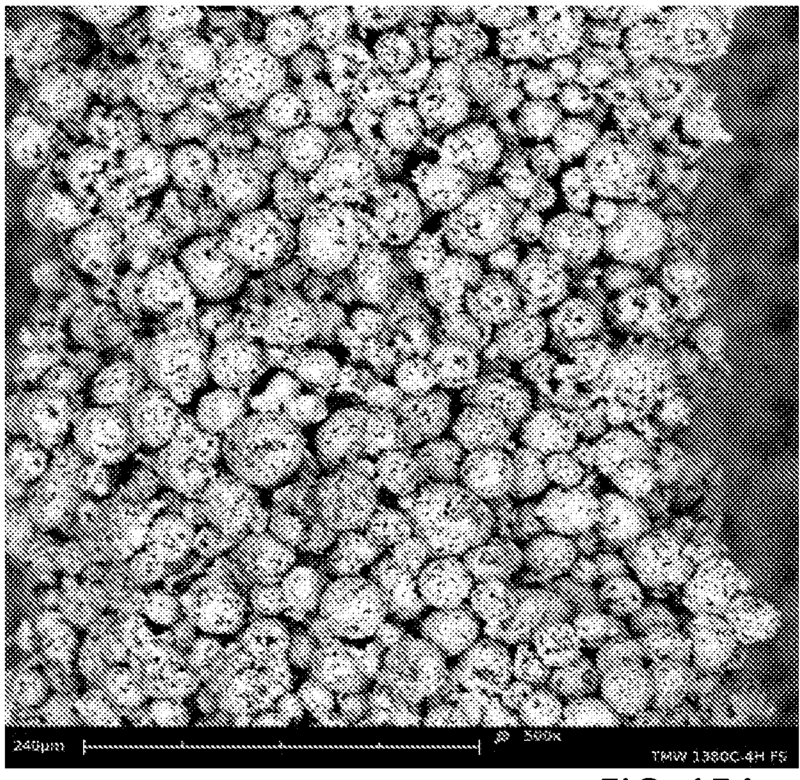
FIGS. 15A and 15B show SEM images of fracture surface views of the intersecting walls of a ceramic honeycomb body at different magnifications, which walls comprise a network of spheroidal ceramic beads sintered together, according to one embodiment disclosed herein.
Figure 15B:
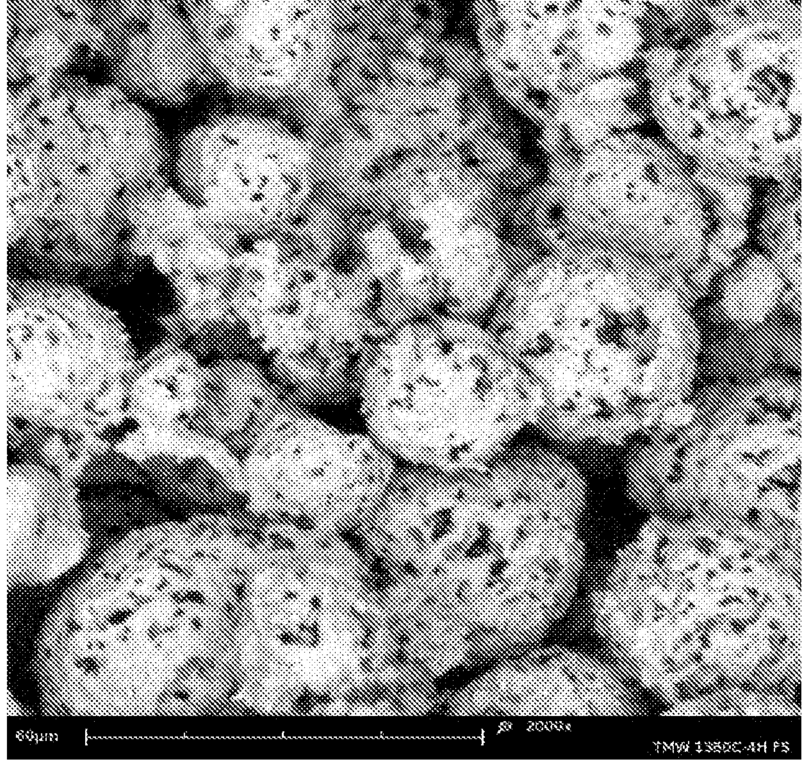
Figure 15C:
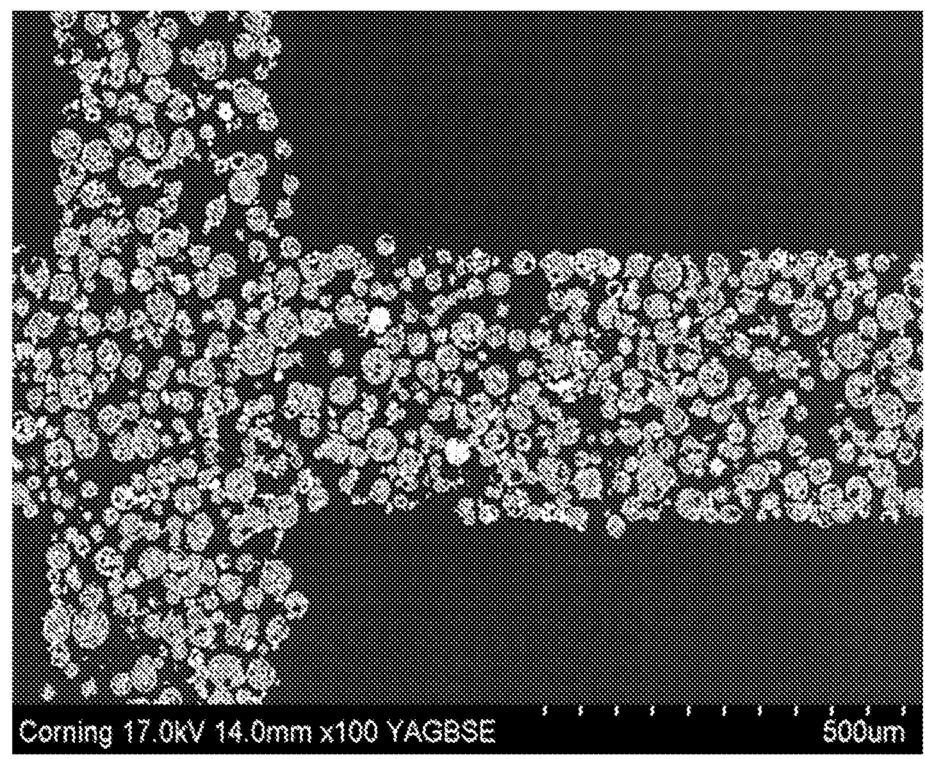
FIGS. 15C and 15D show respective SEM images of a cross-sectional view and an on-wall view of the intersecting walls of a ceramic honeycomb body, which walls comprise a network of spheroidal ceramic beads sintered together, according to one embodiment disclosed herein.
Figure 15D:
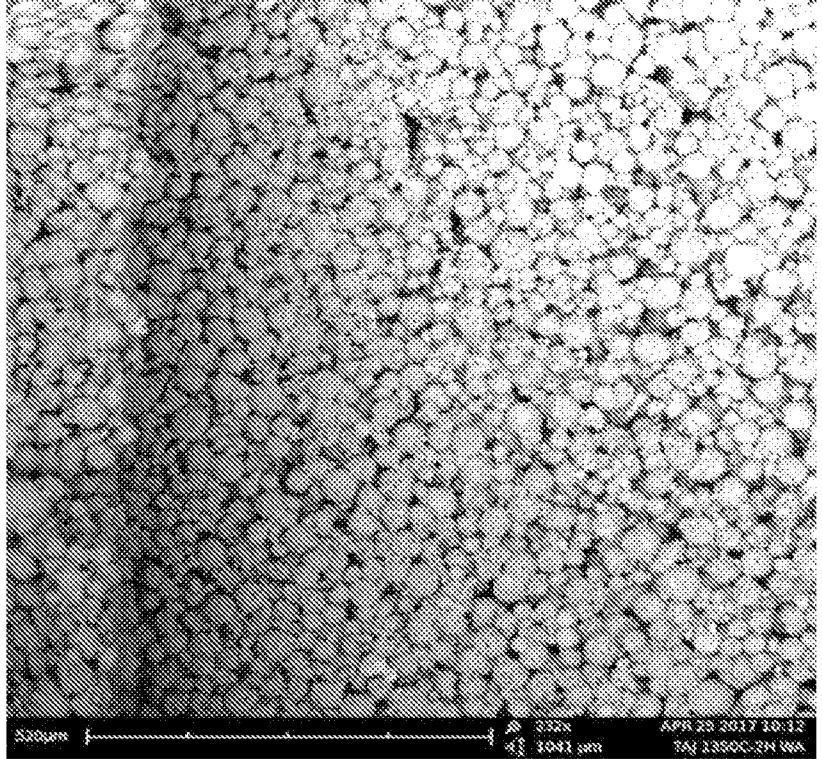

FIGS. 15A-15D show microstructures of fired honeycomb bodies showing the interbead and intrabead porosities described herein. More particularly, FIGS. 15A and 15B respectively show surface views of the surface of a wall (the wall 102) at magnifications of 500× and 2000× for honeycomb body Example H9. FIGS. 15C and 15D respectively show a wall cross section and view of the wall surface for a honeycomb body produced in accordance with Example H10. The interbead pore sizes (size of the interstices 128 between the beads 122) were in the range of 10-20 μm and the intrabead pore sizes (pore size in the beads) were in the range of about 1-5 μm.

Honeycomb bodies were fired at top temperatures ranging between 1330° C. and 1410° C., corresponding to the highest top temperatures used to form the cordierite beads as described above. In general, temperatures of less than 1350° C. were too low to enable sufficient cordierite formation within the inorganic components of the shear-binders in some embodiment, in particular shear binder agglomerates made from slurry mixture Example S2. The inclusion of sodium (e.g., in the form of sodium stearate) was found to be useful to enable lower reaction temperatures than Na-free batch mixtures (e.g., temperatures less than 1350° C.), but can also lead to insufficient cordierite formation and correspondingly fragile ware if the sodium is not present in a sufficient amount (e.g., at least 0.2%, at least 0.5%, or at least 1.0%).

Ceramic honeycomb bodies were formed by firing the green bodies obtained by extruding the indicated batch mixtures of Tables 15A-15E at 1320° C. to 1415° C. for 4-20 hours. Tables 16A-16D provide phase compositions of honeycomb bodies made by firing the green honeycomb bodies from several of the Examples of Tables 15A-15E under the indicated firing conditions, as obtained by XRD analysis with Rietveld analysis for the material. The level of glass was derived for some Examples by a semiquantitative estimation. Blank entries for ceramic phases in the Tables indicate that the presence of that phase was not found, while blank entries for glass instead indicates that the Example was not analyzed for its glass content. Glass is expected in all fired honeycomb Examples in an amount up to 15 wt %, with SEM analysis indicating that many Examples have glass content of less than 5 wt %. In some embodiments, the crystalline phases (thus, excluding glass) comprised at least 90 wt % cordierite, or even at least 95 wt % cordierite.

TABLE 16A

Ceramic Compositions of Honeycomb Bodies

| Honeycomb Extrusion Example No. | Firing Conditions: Top Temperature and Soak Time | Phase (wt %) Glass | Cordierite: Cordierite | Cordierite: Indialite | Mullite | Corundum | Rutile | Sapphirine | Spinel | Pseudobrookite | Cristobalite | Protenstatite | Quartz | Enstatite |
|---|---|---|---|---|---|---|---|---|---|---|---|---|---|---|
| H1 | 1380° C./4 h | 8 | 88 | 1.6 | 2 | | 0.4 | 0.1 | | | | | | |
| H1 | 1410° C./4 h | 11 | 75 | 12 | 1.1 | | 0.4 | | | 0.9 | | | | |
| H2 | 1380° C./4 h | 8.4 | 78 | 11 | 1.7 | | 0.3 | | | 0.6 | | | | |
| H2 | 1410° C./4 h | 13 | 74 | 12 | 0.8 | | 0.2 | | | 0.4 | | | | |
| H3 | 1380° C./4 h | 11 | 84 | 1 | 1.3 | | 0.2 | 0.4 | | 1.7 | | | | |
| H4 | 1380° C./4 h | 9.4 | 86 | 1.3 | 0.9 | | 0.4 | 0.3 | | 1.3 | | | | |
| H4 | 1380° C./4 h | 4.6 | 78 | 16 | 1.1 | | 0.5 | | | 0.4 | | | | |
| H4 | 1380° C./10 h | 14 | 75 | 10 | 0.4 | | 0.4 | | | 0.4 | | | | |
| H4 | 1400° C./4 h | 8.5 | 87 | 1.3 | 1.1 | | 0.4 | 0.2 | | 1 | | | | |
| H4 | 1415° C./15 h | 9 | 89 | 0.7 | 1.1 | | 0.3 | | | 1.2 | | | | |
| H5 | 1380° C./4 h | 8.8 | 78 | 10 | 1.4 | | 0.5 | | | 0.5 | | | | |
| H5 | 1380° C./4 h | 11 | 73 | 14 | 1.1 | | 0.3 | | | 0.5 | | | | |
| H5 | 1410° C./4 h | 6.4 | 74 | 16 | 1 | | 0.5 | | | 1.1 | | | | |
| H5 | 1410° C./8 h | 12 | 84 | 1.5 | 1.4 | | 0.4 | | | 1.1 | | | | |
| H6 | 1380° C./4 h | | 25 | 23 | 6.7 | 11 | | 11 | 2.2 | | 11 | 9.1 | 0.8 | |
| H6 | 1380° C./4 h | 8.5 | 88 | 0.6 | 1.2 | | 0.3 | 0.3 | | 1.2 | | | | |
| H6 | 1400° C./4 h | 9 | 87 | 1.2 | 1.1 | | 0.3 | 0.2 | | 1.2 | | | | |
| H6 | 1410° C./4 h | 6.4 | 74 | 16 | 1.2 | | 0.5 | | | | | | | |
| H6 | 1410° C./4 h | 11 | 85 | 1.7 | 1.2 | | 0.4 | | | 1.1 | | | | |
| H7 | 1380° C./4 h | 8.7 | 88 | 1.3 | 0.6 | 0.4 | 0.4 | 0.4 | | 0.4 | | | | |
| H7 | 1380° C./4 h | 9.5 | 78 | 9.6 | 1.5 | | 0.5 | | | 1.1 | | | | |
| H14 | 1410° C./4 h | 7 | 89 | 1 | 2.1 | | 0.3 | | | | | | | |
| H15 | 1380° C./4 h | | 95 | 1 | 1.9 | | 0.2 | | | | | | | 2.3 |
| H15 | 1410° C./4 h | 16 | 71 | 10 | 1.1 | | 0.3 | | | | | 1.1 | | |
| H16 | 1380° C./4 h | | 92 | 2.2 | 1.9 | | | 3.3 | 2.3 | | | | | |
| H16 | 1410° C./4 h | 8.8 | 77 | 8.9 | | | | 2.8 | 2.1 | 0.5 | | | | |

TABLE 16B

Ceramic Compositions of Honeycomb Bodies, Continued

| Honeycomb Extrusion Example No. | Honeycomb Firing Conditions: Top Temperature and Soak Time | Phase (wt %) | | | | | | |
|---|---|---|---|---|---|---|---|---|
| | | Glass | Cordierite (with indialite) | Mullite | Rutile | Sapphirine | Spinel | Pseudo-brookite |
| H17 | 1380° C./4 h 1410° C. Spike | 7.4 | 90.4 | 1.2 | 0.5 | | | 0.4 |
| H17 | 1320° C./4 h 1350° C. Spike | | 98 | 1.4 | 0.2 | | | |
| H17 | 1380° C./20 h | 7.5 | 90.7 | | 0.5 | | | |
| H20 | 1380° C./4 h | 8.7 | 86.7 | | | 3.8 | 0.9 | 0.2 |
| H20 | 1380° C./20 h | 9.6 | 86 | | | 2.9 | 1.2 | 0.6 |
| H18 | 1320° C./4 h 1350° C. Spike | | 94 | | | 4.3 | 1.7 | 0.2 |
| H18 | 1380° C./4 h 1410° C. Spike | 8 | 85.2 | | | 4.2 | 1.2 | 0.3 |
| H18 | 1380° C./4 h | | 94 | | | 4.3 | 1.7 | |
| H19 | 1320° C./4 h 1350° C. Spike | | 94 | | | 4.4 | 2.1 | 0.1 |
| H19 | 1380° C./4 h 1410° C. Spike | 9.6 | 84.1 | | | 4.1 | 1.6 | 0.2 |
| H19 | 1380° C./4 h | | 93 | | | 4.2 | 2.3 | |
| H21 | 1380° C./20 h | 9.1 | 85.8 | | | 2 | 2.5 | 0.6 |
| H23 | 1380° C./4 h | | 97 | 1.7 | 0.9 | | | |
| H23 | 1425° C./4 h | | 98 | 1.7 | 0.8 | | | |
| H24 | 1380° C./4 h | | 94 | 0.5 | | 3.8 | 2.1 | |
| H24 | 1425° C./4 h | | 93 | 0.8 | | 3.8 | 2.3 | |
| H24 | 1380° C./4 h 1410° C. Spike | | 93 | 0.5 | | 3.9 | 2.3 | |
| H24 | 1320° C./4 h 1350° C. Spike | 8.7 | 87 | | | 3.8 | 1 | |

TABLE 16C

Ceramic Compositions of Honeycomb Bodies, Continued

| Honeycomb Extrusion Example No. | Honeycomb Firing Conditions: Top Temperature and Soak Time | Phase (wt %) | | | | | | | | |
|---|---|---|---|---|---|---|---|---|---|---|
| | | | Cordierite | | | | | | | |
| | | Glass | Cordierite | Indialite | Mullite | Corundum | Rutile | Sapphirine | Spinel | Enstatite |
| H25 | 1380° C./4 h | | 94 | 1.6 | 1.4 | | 0.2 | | | 2.4 |
| H25 | 1380° C./4 h | | 94 | 2.1 | 1.3 | | 0.2 | | | 2.4 |
| H25 | 1380° C./4 h | | 94 | 2.3 | 1.4 | | 0.2 | | | 2 |
| H25 | 1410° C./4 h | | 95 | 1.1 | 1.4 | | 0.3 | | | 2.0 |
| H25 | 1410° C./4 h | | 95 | 1.6 | 1.4 | | 0.4 | | | 2.1 |
| H25 | 1410° C./4 h | | 94 | 1.8 | 2.4 | | 0.3 | | | 1.8 |
| H26 | 1380° C./4 h | | 90 | 3.7 | | | | 5.1 | 1.5 | |
| H26 | 1380° C./4 h | | 90 | 3.0 | | | | 5.3 | 1.6 | |
| H26 | 1410° C./4 h | | 91 | 2.6 | | | | 5.5 | 1.2 | |
| H26 | 1410° C./4 h | | 91 | 3.0 | | | | 5.4 | 1.2 | |
| H26 | 1410° C./4 h | | 90 | 3 | | | | 5.4 | 1.3 | |

TABLE 16D

Ceramic Compositions of Honeycomb Bodies, Continued

| Honeycomb Extrusion Example No. | Honeycomb Firing Conditions: Top Temperature and Soak Time | Phase (wt %) | | | | | | | |
|---|---|---|---|---|---|---|---|---|---|
| | | | Cordierite | | | | | | |
| | | Glass | Cordierite | Indialite | Mullite | Rutile | Sapphirine | Spinel | Pseudo-brookite |
| H32 | 1380° C./4 h | | 80 | 19 | 0.5 | | | | 0.5 |
| H33 | 1350° C./4 h | | 82 | 12 | | | 1.2 | 4.2 | |
| H33 | 1320° C./4 h | | 80 | 14 | | | 1.9 | 3.8 | 0.2 |

TABLE 16D-continued

| Ceramic Compositions of Honeycomb Bodies, Continued | | | | | | | | | |
|---|---|---|---|---|---|---|---|---|---|
| Honeycomb | Honeycomb Firing Conditions: Top | Phase (wt %) | | | | | | | |
| Extrusion | Temperature | | Cordierite | | | | | | Pseudo- |
| Example No. | and Soak Time | Glass | Cordierite | Indialite | Mullite | Rutile | Sapphirine | Spinel | brookite |
| H33 | 1380° C./4 h | | 83 | 12 | | | | 4.7 | |
| H34 | 1386° C./4 h | | 83 | 15 | 0.8 | 0.6 | | | 0.4 |
| H35 | 1380° C./4 h | | 90 | 8.4 | 0.8 | 0.4 | | | 0.3 |
| H36 | 1386° C./4 h | | 84 | 15 | 0.6 | 0.6 | | | 0.5 |
| H38 | 1380° C./4 h | | 81 | 18 | 0.4 | 0.5 | | | 0.5 |
| H40 | 1380° C./4 h | | 81 | 14 | | | | 4.9 | |
| H40 | 1350° C./4 h | | 77 | 16 | | | 2.9 | 4.5 | |
| H41 | 1320° C./4 h | | 79 | 17 | 1.3 | 0.1 | 1.9 | | 0.4 |
| H41 | 1350° C./4 h | | 84 | 13 | 0.8 | 0.2 | 1.4 | 0.5 | 0.4 |
| H42 | 1380° C./4 h | | 89 | 9.9 | 0.3 | 0.1 | | | 0.3 |
| H43 | 1380° C./4 h | | 77 | 21 | 0.9 | 0.2 | | | 1.1 |
| H44 | 1380° C./4 h | | 75 | 23 | 1.5 | | | | 0.6 |
| H44 | 1320° C./4 h | | 66 | 32 | 1.5 | 0.1 | | | 0.6 |
| H44 | 1350°C./4 h | | 67 | 30 | 1.1 | 0.3 | | | 0.8 |
| H45 | 1380° C./4 h | | 82 | 15 | | 0.5 | 1.3 | | |
| H47 | 1380° C./4 h | | 77 | 21 | 0.8 | 0.4 | | | 0.7 |

As indicated in Tables 16A-16D, the firing of some honeycomb bodies utilized a "spike", in which the temperature was initially temporarily raised to a "spike" temperature above the top soak temperature, and then, after a period of at most about 30 minutes, dropped to and held at the top soak temperature. For example, the firing conditions "1380° C./4 h-1410° C. Spike" indicates that the temperature was initially raised to 1410° C. (the spike) and then dropped to and held at 1380° C. for 4 hours.

In some embodiments, the honeycomb body comprises at least 80 wt %, at least 85 wt %, or even at least 90 wt % of a cordierite phase (inclusive of both cordierite and indialite), such as from 80 wt % to 95 wt %, from 85 wt % to 95 wt %, 90 wt % to 95 wt %, 80 wt % to 90 wt %, 85 wt % to 90 wt %, or 85 wt % to 94 wt %. In some embodiments, the honeycomb body comprises less than 15 wt % glass, such as from 4 wt % to 11 wt %. In some embodiments, the honeycomb body comprises less than 3 wt %, less than 2.5 wt %, less than 2 wt %, or even less than 1 wt % of secondary ceramic phases. The fully fired honeycombs did not show any significant amount of cristobalite (e.g., less than 0.1 wt %) and comparatively lower levels of secondary phases such as spinel and sapphirine than the fired cordierite beads themselves (e.g., as shown in Table 8). Glass levels in the honeycombs were typically found to be around 8-11 wt %, but it is again noted that the level of glass was only semi-quantitatively determined from background adjustment in the Rietveld analysis and therefore prone to some degree of error. However, inspection by SEM experimentally confirmed generally low levels of glass present in various honeycomb body Examples, e.g., less than 15 wt %, less than 10 wt % or even less than 5 wt %.

Tables 17A-17D and 18A-18D respectively provide various porosity and thermomechanical properties obtained for various ones of the honeycomb body Examples of Table 15A-15E at the indicated firing conditions. Tables 18A-18D reports both axial and tangential (tang) CTE values from room temperature (RT) to both 800° C. and 1000° C., as well as both transverse and axial i-ratio values for some of the analyzed honeycomb bodies.

TABLE 17A

| Porosity Properties of Ceramic Honeycomb Bodies | | | | | | | | | | | |
|---|---|---|---|---|---|---|---|---|---|---|---|
| Honeycomb Extrusion Example No. | Firing Conditions: Top Temperature and Soak Time | Total Porosity (%) | D10 (μm) | D50 (μm) | D90 (μm) | Interbead Porosity (%) | Interbead Median Pore Size (μm) | Intrabead Network Contribution Porosity (% relative total network volume) | Intrabead Porosity in a Bead (% relative individual bead volume) | Intrabead Median Pore Size (μm) |
| H1 | 1380° C./4 h | 62.34 | 1.92 | 8.92 | 18.50 | 51.01 | 9.78 | 11.33 | 23.13 | 1.82 |
| H1 | 1410° C./4 h | 56.65 | 2.84 | 9.38 | 19.61 | 48.45 | 8.19 | 9.67 | n/a | 2.6 |
| H2 | 1380° C./4 h | 57.48 | 1.69 | 7.75 | 13.23 | 43.89 | 9.11 | 13.58 | 24.21 | 1.81 |
| H2 | 1410° C./4 h | 53.96 | 2.07 | 7.80 | 15.03 | 43.4 | 8.63 | 10.56 | 18.65 | 2.24 |
| H3 | 1380° C./4 h | 59.63 | 2.01 | 8.29 | 15.83 | 48.69 | 9.05 | 10.93 | 21.3 | 1.82 |
| H4 | 1380° C./4 h | 62.47 | 2.01 | 9.68 | 15.28 | 50.34 | 10.59 | 12.12 | 24.4 | 1.82 |
| H4 | 1380° C./4 h | 62.06 | 2.18 | 10.04 | 19.61 | 45.39 | 10.74 | 16.68 | 30.54 | 1.83 |
| H4 | 1380° C./10 h | 61.79 | 2.22 | 9.68 | 21.17 | 51.17 | 10.47 | 10.62 | 21.75 | 2.24 |
| H4 | 1400° C./4 h | 59.85 | 2.37 | 9.67 | 19.33 | 50.04 | 10.31 | 9.81 | 19.64 | 2.34 |
| H4 | 1415° C./15 h | 53.72 | 4.10 | 9.68 | 19.61 | 48.94 | 10.05 | 4.77 | 9.35 | 3.15 |
| H5 | 1380° C./4 h | 61.97 | 1.93 | 9.02 | 15.18 | 48.82 | 9.67 | 13.15 | 25.69 | 1.82 |
| H5 | 1380° C./4 h | 62.60 | 1.94 | 9.19 | 16.02 | 47.21 | 9.92 | 15.39 | 29.14 | 1.82 |
| H5 | 1410° C./4 h | 60.61 | 2.05 | 8.94 | 16.97 | 47 | 9.92 | 14 | 29.14 | 1.82 |
| H5 | 1410° C./8 h | 59.20 | 2.72 | 9.09 | 14.82 | 50.58 | 9.68 | 8.61 | 17.42 | 2.4 |

TABLE 17A-continued

Porosity Properties of Ceramic Honeycomb Bodies

| Honeycomb Extrusion Example No. | Firing Conditions: Top Temperature and Soak Time | Total Porosity (%) | D10 (μm) | D50 (μm) | D90 (μm) | Interbead Porosity (%) | Interbead Median Pore Size (μm) | Intrabead Network Contribution Porosity (% relative total network volume) | Intrabead Porosity in a Bead (% relative individual bead volume) | Intrabead Median Pore Size (μm) |
|---|---|---|---|---|---|---|---|---|---|---|
| H6 | 1380° C./4 h | 62.42 | 2.11 | 8.01 | 14.29 | 50.13 | 9.04 | 12.29 | 24.65 | 2.18 |
| H6 | 1380° C./10 h | 60.78 | 2.14 | 7.84 | 14.54 | 49.01 | 8.72 | 11.76 | 23.07 | 2.23 |
| H6 | 1400° C./4 h | 63.34 | 2.12 | 7.81 | 15.10 | 50.66 | 8.72 | 12.67 | 25.67 | 2.18 |
| H6 | 1410° C./4 h | 55.57 | 2.93 | 7.72 | 15.42 | 47.79 | 8.29 | 7.78 | 14.9 | 2.51 |
| H6 | 1410° C./8 h | 58.04 | 2.71 | 7.96 | 14.82 | 49.43 | 8.65 | 8.6 | 17 | 2.4 |
| H7 | 1380° C./4 h | 63.42 | 1.64 | 10.53 | 20.21 | 48 | 11.8 | 15 | n/a | 2 |
| H7 | 1380° C./10 h | 61.04 | 1.81 | 11.31 | 22.11 | 40.01 | 13.62 | 20.25 | 33.76 | 2.52 |
| H14 | 1410° C./4 h | 60.51 | 2.19 | 11.78 | 22.96 | 45.38 | 13.04 | 15.13 | 27.7 | 2.37 |
| H15 | 1380° C./4 h | 61.80 | 2.02 | 11.80 | 25.94 | 46.20 | 13 | 15.6 | n/a | 1.5 |
| H15 | 1410° C./4 h | 60.26 | 2.38 | 12.44 | 22.81 | 45.87 | 13.62 | 14.39 | n/a | 2.5 |
| H16 | 1380° C./4 h | 58.70 | 2.45 | 12.86 | 31.79 | 45.80 | 14 | 12.9 | n/a | 3 |
| H16 | 1410° C./4 h | 58.11 | 3.22 | 15.27 | 37.72 | 47.90 | 10.21 | 16.6 | n/a | 3.2 |

TABLE 17B

Porosity Properties of Ceramic Honeycomb Bodies, Continued

| Honeycomb Extrusion Example No. | Firing Conditions: Top Temperature and Soak Time | Total Porosity (%) | D10 (μm) | D50 (μm) | D90 (μm) | Interbead Porosity (%) | Interbead Median Pore Size (μm) | Intrabead Network Contribution Porosity (% relative total network volume) | Intrabead Porosity in a Bead (% relative individual bead volume) | Intrabead Median Pore Size (μm) |
|---|---|---|---|---|---|---|---|---|---|---|
| H17 | 1380° C./4 h 1410° C. Spike | 68.55 | 1.87 | 11.82 | 17.78 | 53.41 | 14.44 | 15.14 | 32.5 | 2.06 |
| H17 | 1320° C./4 h 1350° C. Spike | 70.90 | 1.87 | 11.76 | 17.89 | 55.3 | 13.78 | 15.59 | 34.88 | 1.8 |
| H17 | 1380° C./20 h | 65.66 | 2.21 | 12.74 | 19.91 | 49.04 | 15.49 | 16.62 | 32.62 | 2.4 |
| H20 | 1380° C./4 h | 62.40 | 2.90 | 16.59 | 24.03 | 51.1 | 18.1 | 11.3 | 22 | 3.3 |
| H20 | 1380° C./20 h | 63.00 | 3.21 | 17.55 | 26.33 | 50.78 | 18.58 | 12.22 | 24.83 | 3.69 |
| H18 | 1320° C./4 h 1350° C. Spike | 57.91 | 3.15 | 12.15 | 16.36 | 50.26 | 13 | 7.65 | 15.38 | 3.18 |
| H18 | 1380° C./4 h 1410° C. Spike | 54.80 | 5.11 | 14.14 | 20.40 | 50.27 | 14.78 | 4.57 | 9.19 | 4.83 |
| H18 | 1380° C./4 h | 55.67 | 3.29 | 16.21 | 16.21 | 49.11 | 12.89 | 6.55 | 12.87 | 4.65 |
| H19 | 1320° C./4 h 1350° C. Spike | 56.34 | 2.85 | 11.73 | 14.82 | 50 | 12.4 | 6.3 | 12.5 | 2.4 |
| H19 | 1380° C./4 h 1410° C. Spike | 54.40 | 5.13 | 14.00 | 21.21 | 49.81 | 14.4 | 4.63 | 9.23 | 3.95 |
| H19 | 1380° C./4 h | 56.07 | 3.69 | 12.39 | 15.37 | 47.88 | 13.06 | 8.18 | 15.69 | 3.22 |
| H21 | 1380° C./20 h | 55.85 | 2.55 | 13.29 | 17.30 | 45.8 | 14.31 | 10.05 | 18.55 | 2.76 |
| H23 | 1380° C./4 h | 65.11 | 2.19 | 11.39 | 16.87 | 53.35 | 13.23 | 11.75 | 25.19 | 2.18 |
| H23 | 1425° C./4 h | 63.66 | 2.27 | 12.52 | 16.91 | 52.97 | 13.48 | 10.68 | 22.71 | 2.4 |
| H24 | 1380° C./4 h | 64.30 | 2.91 | 15.33 | 23.60 | 50.71 | 16.78 | 13.58 | 27.55 | 3.15 |
| H24 | 1425° C./4 h | 63.02 | 3.28 | 15.95 | 22.24 | 52.67 | 17.18 | 10.35 | 21.86 | 3.75 |
| H24 | 1380° C./4 h 1410° C. Spike | 64.09 | 3.04 | 16.21 | 25.08 | 52.02 | 18.04 | 12.07 | 25.16 | 3.16 |
| H24 | 1320° C./4 h 1350° C. Spike | 61.53 | 3.93 | 17.19 | 26.39 | 52.7 | 19 | 8.8 | 22.87 | 3.2 |

TABLE 17C

Porosity Properties of Ceramic Honeycomb Bodies, Continued

| Honeycomb Extrusion Example No. | Firing Conditions: Top Temperature and Soak Time | Total Porosity (%) | D10 (μm) | D50 (μm) | D90 (μm) | Interbead Porosity (%) | Interbead Median Pore Size (μm) | Intrabead Network Contribution Porosity (% relative total network volume) | Intrabead Porosity in a Bead (% relative individual bead volume) | Intrabead Median Pore Size (μm) |
|---|---|---|---|---|---|---|---|---|---|---|
| H25 | 1380° C./4 h | 64.20 | 1.67 | 9.53 | 17.48 | 46.71 | 11.2 | 17.49 | 32.82 | 1.82 |
| H25 | 1380° C./4 h | 63.92 | 1.69 | 9.84 | 17.17 | 46.1 | 11.21 | 17.81 | 33.04 | 1.83 |
| H25 | 1380° C./4 h | 64.54 | 1.69 | 9.86 | 17.71 | 48.18 | 11.2 | 16.36 | 31.57 | 1.84 |
| H25 | 1410° C./4 h | 61.60 | 1.89 | 10.75 | 22.17 | 46.43 | 12.13 | 15.16 | 28.3 | 1.82 |
| H25 | 1410° C./4 h | 61.73 | 1.89 | 10.97 | 26.30 | 45.59 | 12.8 | 16.14 | 29.67 | 2.08 |
| H25 | 1410° C./4 h | 62.57 | 1.86 | 10.12 | 18.67 | 46.69 | 11.78 | 15.87 | 29.77 | 1.82 |
| H26 | 1380° C./4 h | 61.98 | 3.12 | 16.82 | 63.42 | 54.34 | 18.06 | 7.63 | 16.71 | 2.5 |
| H26 | 1380° C./4 h | 61.36 | 3.17 | 15.98 | 49.36 | 53.4 | 17.19 | 7.96 | 17.08 | 2.5 |
| H26 | 1410° C./4 h | 59.07 | 3.81 | 16.89 | 56.53 | 50.92 | 17.29 | 8.15 | 16.6 | 2.52 |
| H26 | 1410° C./4 h | 59.40 | 3.76 | 16.03 | 52.31 | 53.26 | 16.53 | 6.14 | 13.15 | 2.39 |
| H26 | 1410° C./4 h | 58.48 | 4.05 | 17.09 | 49.61 | 52.42 | 18.06 | 6.05 | 12.71 | 2.76 |

TABLE 17D

Porosity Properties of Ceramic Honeycomb Bodies, Continued

| Honeycomb Extrusion Example No | Firing Conditions: Top Temperature and Soak Time | Total Porosity (%) | D10 (μm) | D50 (μm) | D90 (μm) | Interbead Porosity (%) | Interbead Median Pore Size (μm) | Intrabead Network Contribution Porosity (% relative total network volume) | Intrabead Porosity in a Bead (% relative individual bead volume) | Intrabead Median Pore Size (μm) |
|---|---|---|---|---|---|---|---|---|---|---|
| H32 | 1380° C./4 h | 61.93 | 1.61 | 9.42 | 13.43 | 46.66 | 10.9 | 15.27 | 28.62 | 1.83 |
| H33 | 1350° C./4 h | 62.35 | 4.96 | 16.26 | 25.31 | 57.62 | 17.28 | 4.72 | 11.15 | 3.23 |
| H33 | 1320° C./4 h | 63.62 | 4.64 | 16.00 | 32.39 | 59.14 | 16.9 | 4.48 | 10.96 | 2.65 |
| H33 | 1380° C./4 h | 61.68 | 6.07 | 17.20 | 29.59 | 57.65 | 18.11 | 4.04 | 9.53 | 3.24 |
| H34 | 1380° C./4 h | 59.98 | 3.55 | 13.22 | 18.80 | 52.86 | 14.12 | 7.13 | 15.12 | 2.65 |
| H35 | 1380° C./4 h | 60.01 | 3.48 | 12.80 | 33.61 | 52.89 | 13.66 | 7.12 | 15.11 | 2.62 |
| H36 | 1380° C./4 h | 61.76 | 2.87 | 12.09 | 16.07 | 45.66 | 13.34 | 16.1 | 29.63 | 3.18 |
| H37 | 1380° C./4 h | 60.68 | 2.67 | 11.60 | 21.72 | 47.75 | 13.18 | 12.93 | 24.75 | 3.22 |
| H38 | 1380° C./4 h | 62.23 | 1.34 | 6.99 | 9.24 | 42.17 | 8.13 | 20.07 | 34.7 | 1.48 |
| H39 | 1380° C./4 h | 59.92 | 1.35 | | 8.71 | 42.65 | 6.27 | 17.27 | 30.11 | 1.82 |
| H40 | 1380° C./4 h | 60.81 | 3.71 | 14.20 | 20.75 | 54.04 | 15.18 | 6.77 | 14.74 | 2.61 |
| H40 | 1350° C./4 h | 61.46 | 3.24 | 13.44 | 21.38 | 53.89 | 14.63 | 7.56 | 16.4 | 1.82 |
| H41 | 1320° C./4 h | 62.62 | 2.13 | 11.21 | 15.25 | 51.23 | 12.3 | 11.39 | 23.35 | 1.82 |
| H41 | 1350° C./4 h | 62.27 | 2.19 | 11.23 | 17.24 | 51.89 | 12.47 | 10.38 | 21.58 | 1.82 |
| H42 | 1380° C./4 h | 61.01 | 2.16 | 10.80 | 25.42 | 51.01 | 11.66 | 10 | 20.41 | 1.8 |
| H43 | 1380° C./4 h | 52.32 | 1.21 | 4.32 | 5.89 | 38.05 | 5.05 | 14.27 | 23.03 | 1.47 |
| H44 | 1380° C./4 h | 51.67 | 1.22 | 5.93 | 8.88 | 32.51 | 7.07 | 19.16 | 28.39 | 1.48 |
| H44 | 1320° C./4 h | 63.20 | 1.20 | 5.71 | 9.38 | 37.18 | 7.73 | 26.02 | 41.42 | 1.48 |
| H44 | 1350° C./4 h | 58.32 | 1.21 | 5.79 | 8.82 | 34.37 | 7.22 | 23.95 | 36.5 | 1.48 |
| H45 | 1380° C./4 h | 61.46 | 1.55 | 10.25 | 13.57 | 43.89 | 11.57 | 17.57 | 31.31 | 1.48 |
| H46 | 1380° C./4 h | 60.02 | 1.53 | 10.92 | 24.23 | 43.29 | 12.34 | 16.73 | 29.5 | 1.82 |
| H47 | 1380° C./4 h | 61.00 | 1.62 | 9.52 | 19.05 | 44.8 | 11.14 | 16.2 | 29.35 | 1.83 |
| H47 | 1380° C./10 h | 59.79 | 1.74 | 10.23 | 16.68 | 44.59 | 11.54 | 15.2 | 27.43 | 1.83 |

TABLE 18A

Thermomechanical Properties of Ceramic Honeycomb Bodies

| Honeycomb Extrusion Example No. | Firing Conditions: Top Temperature and Soak Time | CTE axial (RT-800° C.) $10^{-7}$ K-1 | CTE axial (RT-1000° C.) $10^{-7}$ K-1 | CTE tang (RT-800° C.) $10^{-7}$ K-1 | CTE tang (RT-1000° C.) $10^{-7}$ K-1 | MOR @ RT (psi) | Emod @ RT (psi) | Strain tol. (%) | Trans i-ratio (110)/((110) + (002)) | Axial i-ratio (110)/((110) + (002)) |
|---|---|---|---|---|---|---|---|---|---|---|
| H1 | 1380° C./4 h | 15.2 | 17.1 | | | 243 | 1.42E+5 | 6.171 | | |
| H1 | 1410° C./4 h | 14.8 | 16.9 | | | 261 | 2.65E+5 | 0.098 | | |
| H2 | 1380° C./4 h | 16.5 | 18.4 | 17.6 | 19.5 | 216 | 2.49E+5 | 0.087 | 0.71 | 0.69 |

TABLE 18A-continued

Thermomechanical Properties of Ceramic Honeycomb Bodies

| Honeycomb Extrusion Example No. | Firing Conditions: Top Temperature and Soak Time | CTE axial (RT-800° C.) $10^{-7}$ K-1 | CTE axial (RT-1000° C.) $10^{-7}$ K-1 | CTE tang (RT-800° C.) $10^{-7}$ K-1 | CTE tang (RT-1000° C.) $10^{-7}$ K-1 | MOR @ RT (psi) | Emod @ RT (psi) | Strain tol. (%) | Trans i-ratio (110)/((110) + (002)) | Axial i-ratio (110)/((110) + (002)) |
|---|---|---|---|---|---|---|---|---|---|---|
| H2 | 1410° C./4 h | 15.2 | 17.4 | 15.2 | 17.1 | 348 | 4.18E+5 | 0.083 | 0.70 | 0.69 |
| H3 | 1380° C./4 h | 16 | 17.9 | | | 189 | 1.92E+5 | 0.099 | | |
| H4 | 1380° C./4 h | 15.2 | 17 | | | 132 | 1.31E+5 | 6.101 | | |
| H4 | 1380° C./4 h | 15.2 | 17.2 | 13.9 | 14.9 | 118 | 1.64E+5 | | 0.70 | 0.67 |
| H4 | 1380° C./10 h | 15.5 | 17.1 | 15.4 | 16.3 | 148 | 1.64E+5 | 0.090 | 0.73 | 0.67 |
| H4 | 1400° C./4 h | 15.2 | 17.3 | | | 196 | 1.70E+5 | 6.115 | 0.71 | 0.70 |
| H4 | 1415° C./15 h | 15.2 | 17.3 | 18.4 | 19.9 | 353 | 3.69E+5 | 0.096 | 0.76 | 0.64 |
| H5 | 1380° C./4 h | 14.8 | 16.8 | | | 116 | 1.29E+5 | 0.090 | 0.68 | 0.68 |
| H5 | 1380° C./4 h | 14.8 | 17 | 11.40 | 12.89 | 140 | 2.19E+5 | 0.064 | 0.69 | 0.70 |
| H5 | 1410° C./4 h | 14.7 | 16.6 | | | 224 | 2.17E+5 | | | |
| H5 | 1410° C./8 h | 15.5 | 17.1 | | | 263 | 2.45E+5 | 0.107 | 0.68 | 0.67 |
| H6 | 1380° C./4 h | 16.1 | 17.6 | | | 229 | 2.01E+5 | 0.114 | 0.70 | 0.65 |
| H6 | 1380° C./10 h | 15.2 | 17.1 | 15.6 | 16.6 | 259 | | | 0.70 | 0.68 |
| H6 | 1400° C./4 h | 16.2 | 18.1 | | | 259 | 2.67E+5 | 6.097 | 0.72 | 0.69 |
| H6 | 1410° C./4 h | 15.9 | 17.7 | | | 365 | | | | |
| H6 | 1410° C./8 h | 15.4 | 17.3 | | | 378 | 4.05E+5 | 6.093 | 0.69 | 0.65 |
| H7 | 1380° C./4 h | 14.4 | 16.2 | 15.4 | 16.5 | 94 | 1.23E+5 | 6.077 | 6.71 | 0.68 |
| H7 | 1380° C./10 h | 14.8 | 16.4 | 12.2 | 13.5 | 100 | 1.35E+5 | 0.074 | 0.66 | 0.68 |
| H14 | 1410° C./4 h | 15.2 | 17.2 | 14.1 | 15.3 | 219 | | | | |
| H15 | 1380° C./4 h | 15.70 | 17.80 | | | 110 | 1.27E+5 | 0.087 | | |
| H15 | 1410° C./4 h | 15.9 | 17.4 | | | 196 | | | | |
| H16 | 1380° C./4 h | 15.0 | 16.60 | | | 97 | 1.15E+5 | 0.084 | | |
| H16 | 1410° C./4 h | 14.1 | 16.10 | | | 136 | 1.61E+5 | 0.084 | | |

TABLE 18B

Thermomechanical Properties of Ceramic Honeycomb Bodies, Continued

| Honeycomb Extrusion Example No. | Firing Conditions: Top Temperature and Soak Time | CTE axial (RT-800° C.) $10^{-7}$ K-1 | CTE axial (RT-1000° C.) $10^{-7}$ K-1 | MOR @ RT (psi) | Emod @ RT (psi) | Strain tol. (%) |
|---|---|---|---|---|---|---|
| H17 | 1380° C./4 h 1410° C. Spike | 15.1 | 16.8 | 153 | | |
| H17 | 1320° C./4 h 1350° C. Spike | 15.6 | 16.9 | 168 | 7.30E+4 | 0.230 |
| H17 | 1380° C./20 h | 15.9 | 17.8 | | | |
| H20 | 1380° C./4 h | 15.4 | 16.9 | 136 | | |
| H20 | 1380° C./20 h | 15.4 | 17.2 | 169 | 1.78E+05 | 0.095 |
| H18 | 1320° C./4 h 1350° C. Spike | 16.5 | 18.3 | 266 | | |
| H18 | 1380° C./4 h 1410° C. Spike | 16.1 | 17.5 | 436 | | |
| H18 | 1380° C./4 h | 16.2 | 17.7 | | 3.12E+5 | |
| H19 | 1320° C./4 h 1350° C. Spike | 15.1 | 17.1 | 221 | | |
| H19 | 1380° C./4 h 1410° C. Spike | 15.5 | 17 | 331 | | |
| H19 | 1380° C./4 h | 15.2 | 17.0 | 278 | 3.23E+5 | 0.086 |
| H21 | 1380° C./20 h | 13.8 | 15.4 | 242 | 2.80E+05 | 0.086 |
| H23 | 1380° C./4 h | 14.30 | 16.3 | 209 | 2.06E+5 | 0.102 |
| H23 | 1425° C./4 h | 15.10 | 16.7 | 163 | 1.62E+5 | 0.101 |
| H24 | 1380° C./4 h | 14.10 | 15.5 | 116 | 1.45E+5 | 0.080 |
| H24 | 1425° C./4 h | 15.00 | 16.6 | 132 | 1.80E+5 | 0.073 |
| H24 | 1380° C./4 h 1410° C. Spike | 14.50 | 15.9 | 127 | 1.65E+5 | 0.077 |
| H24 | 1320° C./4 h 1350° C. Spike | | | 259 | 3.15E+5 | 0.082 |

TABLE 18C

Thermomechanical Properties of Ceramic Honeycomb Bodies, Continued

| Honeycomb Extrusion Example No. | Firing Conditions: Top Temperature and Soak Time | CTE axial (RT-800° C.) $10^{-7}$ K-1 | CTE axial (RT-1000° C.) $10^{-7}$ K-1 | MOR@ RT (psi) |
|---|---|---|---|---|
| H25 | 1380° C./4 h | 15.20 | 17.20 | 102 |
| H25 | 1380° C./4 h | 16.00 | 17.70 | 106 |
| H25 | 1380° C./4 h | 15.20 | 17.10 | 105 |
| H25 | 1410° C./4 h | 15.40 | 17.50 | 175 |
| H25 | 1410° C./4 h | 15.10 | 17.10 | 148 |
| H25 | 1410° C./4 h | 15.10 | 17.20 | 143 |
| H26 | 1380° C./4 h | 15.20 | 16.1 | 66 |
| H26 | 1380° C./4 h | 14.70 | 15.80 | 67 |
| H26 | 1410° C./4 h | 15.10 | 16.50 | 93 |
| H26 | 1410° C./4 h | 15.40 | 16.80 | 95 |
| H26 | 1410° C./4 h | 15.80 | 17.20 | 97 |

TABLE 18D

Thermomechanical Properties of Ceramic Honeycomb Bodies, Continued

| Honeycomb Extrusion Example No. | Firing Conditions: Top Temperature and Soak Time | CTE axial (RT-800° C.) $10^{-7}$ K-1 | CTE axial (RT-1000° C.) $10^{-7}$ K-1 | MOR @ RT (psi) | Emod @ RT (psi) | Trans i-ratio (110)/((110) + (002)) | Axial i-ratio (110)/((110) + (002)) |
|---|---|---|---|---|---|---|---|
| H32 | 1380° C./4 h | 17.3 | 19.0 | 302 | 3.30E+5 | 0.65 | 0.68 |
| H33 | 1350° C./4 h | 15.7 | 17.2 | | 1.77E+5 | 0.66 | 0.6 |
| H33 | 1320° C./4 h | 16.1 | 17.5 | 129 | 1.47E+5 | | |
| H33 | 1380° C./4 h | 16.7 | 18.4 | 224 | 2.46E+5 | 0.69 | 0.62 |
| H34 | 1380° C./4 h | 16.7 | 18.4 | 281 | 2.74E+5 | 0.66 | 0.67 |
| H35 | 1380° C./4 h | 16 | 17.9 | 188 | 1.98E+5 | | |
| H36 | 1380° C./4 h | 16.3 | 18.0 | 318 | 3.50E+5 | 0.67 | 0.67 |
| H38 | 1380° C./4 h | 17.0 | 18.8 | 384 | 4.18E+5 | 0.67 | 0.67 |
| H40 | 1380° C./4 h | 17.4 | 19 | 258 | 2.83E+5 | 0.68 | 0.61 |
| H40 | 1350° C./4 h | 18.4 | 20 | 213 | 2.37E+5 | 0.68 | 0.63 |
| H41 | 1320° C./4 h | 16.3 | 18 | 203 | 2.37E+5 | | |
| H41 | 1350° C./4 h | 16.1 | 17.7 | 228 | 2.59E+5 | 0.73 | 0.65 |
| H42 | 1380° C./4 h | 15.6 | 17.4 | 236 | 2.28E+5 | | |
| H45 | 1380° C./4 h | 16.3 | 18.4 | 385 | 4.89E+5 | 0.68 | 0.65 |
| H47 | 1380° C./4 h | 17.7 | 19.6 | 388 | 3.55E+5 | | |

The total porosity (sum of both interbead porosity and intrabead porosity) of the material of the walls of the ceramic honeycomb bodies materials was greater than 50%, ranging from 55% to 65%. The overall median pore size (including both interbead pore size and intrabead pore size) ranged from about 6 μm to about 12 μm. As described herein, the porosity of the material of the walls of the ceramic honeycomb bodies was bimodal with an interbead porosity in the range of about 45%-60%, and interbead median pore size (size of interstices 128) in a range from about 7 μm to 13.5 μm. The intrabead porosity of the material of the walls of the ceramic honeycomb bodies (relative to the total volume of the walls of the honeycomb body) was in a range from about 10% to 15%, with an intrabead median pore size ranging from about 1.8 μm to 2.6 μm. The breadth of the interbead porosity was very narrow with d90-d10 ranging from about 12 μm to 19 μm.

It was seen that the interbead pore size was at least partially dependent on the median bead size of the spheroidal cordierite beads used in the batch mixture (with larger beads producing larger interbead median pore sizes). Likewise, the breadth of the interbead porosity was seen to be at least partially dependent on the breadth of spheroidal bead size distribution (with a narrower breadth of the size distribution of the cordierite beads used in the batch mixture resulting in a narrow breadth of the size distribution of the interbead pores). For example, a wide breadth was purposely introduced for the cordierite beads used in honeycomb body Example H6 by mixing beads of two different median bead sizes, which resulted in a wider breadth of the interbead pores for the resulting ceramic honeycomb body.

The coefficients of thermal expansion (CTE) of the materials of the ceramic honeycomb bodies were discovered to be at least partially dependent on the size of the cordierite bead used, as domains did not extend beyond the bead size. Values for the microcrack parameter $Nb^3$ of about 0.3, in a range of about 0.05-0.55, were achieved, which enabled CTE values for the ceramic honeycomb bodies to be comparable to those achievable by traditional reactive batch honeycomb bodies.

The CTE and other thermomechanical properties of the ceramic honeycomb bodies were very isotropic, as indicated by direct measurements of axial and tangential CTE or the i-ratios of the materials. The i-ratios in both the axial and tangential direction were very similar for the material of all honeycomb bodies that were made from the batch mixtures comprising porous spheroidal cordierite beads. The ratio of the two values typically ranges around 0.99 and 1.04. In comparison, the ratio of these two i-ratio values for a cordierite honeycomb body made from a traditional reactive batch may be on the order of 1.5 or greater. Without wishing to be bound by theory, the lack of anisotropy is believed to result from the spheroidal shape of the beads, which do not undergo alignment during extrusion in comparison to platy, rod-like, or other non-spheroidal particles having greater aspect ratios, which are pushed into alignment with the flow direction through slots of the honeycomb extrusion die.

In some embodiments, the intrabead median pore size of the material of the ceramic article (as measured by MIP) is less than 5 μm, less than 4 μm, less than 3.5 μm, less than 3 μm, less than 2.5 μm, or even less than 2 μm, including ranges having these values as endpoints, such as from 1.5 μm to 5 μm, preferably from 1.5 μm to 4 μm, from 1.5 μm to 3.5 μm, from 1.5 μm to 3, from 1.5 μm to 2.5 μm, or even from 1.5 μm to 2 μm.

In some embodiments, the interbead median pore size of the material of the ceramic article (as measured by MIP) is at least 6 μm, at least 7 μm, at least 8 μm, at most 20 μm, at most 19 μm, or at most 18 μm, including ranges having these values as endpoints, such as from 6 μm to 20 μm, from 6 μm to 19 μm, from 6 μm to 18 μm, from 7 μm to 20 μm, from 7 μm to 19 μm, from 7 μm to 18 μm, from 8 μm to 20 μm, from 8 μm to 19 μm, or from 8 μm to 18 μm. As described herein, the interbead median pore size is proportional to the size of the beads used to make the ceramic article, and therefore can be influenced by selecting (e.g., via sieving) the particle size distribution of the beads used.

In some embodiments, the median pore size of the material of the ceramic article (as measured by MIP) is at least 5 μm, at least 6 μm, at least 7 μm, at most 18 μm, at most 17 μm, or at most 16 μm, including ranges having these values as endpoints, such as from 5 μm to 18 μm, from 5 μm to 17 μm, from 5 μm to 16 μm, from 6 μm to 18 μm, from 6 μm to 17 μm, from 6 μm to 16 μm, from 7 μm to 18 μm, from 7 μm to 17 μm, or from 7 μm to 16 μm.

In some embodiments, the intrabead porosity (as measured by MIP) relative to the total volume of the interconnected bead network is at least 10%, at least 12%, at least 15%, at least 18%, at least 20%, or even at least 25% including ranges having these values as endpoints, such as from 10% to 30%, from 10% to 25%, from 10% to 20%, from 10% to 15%, from 12% to 30%, from 12% to 25%, from 12% to 20%, from 15% to 30%, from 15% to 25%, from 15% to 20%, from 18% to 30%, from 18% to 25%, from 20% to 30%, or even from 25% to 35%.

Instead of the overall contribution of the intrabead porosity to the total porosity of the material formed by the interconnected network of beads, the intrabead porosity can alternatively be considered with respect to the individual volume of the beads themselves. In some embodiments, the intrabead porosity (as measured by MIP) relative to the individual volume of the beads is at least 9%, at least 10%, at least 12%, preferably at least 15%, at least 18%, or even more preferably at least 20%, at least 25%, or even at least 30%, including ranges having these values as endpoints, such as from 9% to 42%, from 9% to 35%, from 9% to 30%, from 9% to 25%, from 9% to 20%, from 9% to 15%, from 10% to 35%, from 10% to 30%, from 10% to 25%, from 10% to 20%, from 10% to 15%, from 12% to 35%, from 12% to 30%, from 12% to 25%, from 12% to 20%, more preferably from 15% to 35%, from 15% to 30%, from 15% to 25%, from 15% to 20%, from 18% to 35%, from 18% to 30%, from 18% to 25%, or even more preferably from 20% to 35%, or from 20% to 30%.

Figure 16A:
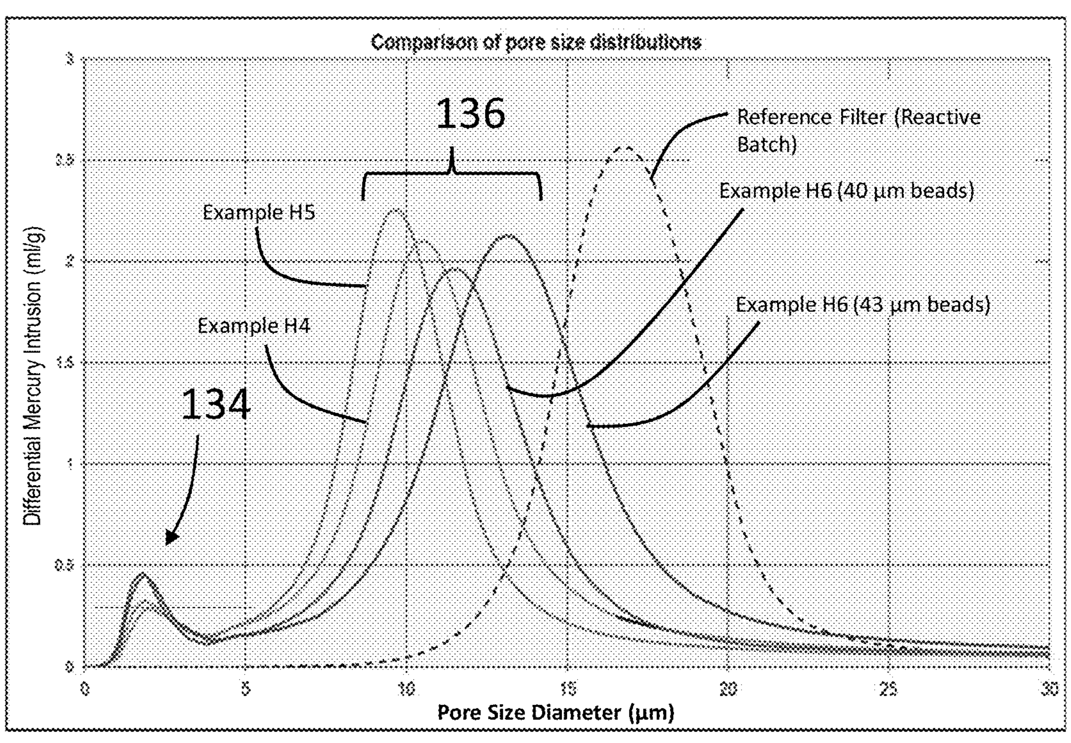
FIG. 16A shows the bimodal pore size distribution of the porous ceramic material of various honeycomb body Examples of Table 15A in comparison to a monomodal pore size distribution of a honeycomb body made from a reactive batch, as measured by MIP.

FIG. 16A is a plot showing the bimodal porosity of the indicated honeycomb body Examples of Table 15A obtained from MIP. As shown, the bimodal porosity is defined by a first peak, or local maximum, for small pore sizes corresponding to the intrabead median porosity and pore size, which is designated by reference numeral 134, and a second peak, or local maximum, for large pore sizes corresponding to the interbead median porosity and pore size, designated by reference numeral 136. In the illustrated embodiment, the intrabead porosity 134 has a median pore size of less than 5 μm (e.g., between about 1 μm and 3 μm shown) and the interbead porosity 136 has a median pore size greater than 5 μm (e.g., between about 8 μm and 14 μm shown). The local maxima of a plot can be determined by known mathematical techniques. In some embodiments, the first local maximum corresponding to the intrabead median pore size is in a range from 0.5 μm to 5 μm. In some embodiments, the second local maximum corresponding to the interbead median pore size is in a range from 5 μm to 20 μm. The pore size distribution of a reference filter having a monomodal porosity is shown by a dotted line. The reference filter, as referred to herein, was made by plugging a honeycomb body made by extruding and firing a traditional reactive-material batch, i.e., not comprising pre-reacted beads.

Figure 16A:
Figure 16B:
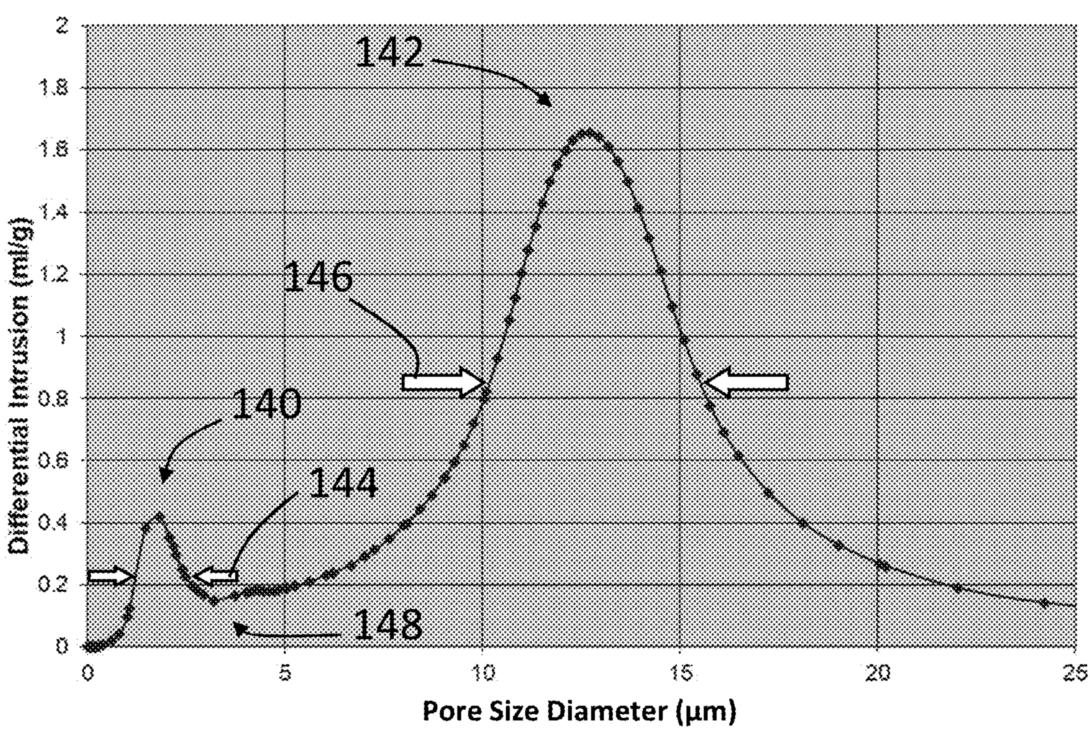
FIG. 16B shows the bimodal pore size distribution of the porous ceramic material of a honeycomb body made from porous cordierite beads, as measured by MIP.

FIG. 16B shows another example plot of a bimodal pore size distribution resulting from the intrabead and interbead porosities as described herein. The data of FIG. 16B was obtained by MIP. As shown in FIG. 16B, the bimodal pore size distribution is characterized by a first peak 140 that corresponds to the intrabead porosity and a second peak 142 that corresponds to the interbead porosity. Accordingly, the first and second peaks may be referred to respectively herein as the intrabead pore size distribution peak and the interbead pore size distribution peak, or more simply as the intrabead peak and the interbead peak. As described herein, e.g., with respect to FIG. 16, first peak 140 and second peak 142 can each be characterized by a median pore size, the values of which can be determined as respective local maximums of the peaks. Accordingly, in the example of FIG. 16B, the intrabead median pore size corresponding to the first peak 140 is about 2 μm occurring at a differential intrusion of slightly more than 0.4 ml/g, while the interbead median pore size corresponding to the second peak 142 is about 13 μm occurring at a differential intrusion of about 16.5 ml/g.

Each of the peaks 140, 142 can also be characterized by the value of the full width at half maximum (FWHM). In other words, the distance between the opposite sides of the peak along the x-axis at a value on the y-axis equal to one half of the maximum y-axis value. The values of the FWHMs provide a measure characterize the breadth (e.g., relative wideness or narrowness) peaks 140, 142 of the pore size distribution. Accordingly, the values of the FWHMs of the peaks may be referred to herein as the intrabead half maximum pore size distribution peak breadth and the interbead half maximum pore size distribution peak breadth, respectively. For example, first peak 140, as shown in FIG. 16B, is annotated with arrows 144 that designate a corresponding intrabead half maximum pore size distribution peak breadth for the first peak 140, while second peak 142 is annotated with arrows 146 that designate a corresponding interbead half maximum pore size distribution peak breadth. Since the maximum of the first peak 140 in the example of FIG. 16B occurs at about 0.4 ml/g, the intrabead half maximum pore size distribution peak breadth is measured at about 0.2 ml/g and corresponds to a value of about 2 μm.

Likewise, since the maximum of the second peak 142 in the example of FIG. 16B occurs at about 16.5 ml/g, the interbead half maximum pore size distribution peak breadth is measured at about 8.25 ml/g and corresponds to a value of about 5.5 μm.

In some embodiments, the intrabead half maximum pore size distribution peak breadth is at most 2.5 μm, at most 2 μm, or even at most 1.5 μm, including any range having these values as end points, such as from 1.5 μm to 2.5 μm, from 1.5 μm to 2 μm, from 2 μm to 2.5 μm, or even from 1 μm to 1.5 μm. In some embodiments, the interbead half maximum pore size distribution peak breadth is at most 6 μm, at most 5.5 μm, or even at most 5 μm, including any range having these values as end points, such as from 5 μm to 6 μm, from 5 μm to 5.5 μm, from 5.5 μm to 6.0 μm, or even from 4.5 μm to 5 μm.

As also shown in FIG. 16B, a valley may exist between the two peaks 140, 142, which can be defined as a local minimum 148 in the pore size distribution that falls between the maximums of the intrabead and interbead peaks. In general, the peaks become more pronounced and the breadths narrower as the local minimum approached a value of zero. In some embodiments, the local minimum 148 has a value that is less than the intrabead half maximum pore size distribution peak breadth, as shown in FIG. 16B. In some embodiments, the local minimum 148 has a value that is less than 20%, less than 15%, or even less than 10% of the maximum value of the interbead pore size distribution peak 142. For example, in the example of FIG. 16B, the local minimum 148 has a value of about 1.75 ml/g, which is less than 15% of the interbead peak's maximum value of about 1.65 ml/g.

Some of the honeycomb bodies Examples of Tables 15A-15E were used to make particulate filters. To make the filters, the two-inch diameter honeycomb bodies extruded from a 300/8 die were cut to six inch lengths, masked at opposite end faces (e.g., end faces 106 and 108 in FIGS. 1-2), and plugged with a cordierite plug cement in a checkerboard pattern (e.g., as shown for the plugged honeycomb body 101 in FIG. 2). A reference filter was also made from a batch mixture comprising reactive raw ingredients (without porous cordierite beads). Even though all honeycomb bodies used for making filters had been extruded through the same die, the reactive ingredient filter and the porous cordierite bead filters had different cell geometries (largely attributable to growth of the reactive ingredient honeycomb body during firing), so that the cell geometry was 285 cpsi for the filter made from the cordierite bead-containing batch mixture and 315 cpsi for the filter made from the reactive raw ingredient batch mixture. The filters were evaluated bare, i.e., with no additional membranes, coatings, or other materials applied after firing. The diameters and skin thicknesses also differed proportionally to the difference in cpsi. As a result, normalization to the same geometry was necessary to compare the filter performance for some properties.

Figure 17:
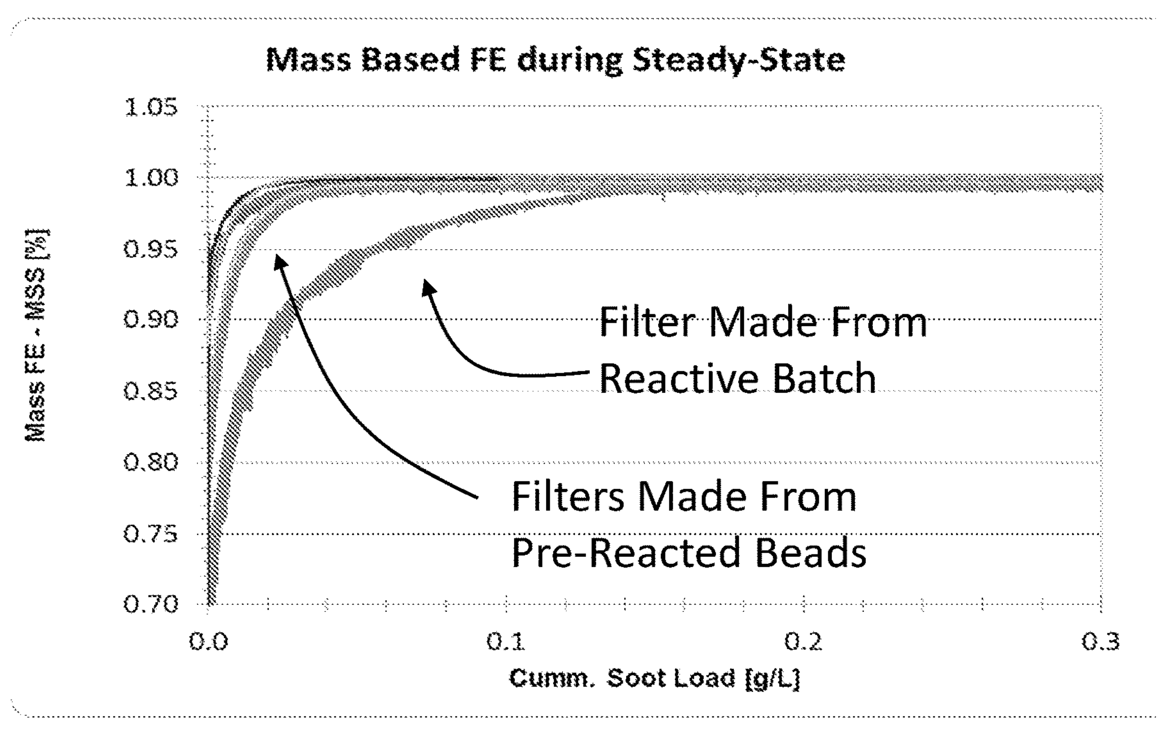
FIG. 17 is a graph showing the mass-based filtration efficiency as a function of cumulative soot load for a filter made from a traditional reactive batch in comparison to filters made from pre-reacted cordierite beads as described herein.

FIG. 17 shows a plot of mass-based filtration efficiency (FE) as function of soot load for the reference filter and multiple filters made from the honeycomb body Examples of Tables 15A-15E As soot load increases, the filter efficiency of all filters asymptotically approached approximately 100%. However, it can be seen that the reference filter had substantially lower clean (no soot load) filtration efficiency (e.g., about 70% FE when clean, increasing to about 80% at 0.01 g/L soot). All filters made from the honeycomb body Examples of Table 15A, which comprised porous cordierite beads, had substantially higher clean filtration efficiency. In all cases, the clean FE (no soot load) was greater than 80%, in some cases even greater than 90%. Additionally, filtration efficiency at 0.01 g/L soot exceeded 90% for all of the filters comprising porous beads, with many above 95%, 96%, 97%, or even 98% FE.

Figure 18:
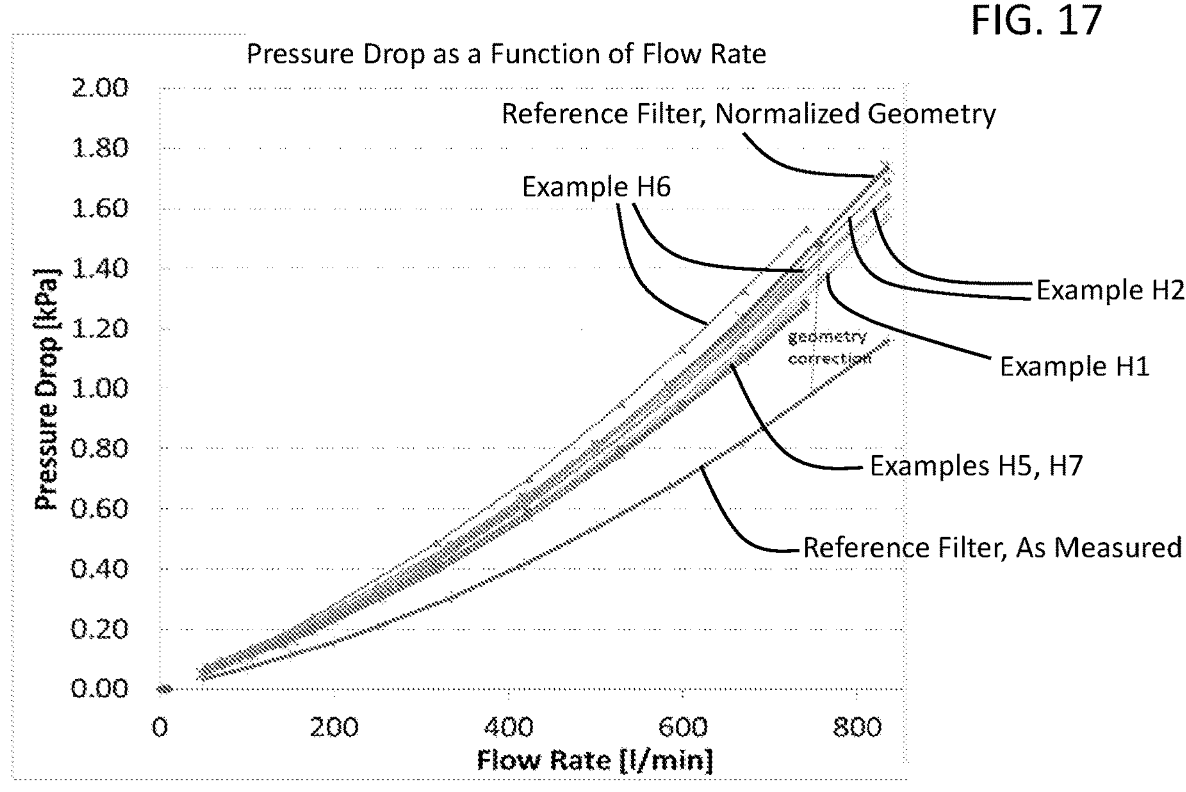
FIG. 18 is a graph showing clean pressure drop as a function of flow rate for a reference filter made from a traditional reactive batch in comparison to various filters made from honeycomb body Examples described herein.

FIG. 18 is a plot showing the pressure drop of the various filters of FIG. 18 in the form of backpressure at zero soot load as function of gas (exhaust) flow. After normalizing the geometry of a reference filter to that of the tested Examples (since the filtration efficiency is dependent on dimensional values, such as length, diameter, cpsi, etc., the reference filter was corrected to the same geometry as the Example filters), a significantly similar pressure drop value was achieved for all tested filters. Similar observations were made for the backpressure as the filters were increasingly loaded from zero soot up to a soot loading of 5 g/L.

Figure 19:
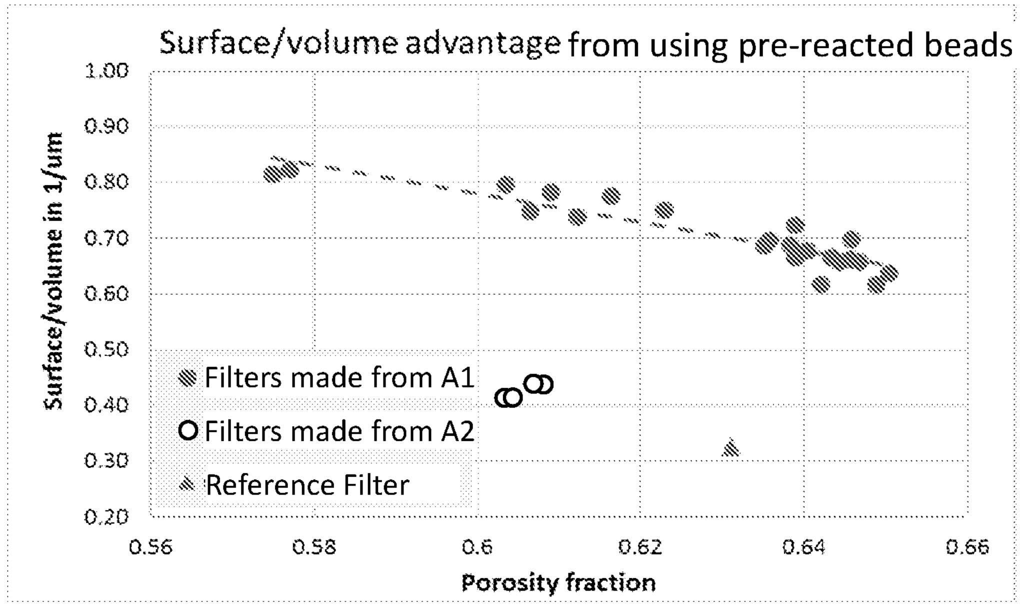
FIG. 19 is a graph showing the ratio of surface area to volume for filters made from pre-reacted cordierite beads of two types described herein in comparison to a reference filter made from a traditional reactive batch.

FIG. 19 is a plot showing the surface area of the porosity over the volume of the porosity as function of the porosity of the material. The characteristic of open (accessible) intrabead pore surface area over open intrabead porosity is correlated with filtration efficiency. More particularly, the intrabead pore channels are understood to be more numerous and tortuous as the ratio between porosity surface area and volume is increased. The pore surface area for a filter made in accordance with honeycomb body Examples H1-H5 (dark circles) is substantially greater than that of the reference filter made from a reactive ingredient batch (triangles). Data is also provided (hollow circles) corresponding to a filter comprising cordierite beads made from agglomerate Example A2 (slurry mixture Example S2), which as described above did not have a high open pore surface area, and therefore did not perform as favorability with respect to filtration efficiency when used in a bare, clean particulate filter (although it may exhibit properties or characteristics beneficial for other uses).

One contributing factor to the high filtration efficiency is the morphology of the intrabead porosity (i.e., the pore structure 124). That is, the pore structure 124 is organized in form of interconnected tortuous channels with the tortuous pore channels extending to and connected through the outer surface of the bead at the openings 126. These pore channels, penetrating the outer bead surface, have a high capillarity (narrow opening shape). The high capillarity produces a corresponding high capillarity force that attracts small particles in the gas (exhaust) flow, such as soot or ash. The high intrabead surface area of the intrabead pore structure 124 provides ample trapping sites for the particulate matter after it is pulled to the bead by the capillarity force. As a result, filtration efficiency generally increases with decreasing median pore size and increasing number of tortuous intrabead pore channels that intersect the bead surface.

In another investigation, several ceramic honeycomb bodies made in accordance with the Examples of Tables 15A-15E and fired at the conditions indicated in Table 19 were evaluated to measure their respective BET surface area values. Table 19 also includes intrabead porosity values for the analyzed ceramic honeycomb bodies, such that a comparison between surface area and intrabead porosity could be made.

TABLE 19

| BET Specific Surface Area With Respect to Intrabead Porosity Characteristics | | | |
|---|---|---|---|
| Honeycomb Extrudate Example | Honeycomb Firing Conditions: Top Temperature and Hold Time | BET Specific Surface Area ($m^2/g$) | Intrabead Total Network Contribution Porosity (% relative to total network volume) |
| H32 | 1380° C./4 h | 0.4768 | 15.27 |
| H33 | 1350° C./4 h | 0.3385 | 4.72 |
| H38 | 1380° C./4 h | 0.745 | 20.07 |
| H40 | 1350° C./4 h | 0.371 | 7.56 |
| H41 | 1350° C./4 h | 0.4726 | 10.38 |
| H44 | 1350° C./4 h | 0.6576 | 23.95 |

Figure 20A:
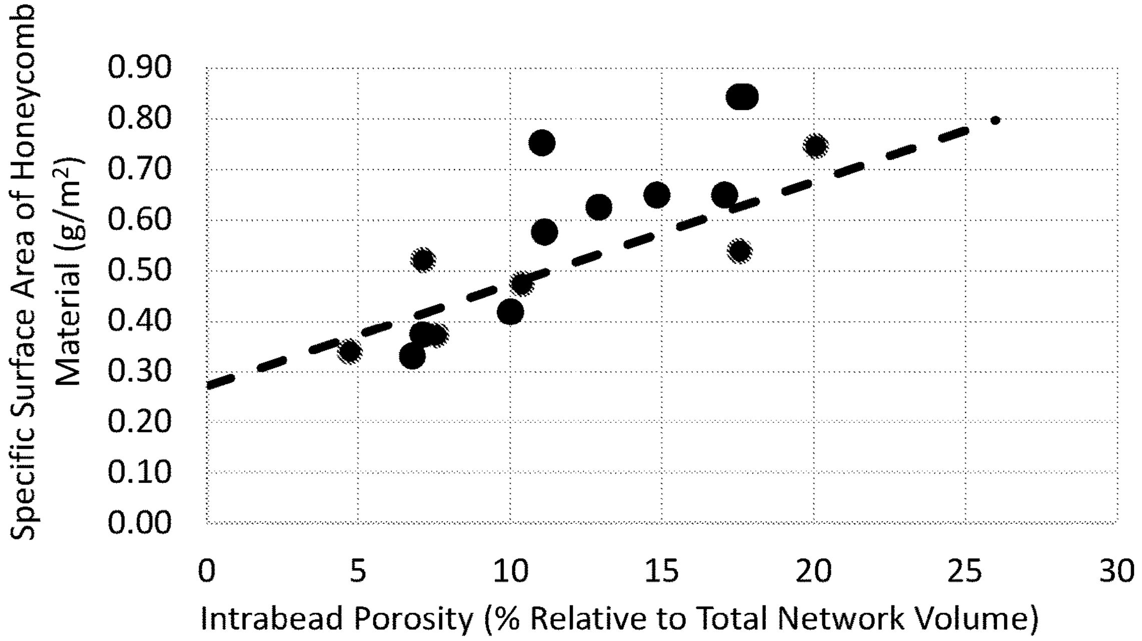
FIG. 20A is a graph showing the BET specific surface area as a function of intrabead porosity for ceramic honeycomb bodies comprising porous ceramic beads according to embodiments disclosed herein.

According to one experiment performed by the current inventors, FIG. 20A illustrates the BET obtained value of specific surface area, as a function of intrabead porosity contribution to the total network volume for the Examples in Table 19 as well as additional honeycomb bodies made generally in accordance with Examples Tables 15D-15E. From FIG. 20A, it can be seen that there is a clear relationship between specific surface area and intrabead porosity. That is, the surface area of the beads increases proportionally as the intrabead porosity in the beads 122 increases. In general, and without wishing to be bound by theory, ceramic beads with high open intrabead porosity have correspondingly high internal surface area (e.g., as measured from BET) and beads with less open porosity (and/or more closed porosity), have comparatively less surface area. According to expectations, the internal open surface area in a bead also decreases with decreasing median bead size, e.g., due to the physical size limitations of the smaller beads.

Figure 20B:
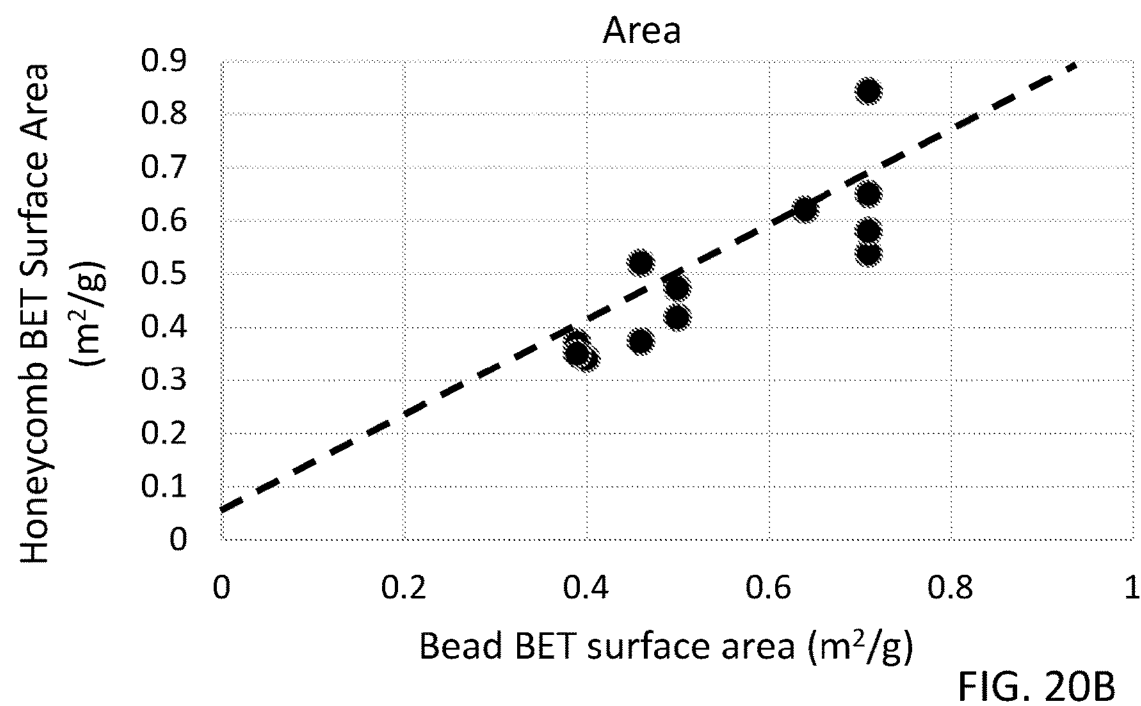
FIG. 20B is a graph showing the BET surface area of porous ceramic beads in comparison to the BET specific surface area of honeycomb bodies made from the porous ceramic beads.

According to another experiment performed by the current inventors, FIG. 20B illustrates a comparison of the BET surface area of various beads in comparison to the BET surface area of honeycomb bodies made from those beads in accordance with the Examples of Table 15D (i.e., the honeycombs comprising at least 75 wt % of the corresponding beads). Without wishing to be bound by theory, it is believed that the BET surface area of the honeycomb bodies is approximately the same as the BET surface areas of the corresponding beads due to the honeycomb bodies being predominately made from the beads (e.g., at least 75 wt % beads) and due to the beads being already "pre-reacted" when used in the manufacture of the honeycomb bodies, as described herein. Accordingly, FIG. 20B confirms that the high BET surface area of the beads can be preserved when the honeycomb bodies are made, and thereby both the beads and the honeycomb bodies made from the beads 122 can exhibit similarly high surface areas.

In another investigation, honeycomb bodies having so-called "full sized" diameters were made (e.g., diameters of at least 4 inches, which correspond to sizes applicable to, or used in, current automobile exhaust aftertreatment systems). Wall flow filters were obtained by plugging alternate channels of the honeycomb bodies in a checkerboard pattern at each end face. Plugging was achieved by applying a thin polymer film to both faces of the honeycomb body, to form a mask that blocks alternating cells from penetration of subsequently applied plugging cement. Masks can be applied by any suitable process, such as via laser masking equipment. After masking, the unmasked channels at each face were filled to a desired depth with a cold-set plugging paste, or slurry, composed of milled cordierite grog, colloidal silica, methylcellulose and water. Other plugging techniques such as patty plugging could alternatively be used. After plugging, the honeycomb bodies were placed in a drying oven at 70° C.-90° C. for at least 2 hours.

Tables 20A-20B illustrate the batch mixtures and extruder conditions to make these additional honeycomb body Examples. All cordierite bead powders used to form the Examples of Table 20A were sieved with a size 325 mesh (approx. 44 μm) and all formed by a "200/8" geometry extrusion die installed on a ram extruder. The cordierite bead powders used to form the Examples of Table 20B were sieved with either a size 270 or a size 325 mesh to achieve the indicated median particle size, and were formed having an approximately 4.66" diameter by a "300/8" geometry extrusion die installed on a ram extruder.

| Honeycomb Extrusion Example No. | H27 | H28 | H29 | H30 | H31 | H60 | H61 |
|---|---|---|---|---|---|---|---|
| Diameter and Cell Geometry | 6.55" (200/8) | 4.05" (200/8) | 4.05" (200/8) | 4.05" (200/8) | 4.05" (200/8) | 4.05" (200/8) | 4.05" (200/8) |
| Green Agglomerate Example Used to Make Beads (Median Particle Size) [Bead Firing Temp/Time] | | | | Weight Percent | | | |
| A8 (24 μm) [1380° C./8 h] | | | | 80 | | | |
| A1 (28 μm) [1380-1410° C./8 h] | 85 | | 85 | | 75 | | |
| A1 (27-28 μm) [1380-1410° C./8 h] | | | | | | 80 | |
| A1 (28-29 μm) [1380-1410° C./8 h] | | | | | | | 80 |
| A8 (40 μm) | | | | | | | |

-continued

| Honeycomb Extrusion Example No. | H27 | H28 | H29 | H30 | H31 | H60 | H61 |
|---|---|---|---|---|---|---|---|
| [1380-1410° C./8 h] | | 85 | | | | | |
| Agglomerate Example Used For Shear Binder | Weight Percent | | | | | | |
| A2 (20 μm) | 15 | 15 | 15 | 20 | 25 | 20 | 20 |
| Pore formers | Weight % Super Addition | | | | | | |
| Pea starch (crosslinked) | 25 | 25 | 25 | 25 | 25 | 28 | 25 |
| Graphite | 9 | 9 | 9 | 9 | 9 | 10 | 9 |
| Binder/Sintering Aid | Weight % Super Addition | | | | | | |
| Methylcellulose | 9 | 7 | 7 | 7 | 7 | 7 | 7 |
| Sodium Stearate | 0 | 1.4 | 1.4 | 1.4 | 1.4 | 1.4 | 0 |
| Liquids | Weight % Super Addition | | | | | | |
| MOX Oil | 0 | 4.13 | 4.13 | 4.13 | 4.13 | 4 | 7 |

TABLE 20B

Cordierite Bead-Containing Honeycomb Extrudate Examples

| Honeycomb Extrusion Example No. | | H53 | H54 | H55 | H56 | H57 | H58 | H59 | H62 |
|---|---|---|---|---|---|---|---|---|---|
| Extruder Type<br>RAM = Ram Extruder<br>TWS = Twin Screw Extruder | | RAM | RAM | RAM | RAM | RAM | RAM | RAM | RAM |
| Cordierite Beads | | | | | | | | | |
| Green Agglomerate Example No. (Median Particle Size) | Bead Firing Conditions: Temp and Time | Weight Percent | | | | | | | |
| A8 (40 μm) | 1410° C./8 h | 85 | | | | | | | |
| A8 (38 μm) | 1410° C./8 h | | 85 | | 80 | | 75 | 75 | |
| A1 (30 μm) | 1410° C./8 h | | | 85 | | 75 | | | 80 |
| Agglomerate Example Used For Shear Binder (Median Particle Size) | | Weight Percent | | | | | | | |
| A2 (20 μm) | | 15 | 15 | 15 | 20 | 25 | 25 | 25 | 20 |
| Pore formers | | Weight Percent Super Addition | | | | | | | |
| Crosslinked Pea Starch | | 25 | 25 | 25 | 25 | 25 | 25 | 25 | 28 |
| Graphite | | 9 | 9 | 9 | 9 | 9 | 9 | 9 | 10 |
| Organic Binder, Aids, and Liquid Addition | | Weight Percent Super Addition | | | | | | | |
| Hydroxypropyl Methylcellulose | | 9 | 7 | 7 | 7 | 7 | 7 | 7 | 7 |
| Sodium Stearate | | | 1.4 | 1.4 | 1.4 | 1.4 | 1.4 | 1.4 | 1.4 |
| MOX Oil | | | 4.13 | 4.13 | 4.13 | 4.13 | 4.13 | 4.13 | 4 |
| Water Call | | 46 | 56 | 65 | 62 | 52 | 49 | 48 | 54 |

The extruded green honeycomb bodies in accordance to Examples H27-H31 and H53-H62 were then fired to obtain ceramic honeycomb bodies. Porosity characteristics for the ceramic honeycomb bodies made from Examples H27-H31 and H53-H62 fired at the indicated firing conditions were measured and shown in Tables 21A and 21B.

TABLE 21A

Porosity Characteristics of Ceramic Honeycomb Bodies

| Honeycomb Extrusion Example No. | Firing Conditions: Top Temperature and Soak Time | Porosity Characteristics | | | | | | | | | | |
|---|---|---|---|---|---|---|---|---|---|---|---|---|
| | | Total porosity (%) | D10 (μm) | D50 (μm) | D90 (μm) | (D50-D10)/D50 | (D90-D10)/D50 | Interbead Porosity (% relative to total wall volume) | Interbead Median Pore Size (μm) | Intrabead Network Contribution porosity (% relative to total volume) | Intrabead Porosity in a Bead (% relative to bead volume) | Intrabead Median Pore Size (μm) |
| H27 | 1380° C./4 h | 64.15 | 2.31 | 10.99 | 18.43 | 0.79 | 1.47 | 50.86 | 12.44 | 13.29 | 27.05 | 2.29 |
| | 1380° C./4 h | 65.14 | 2.25 | 11.01 | 18.77 | 0.80 | 1.50 | 49.48 | 12.17 | 15.66 | 31 | 2.15 |
| | 1380° C./4 h | 64.31 | 2.28 | 10.72 | 18.94 | 0.79 | 1.55 | 52.85 | 11.66 | 11.45 | 24.29 | 2.23 |
| | 1380° C./4 h | 65.36 | 2.24 | 10.88 | 21.71 | 0.79 | 1.79 | 49.11 | 11.98 | 16.25 | 31.93 | 2.15 |
| H28 | 1380° C./4 h | 66.98 | 2.48 | 14.27 | 30.18 | 0.83 | 1.94 | 57.10 | 15.00 | 10.00 | 24.33 | 2.3 |
| | 1400° C./4 h | 64.09 | 3.04 | 13.21 | 27.75 | 0.77 | 1.87 | 55.85 | 14.77 | 8.24 | 18.66 | 2.61 |
| | 1410° C./4 h | 63.40 | 3.66 | 13.57 | 30.57 | 0.73 | 1.98 | | | | | |
| H29 | 1380° C./4 h | 62.39 | 1.90 | 9.04 | 16.61 | 0.79 | 1.63 | 49.55 | 9.90 | 12.85 | 25.46 | 1.8 |
| | 1380° C./4 h 1400° C. Spike | 64.35 | 2.03 | 9.22 | 17.92 | 0.78 | 1.72 | 51.48 | 10.33 | 12.87 | 26.53 | 2.08 |
| | 1380° C./4 h 1400° C. Spike | 62.96 | 2.06 | 9.13 | 17.83 | 0.77 | 1.73 | 49.80 | 10.04 | 13.16 | 26.21 | 2.15 |
| | 1380° C./4 h 1410° C. Spike | 61.44 | 2.23 | 9.34 | 19.20 | 0.76 | 1.82 | 50.71 | 10.15 | 10.73 | 21.77 | 2.16 |
| | 1380° C./4 h 1400° C. Spike | 61.87 | 2.17 | 9.21 | 17.15 | 0.76 | 1.63 | 49.50 | 10.16 | 12.37 | 24.5 | 2.17 |
| | 1408° C./9 h | 54.99 | 2.92 | 9.13 | 18.53 | 0.68 | 1.71 | 47.29 | 9.64 | 7.70 | 14.61 | 2.58 |
| | 1400° C./10 h | 55.73 | 2.82 | 9.09 | 16.73 | 0.69 | 1.53 | 46.81 | 9.90 | 8.92 | 16.77 | 2.49 |
| H30 | 1380° C./4 h | 62.22 | 1.55 | 8.15 | 14.25 | 0.81 | 1.56 | 46.90 | 9.51 | 15.32 | 28.85 | 1.47 |
| | 1380° C./4 h 1400° C. Spike | 61.60 | 1.78 | 8.80 | 16.03 | 0.80 | 1.62 | 47.91 | 10.04 | 13.69 | 26.28 | 1.82 |
| | 1380° C./4 h 1410° C. Spike | 61.31 | 1.93 | 8.92 | 17.97 | 0.78 | 1.80 | 49.25 | 10.04 | 12.06 | 23.77 | 1.82 |
| | 1380° C./4 h 1400° C. Spike | 61.09 | 1.76 | 8.70 | 16.99 | 0.80 | 1.75 | 47.73 | 9.92 | 13.36 | 25.56 | 1.82 |
| | 1408° C./9 h | 50.82 | 3.57 | 8.93 | 21.74 | 0.60 | 2.04 | 45.86 | 9.64 | 4.96 | 9.16 | 2.49 |
| | 1400° C./10 h | 57.85 | 1.98 | 8.25 | 14.58 | 0.76 | 1.53 | 46.07 | 9.51 | 11.78 | 21.85 | 1.8 |
| H31 | 1380° C./4 h | 61.73 | 1.93 | 9.19 | 18.35 | 0.79 | 1.79 | 50.16 | 10.04 | 11.57 | 23.22 | 1.8 |
| | 1380° C./4 h 1400° C. Spike | 61.52 | 2.07 | 9.27 | 16.04 | 0.78 | 1.51 | 50.78 | 10.30 | 10.74 | 21.82 | 1.79 |
| | 1380° C./4 h 1410° C. Spike | 61.66 | 1.87 | 9.14 | 16.08 | 0.80 | 1.55 | 49.33 | 10.16 | 12.33 | 24.34 | 1.79 |
| | 1380° C./4 h 1400° C. Spike | 61.32 | 2.05 | 9.45 | 18.23 | 0.78 | 1.71 | 49.82 | 10.44 | 11.50 | 22.91 | 1.83 |
| | 1408° C./9 h | 54.52 | 3.39 | 9.41 | 20.97 | 0.64 | 1.87 | 48.84 | 10.04 | 5.68 | 11.1 | 2.46 |
| | 1400° C./10 h | 59.13 | 2.17 | 9.04 | 16.64 | 0.76 | 1.60 | 48.94 | 10.04 | 10.19 | 19.96 | 2.08 |
| | 1380° C./4 h 1410° C. Spike | 61.66 | 2.23 | 9.14 | 19.20 | 0.76 | 1.86 | 49.33 | 10.16 | 12.33 | 24.34 | 1.79 |
| H60 | 1380° C./4 h | 65.33 | 1.98 | 10.36 | 19.25 | 0.81 | 1.67 | 52.8 | 11.57 | 12.53 | 26.55 | 1.83 |
| | 1400° C./4 h | 60.66 | 2.57 | 10.91 | 21.52 | 0.75 | 1.74 | 51.86 | 11.95 | 8.81 | 18.29 | 2.18 |
| | 1380° C./6 h | 64.59 | 2.13 | 10.56 | 21.18 | 0.8 | 1.80 | 52.16 | 11.61 | 12.43 | 25.98 | 2.08 |
| | 1380° C./4 h | 65.66 | 1.89 | 10.43 | 21.6 | 0.82 | 1.89 | 52.02 | 11.78 | 13.64 | 28.43 | 1.82 |
| H61 | 1380° C./4 h | 64.25 | 1.81 | 9.7 | 15.75 | 0.81 | 1.44 | 49.47 | 10.94 | 14.79 | 29.26 | 1.82 |
| | 1400° C./4 h | 63.08 | 2.10 | 9.91 | 18.14 | 0.79 | 1.62 | 50.09 | 11.09 | 12.99 | 26.02 | 2.08 |
| | 1380° C./6 h | 63.92 | 1.89 | 9.73 | 16.28 | 0.81 | 1.48 | 49.68 | 10.94 | 14.24 | 28.3 | 1.9 |
| | 1380° C./4 h | 65.17 | 1.78 | 9.67 | 17.88 | 0.82 | 1.66 | 50.08 | 10.95 | 15.09 | 30.22 | 1.82 |

TABLE 21B

Porosity Characteristics of Ceramic Honeycomb Bodies

| Honeycomb Extrudate Example No. | Honeycomb Firing Conditions: Temp. and Time | % porosity | D10 (μm) | D50 (μm) | D90 (μm) | Interbead Porosity (%) | Interbead Median Pore Size (μm) | Intrabead Porosity Network Contribution (% relative to total network volume) | Intrabead Porosity per bead (% relative to individual bead volume) | Intrabead Pore Size (μm) |
|---|---|---|---|---|---|---|---|---|---|---|
| H53 | 1380° C./4 h | 66.54 | 1.94 | 14.08 | 26.08 | 52.21 | 15.66 | 14.32 | 29.96 | 2.06 |
| H53 | 1380° C./4 h | 66.08 | 1.92 | 13.78 | 26.59 | 45.73 | 14.85 | 20.35 | 37.49 | 2.29 |
| H54 | 1380° C./4 h | 65.41 | 2.08 | 13.83 | 36.68 | 53.03 | 14.86 | 12.37 | 26.34 | 2.17 |
| H55 | 1380° C./4 h | 65.83 | 2.19 | 11.50 | 25.07 | 53.01 | 13.14 | 12.82 | 27.29 | 2.17 |
| H55 | 1400° C./4 h | 63.34 | 2.54 | 11.50 | 26.14 | 53.09 | 12.92 | 10.25 | 21.84 | 2.38 |

TABLE 21B-continued

Porosity Characteristics of Ceramic Honeycomb Bodies

| Honeycomb Extrudate Example No. | Honeycomb Firing Conditions: Temp. and Time | % porosity | D10 (μm) | D50 (μm) | D90 (μm) | Interbead Porosity (%) | Interbead Median Pore Size (μm) | Intrabead Porosity Network Contribution (% relative to total network volume) | Intrabead Porosity per bead (% relative to individual bead volume) | Intrabead Pore Size (μm) |
|---|---|---|---|---|---|---|---|---|---|---|
| H56 | 1380° C./4 h | 65.85 | 2.08 | 15.10 | 39.85 | 52.85 | 17.34 | 13.00 | 27.57 | 2.17 |
| H56 | 1400° C./4 h | 63.92 | 2.43 | 15.94 | 42.63 | 53.12 | 17.34 | 10.80 | 23.04 | 2.29 |
| H57 | 1400° C. | 61.09 | 2.33 | 10.48 | 23.43 | 49.88 | 11.59 | 11.20 | 22.34 | 2.19 |
| H57 | 1400° C. | 59.02 | 2.38 | 10.81 | 24.31 | 49.18 | 11.76 | 9.84 | 19.36 | 2.18 |
| H58 | 1400° C. | 59.49 | 2.17 | 12.76 | 30.13 | 48.21 | 14.14 | 11.28 | 21.78 | 2.18 |
| H58 | 1400° C. | 59.07 | 2.25 | 13.23 | 39.51 | 48.06 | 14.14 | 11.01 | 21.2 | 2.18 |
| H59 | 1400° C./10 h | 55.57 | 2.58 | 9.92 | 19.65 | 46.68 | 10.67 | 8.89 | 16.67 | 2.39 |
| H59 | 1380° C./4 h | 62.00 | 1.75 | 9.21 | 16.41 | 48.22 | 10.37 | 13.78 | 26.61 | 1.83 |
| H62 | 1380° C./4 h | 64.63 | 1.91 | 10.20 | 17.43 | 51.34 | 11.15 | 13.28 | 27.29 | 1.82 |
| H62 | 1400° C./4 h | 61.45 | 2.47 | 10.74 | 22.85 | 51.22 | 11.59 | 10.23 | 20.98 | 2.18 |
| H62 | 1380° C./4 h | 64.46 | 1.88 | 10.23 | 19.01 | 50.66 | 11.39 | 13.8 | 27.98 | 1.83 |
| H62 | 1380° C./6 h | 63.72 | 2.09 | 10.62 | 25.61 | 51.45 | 11.6 | 12.28 | 25.28 | 1.95 |

Honeycomb firing cycles with short hold times at top temperature of up to only 4 hours were successfully used. While such short firing cycles with high ramp rates and short top soak times enable extremely high throughput (such as through tunnel kilns), the greenware can be successfully fired using longer soak times (e.g., greater than 4 hours) and slower ramp rates (e.g., less than 50° C./hour). However, the use of longer top temperature hold times (e.g., 9-10 hours as shown in Tables 21A-21B), particularly at higher temperatures (e.g., at or above 1400° C.) generally led to densification of the beads and therefore correspondingly lower porosities.

Firing temperatures of 1380° C. to 1400° C. provided sufficient reaction of the inorganic components of shear binder agglomerates (in the form of green agglomerates A2 made from slurry mixture S2), leading to the formation of cordierite bridging that connected (sintered) between the cordierite beads, which resulted in sufficiently strong, crack-free ceramic ware. In accordance with the disclosure elsewhere herein, at the higher top soak temperatures of 1408° C.-1410° C. (thus, at least as high as the highest firing temperature used to fire the cordierite beads), an onset of honeycomb body shrinkage was generally observed in conjunction with a loss of interbead and intrabead porosity. Higher firing temperatures and/or hold times generally led to correspondingly greater amounts of shrinkage and loss of intrabead and interbead porosity. Accordingly, in some embodiments, the top firing temperature for forming the honeycomb body is at most, or preferably less than, the top firing temperature for forming the cordierite beads. In some embodiments, the top firing temperature for forming the honeycomb body is less than the top firing temperature for forming the cordierite beads, such as at least 5° C. or even at least 10° C. less.

Notably, as described herein, since the inorganic components of the cordierite beads were already reacted during firing of the beads, the components of the batch mixture for the honeycomb body do not need to undergo a significant degree of further reaction. For example, reaction may be limited to only the reactive inorganic components in the inorganic binders and/or shear binder agglomerates added to the batch, which help to sinter the cordierite beads together, while the beads themselves do not undergo any significant degree of further reaction. Furthermore, even if the beads do undergo some degree of additional reaction, the material diffusion paths are limited to within each individual bead and/or at only the contact points between the beads, as described herein.

As disclosed, the pre-reacted nature of the porous cordierite beads also enables the beads to remain stable in size, dimension, and porosity during extrusion and firing of the honeycomb bodies. Such porosity and dimensional stability is particularly able to be achieved when the top honeycomb firing temperature is selected to be at least slightly lower (e.g., at least 5° C.-10° C. lower) than the top firing temperature used to form the beads. Therefore, in the tested greenware, essentially only the pore former had to be burned out and the small amount of inorganic binder components, such as comprised by the green shear binder agglomerates, had to undergo reaction into cordierite, i.e. to assist in bonding the cordierite beads together into the network 120.

The ceramic material of the manufactured ceramic honeycomb bodies exhibited the bimodal pore size distribution described herein, having an interbead porosity and corresponding interbead pore size set by the packing of the beads, and an intrabead porosity of the material of the beads themselves, which has a corresponding intrabead median pore size. All honeycomb body Examples exhibited total porosities (interbead+intrabead) of greater than 50%, with many Examples having total porosities of greater than 60%. Median pore sizes were between about 9 and 15 μm, based on the cordierite beads used. More specifically the median bead size significantly determines the packing between the beads, and thus the interbead pore size (distance between the beads) of the resulting honeycomb body.

Tables 22A and 22B show phase assemblages for the ceramic honeycomb bodies obtained from firing Examples H27-H31 and H53-H59 with the indicated firing conditions.

TABLE 22A

| Phase Assemblages for Ceramic Honeycomb Bodies | | | | | | | | |
|---|---|---|---|---|---|---|---|---|
| Honeycomb Extrusion Example No. | Firing Conditions: Top Temperature and Soak Time | Phase assemblage from XRD w. Rietveld | | | | | | |
| | | | Cordierite | | | | | Pseudo- |
| | | Glass | Cordierite | Indialite | Sapphirine | Rutile | Mullite | brookite |
| H27 | 1380° C./4 h | | 96 | 1.3 | | 0.6 | 1.4 | 0.5 |
| | 1380° C./4 h | | 97 | 1.0 | | 0.4 | 0.7 | 0.5 |
| H28 | 1380° C./4 h w/1400° C. Spike | 6.4 | 78 | 13 | | 0.5 | 0.9 | 1.1 |
| H29 | 1380° C./4 h | | 89.29 | 8.6 | 0.13 | 0.23 | 1.32 | 0.42 |
| | 1400° C./10 h | | 81.54 | 16.49 | | 0.15 | 1.04 | 0.78 |
| H30 | 1380° C./4 h | | 88.17 | 9.48 | 0.28 | 0.45 | 1.38 | 0.24 |
| | 1400° C./10 h | | 83.29 | 15.11 | | 0.24 | 0.68 | 0.68 |
| H31 | 1380° C./4 h | | 88.4 | 9.45 | 0.57 | 0.37 | 0.89 | 0.31 |
| | 1400° C./10 h | | 85.26 | 12.5 | 0.52 | 0.3 | 0.83 | 0.59 |

TABLE 22B

| Phase Assemblages for Ceramic Honeycomb Bodies | | | | | | | | |
|---|---|---|---|---|---|---|---|---|
| Honeycomb Extrudate Example No. | Honeycomb Firing Conditions: Temp. and Time | | Cordierite | | | | | Pseudo- |
| | | Glass | Cordierite | Indialite | Sapphirine | Rutile | Mullite | brookite |
| H53 | 1380° C./4 h | | 96 | 1.4 | | 0.5 | 1.6 | 0.4 |
| H53 | 1380° C./4 h | | 96 | 1.5 | | 0.7 | 1.7 | 0.4 |
| H54 | 1380° C./4 h | 7.5 | 77 | 12 | | 0.4 | 1.1 | 1.3 |
| H55 | 1400° C./4 h | | 84 | 14 | | 0.4 | 0.8 | 0.6 |
| H56 | 1400° C./4 h | | 86 | 13 | | 0.4 | 0.8 | 0.6 |
| H56 | 1400° C./4 h | | 84 | 14 | | 0.4 | 0.7 | 0.8 |
| H57 | 1400° C./4 h | | 82 | 16 | 0.6 | 0.4 | | 0.7 |
| H57 | 1400° C./4 h | | 81 | 17 | 0.5 | 0.3 | 0.5 | |
| H58 | 1400° C./4 h | | 81 | 17 | | 0.3 | 0.8 | 0.9 |
| H58 | 1400° C./4 h | | 81 | 17 | | 0.2 | 0.8 | 0.9 |
| H59 | 1400° C./10 h | | 83 | 16 | | 0.2 | 0.5 | 0.7 |
| H59 | 1380° C./4 h | | 89 | 9.5 | | 0.4 | 0.6 | 0.3 |

The honeycomb bodies resulted in extremely high percentages of cordierite (together with the indialite polymorph), such as greater than 90 wt %, greater than 95 wt %, greater than 96 wt %, greater than 97 wt %, or even greater than 98 wt %. Secondary ceramic phases, such as sapphirine, spinel, rutile, mullite, and/or pseudobrookite were generally present in amounts less than 5 wt %, less than 4 wt %, less than 3 wt %, or even less than 2 wt %.

The ceramic honeycomb bodies made in accordance with Examples H27-H31 and H53-H62 were then plugged as noted above to form wall-flow filters. Tables 23A-23B shows the measured geometries and porosity characteristics for the resulting filter Examples.

TABLE 23A

| Filter Geometry and Porosity Characteristics | | | | | | | | | | | | |
|---|---|---|---|---|---|---|---|---|---|---|---|---|
| | Honeycomb Body | | | | | | | | | | | |
| | Honeycomb Body | Honeycomb Body Firing | Filter and Cell Geometry | | | | | Porosity Characteristics | | | | |
| Filter Example No. | Extrusion Example Used | Conditions: Temperature and Time | Part Diameter (in) | Part Length (inch) | Wall Thickness (mil) | CPSI | Plug depth (mm) | Total Porosity (%) | d50 (μm) | interbead porosity (%) | interbead D50 (pm) | Intrabead d50 (pm) |
| F27 | H27 | 1380° C./4 h | 3.99 | 5.71 | 8.9 | 226 | 7 | 64.15 | 10.99 | 51 | 12 | 2.23 |
| F29a | H29 | 1380° C./4 h | 3.78 | 5.93 | 7.9 | 231 | 6 | 62.39 | 9.04 | 49.55 | 9.9 | 1.8 |
| F29b | H29 | 1380° C./4 h 1400° C. Spike | 3.81 | 5.36 | 7.9 | 238 | 6 | 61.87 | 9.21 | 49.5 | 10.16 | 2.15 |

TABLE 23A-continued

Filter Geometry and Porosity Characteristics

| Filter Example No. | Honeycomb Body: Honeycomb Body Extrusion Example Used | Honeycomb Body: Honeycomb Body Firing Conditions: Temperature and Time | Filter and Cell Geometry: Part Diameter (in) | Part Length (inch) | Wall Thickness (mil) | CPSI | Plug depth (mm) | Porosity Characteristics: Total Porosity (%) | d50 (μm) | interbead porosity (%) | interbead D50 (pm) | Intrabead d50 (pm) |
|---|---|---|---|---|---|---|---|---|---|---|---|---|
| F29c | H29 | 1400° C./10 h | 3.70 | 5.86 | 7.9 | 238 | 6 | 55.73 | 9.09 | 46.81 | 9.9 | 2.49 |
| F30a | H30 | 1380° C./4 h | 3.77 | 5.98 | 8.0 | 231 | 6 | 62.22 | 8.15 | 46.9 | 9.51 | 1.47 |
| F30b | H30 | 1400° C./10 h | 3.60 | 5.86 | 7.9 | 240 | 6 | 57.85 | 8.25 | 46.07 | 9.51 | 1.8 |
| F31a | H31 | 1380° C./4 h | 3.79 | 5.85 | 8.1 | 231 | 6 | 61.73 | 9.19 | 50.16 | 10.04 | 1.8 |
| F31b | H31 | 1380° C./4 h 1400° C. Spike | 3.82 | 5.54 | 8.0 | 232 | 6 | 61.31 | 9.45 | 49.82 | 10.44 | 1.83 |
| F31c | H31 | 1400° C./10 h | 3.70 | 5.89 | 7.9 | 235 | 6 | 59.13 | 9.04 | 48.94 | 10.04 | 2.08 |
| F60a | H60 | 1380° C./4 h | 3.81 | 5.50 | 8.0 | 233 | 6 | 65.33 | 10.36 | 52.8 | 11.57 | 12.53 |
| F60b | H60 | 1380° C./4 h | 3.82 | 5.40 | 8.0 | 233 | 6 | 65.33 | 10.36 | 52.8 | 11.57 | 12.53 |
| F61 | H61 | 1380° C./4 h | 3.86 | 5.32 | 8.0 | 230 | 5.5 | 64.25 | 9.7 | 49.47 | 10.94 | 14.78 |

TABLE 23B

Filter Geometry and Porosity Characteristics

| Filter Example No. | Honeycomb Body: Honeycomb Body Extrusion Example Used | Honeycomb Body: Honeycomb Body Firing Conditions: Temperature and Time | Filter and Cell Geometry: Part Diameter (in) | Part Length (inch) | Wall Thickness (mil) | CPSI | Plug depth (mm) | Porosity Characteristics: Total Porosity (%) | d50 (μm) | interbead porosity (%) | interbead D50 (μm) | Intrabead d50 (μm) |
|---|---|---|---|---|---|---|---|---|---|---|---|---|
| F55 | H55 | 1400° C. | 4.3 | 4.75 | 7.80 | 341 | 6.0 | 63.35 | 11.53 | 52.4 | 13.0 | 2.5 |
| F56 | H56 | 1400° C. | 4.38 | 5.99 | 8.03 | 339 | 6.0 | 63.92 | 15.94 | 53.1 | 17.3 | 2.3 |
| F57a | H57 | 1380° C.-1400° C. | 4.32 | 5.96 | 7.08 | 350 | 5.7 | 61.09 | 10.48 | 52.7 | 11.4 | 2.3 |
| F57b | H57 | 1380° C.-1400° C. | 4.33 | 5.96 | 7.08 | 350 | 5.7 | 61.09 | 10.48 | 52.7 | 11.4 | 2.3 |
| F58a | H58 | 1380° C.-1400° C. | 4.34 | 5.98 | 7.30 | 344 | 5.9 | 59.49 | 12.85 | 49.6 | 14.1 | 2.2 |
| F58b | H58 | 1380° C.-1400° C. | 4.36 | 5.96 | 7.30 | 344 | 5.9 | 59.49 | 12.85 | 49.6 | 14.1 | 2.2 |
| F59a | H59 | 1380° C./4 h | 4.40 | 5.94 | 8.07 | 332 | 6.0 | 61.37 | 9.14 | 49.3 | 10.2 | 2.0 |
| F59b | H59 | 1380° C./4 h 1400° C. Spike | 4.42 | 5.97 | 7.96 | 324 | 6.0 | 62.00 | 9.20 | 48.2 | 10.4 | 1.8 |
| F59c | H59 | 1400° C./10 h | 4.30 | 6.00 | 7.95 | 335 | 6.0 | 55.57 | 9.92 | 46.7 | 10.7 | 2.4 |
| F62a | H62 | 1380° C./4 h | 4.46 | 6.00 | 8.44 | 321 | 6 | 64.63 | 10.20 | 51.34 | 11.15 | 2.00 |
| F62b | H62 | 1380° C./4 h | 4.44 | 5.82 | 8.44 | 321 | 6 | 64.46 | 10.23 | 50.66 | 11.39 | 1.83 |

Filter Examples from Tables 23A-23B were evaluated for their respective filter performance, as shown in Tables 24A-24B. Since filter performance characteristics, such as pressure drop and filtration efficiency, at least partially depend on the geometry of the filter (the filtration efficiency is a function of the total filtration area of the filter, which corresponds to the channel wall surface area available for flow-through), the indicated performance values given in Table 24A are also provided normalized to a standard geometry of 4.05" diameter, 5.47" length, 200 cpsi, 8 mil wall thickness, 6 mm plug depth, and uniform skin thickness of 0.8 mm, while the indicated performance values given in Table 24B are also provided normalized to a standard geometry of 5.66" diameter, 6" length, 300 cpsi, 8 mil wall thickness, 6 mm plug depth, and 0.5 mm thick skin. The normalization was performed for some Examples via two different models (Model 1 and Model 2) to better approximate the range for the normalized performance characteristics. Filtration efficiency was measured at a flow rate of 365 liters per minute (lpm). The filtration efficiencies in Tables 24A and 24B are given on a mass basis (% captured particulate mass with respect to total mass flowing into the filter). Unless specified otherwise, all filtration efficiency values given herein refer to the filtration efficiency on a mass basis. Any filtration efficiency values given herein on a particle count basis (% of captured particles with respect to total number of particles flowing into the filter) will be specifically noted as such. Pressure drop was measured at 210 cubic feet per minute (cfm), with a soot loading rate of 16 cfm.

TABLE 24A

Normalized and Measured Filter Performance

| | Normalized Performance | | | | Measured Performance | | | | |
|---|---|---|---|---|---|---|---|---|---|
| Filter Example No. | Pressure Drop (kPa) | Model 1 - Clean Filtration Efficiency (%) | Model 2 - Clean Filtration Efficiency (%) | Average of Model 1 and Model 2 - Clean FE (%) | Clean Pressure Drop (kPa) | Clean Filtration Efficiency (%) | Filtration Efficiency @ 0.01 g/l Soot Load (%) | Filtration Efficiency @ 0.02 g/l Soot Load (%) | Final Filtration Efficiency (%) |
| F27 | 3.15 | — | 81.12 | 81.12 | 4.95 | 86.35 | 93.52 | | |
| F29a | 2.87 | 82.12 | 79.48 | 80.8 | 3.91 | 79.82 | 90.84 | 96.33 | 99.99 |
| F29b | 3.15 | 80.82 | 76.72 | 78.77 | 4.21 | 78.22 | 89.20 | 95.37 | 99.81 |
| F29c | 3.52 | 81.86 | 77.44 | 79.65 | 4.83 | 77.37 | 89.02 | 95.61 | 99.97 |
| F30a | 3.27 | 85.28 | 80.47 | 82.88 | 4.29 | 82.60 | 93.05 | 97.80 | 99.57 |
| F30b | 3.27 | 83.02 | 80.06 | 81.54 | 5.07 | 78.40 | 89.20 | 95.80 | 99.95 |
| F31a | 3.07 | 82.84 | 77.73 | 80.29 | 4.10 | 79.71 | 90.94 | 96.57 | 99.91 |
| F31b | 2.98 | 79.74 | 76.88 | 78.31 | 4.0 | 78.97 | 89.19 | 95.39 | 99.95 |
| F31c | 3.15 | 81.83 | 74.07 | 77.95 | 4.48 | 75.32 | 88.72 | 95.54 | 99.98 |
| F60a | 2.75 | 72.93 | — | 72.93 | 3.72 | 73.48 | 84.01 | 91.20 | 100 |
| F60b | 2.78 | 73.75 | — | 73.75 | 3.77 | 72.77 | 82.74 | 90.71 | 100 |
| F61 | 3.05 | 77.16 | — | 77.16 | 3.86 | 77.61 | 87.72 | 94.15 | 100 |

TABLE 24B

Normalized and Measured Filter Performance

| | Normalized | | Performance | | Measured Performance | | | | |
|---|---|---|---|---|---|---|---|---|---|
| Filter Example No. | Pressure Drop (kPa) | Model 1 - Clean Filtration Efficiency (%) | Model 2 - Clean Filtration Efficiency (%) | Average of Model 1 and Model 2 - Clean FE (%) | Clean Pressure Drop (kPa) | Clean Filtration Efficiency (%) | Filtration Efficiency @ 0.01 g/l Soot Load (%) | Filtration Efficiency @ 0.02 g/l Soot Load (%) | Final Filtration Efficiency (%) |
| F55 | 2.18 | 72.9 | 74.1 | 73.5 | 2.9 | 68.75 | 82.68 | 91.26 | 99.91 |
| F56 | 2.05 | 54.8 | 49.2 | 52 | 2.78 | 51.97 | 69.38 | 79.38 | 99.88 |
| F57a | 2.13 | 67.1 | 61 | 64.05 | 2.7 | 57.94 | 74.69 | 84.11 | 99.91 |
| F57b | 2.16 | 67.3 | 60.3 | 63.8 | 2.7 | 58.12 | 74.23 | 84.28 | 99.99 |
| F58a | — | — | 75.5 | 75.5 | 2.8 | 72.49 | 84.36 | 91.69 | 100.00 |
| F58b | 2.25 | 80.5 | 76.3 | 78.4 | 2.8 | 73.50 | 84.94 | 92.08 | 99.91 |
| F59a | 2.24 | 85.3 | 82 | 83.65 | 2.83 | 81.21 | 91.49 | 96.69 | 99.98 |
| F59b | 2.06 | 83.5 | 80.3 | 81.9 | 2.55 | 80.59 | 90.54 | 95.72 | 99.90 |
| F59c | 2.3 | 83.3 | 78.8 | 81.05 | 3.14 | 76.93 | 88.23 | 94.73 | 100.00 |
| F62a | 2.09 | 80.80 | 78.20 | 79.50 | 2.65 | 78.37 | 87.04 | 93.36 | 99.96 |
| F62b | 2.09 | 79.52 | — | 79.52 | 2.64 | 77.09 | 87.29 | 93.60 | 99.99 |

All filter Examples in Table 24A exhibited excellent clean filtration efficiencies (FE), ranging from 77.37% to 86.35%. All Examples in Table 24A exceeded a filtration efficiency of at least 88% at a particulate matter (soot) loading of 0.01 g/l, and exceeded a filtration efficiency of at least 95% at a particulate matter (soot) loading of 0.02 g/l. The final FE % after continued soot loading approached values over 99.5% for all Examples, and in many cases over 99.9%. Some of the filter Examples of Table 24B had relatively lower clean filtration efficiencies (e.g., Examples F55, F56, F57a, and F57b, in particular), but also benefited from generally low pressure drop values.

Figure 21:
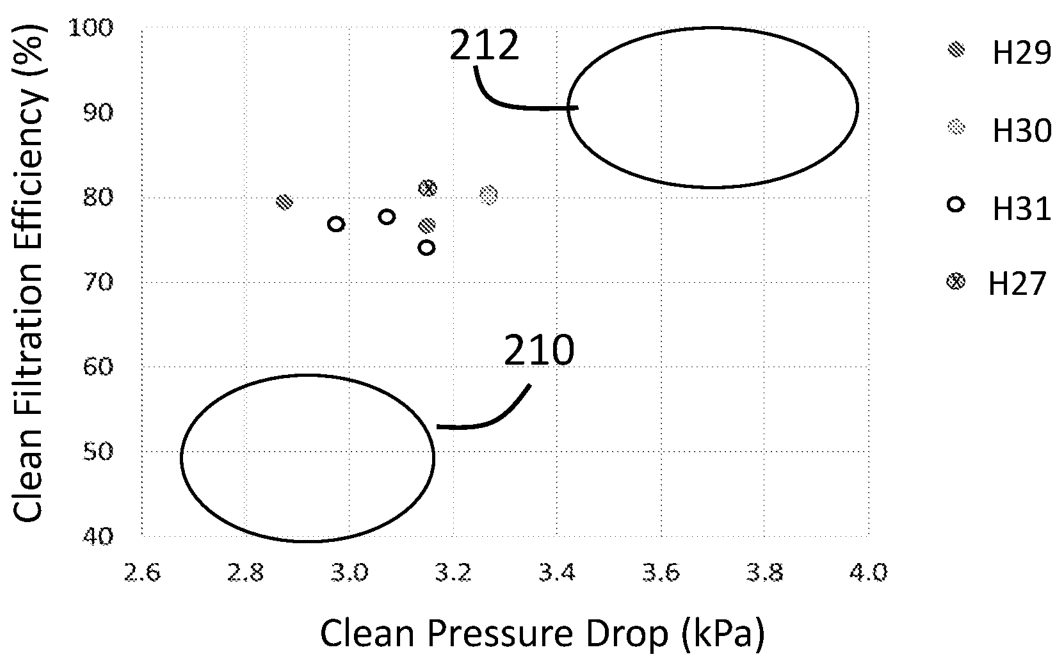
FIG. 21 is a graph showing the clean pressure and clean filtration efficiency of particulate filters as normalized to a standard geometry according to various embodiments disclosed herein.

FIG. 21 is a graph showing the normalized pressure drop and normalized filtration efficiency for several of the filter Examples of Tables 24A-24B. FIG. 21 also shows a first area 210 representative of the expected performance range for filters of the normalized geometry formed by plugging honeycomb bodies made from traditional cordierite reactive batches. As shown, a bare filter made from a reactive cordierite precursor batch at a comparable (normalized) geometry would be expected to have a clean filtration efficiency of less than 75% or even less than 70%.

Various surface treatments, such as a filtration membrane, trapping layer, or other coating, are generally known, which can be applied to the alter one or more porosity characteristics at the filtration surfaces of the inlet channels of the filters in order to enhance the filtration efficiency of the filters. These surface treatments can be added before (e.g., in the green state) or after firing. For example, a surface treatment may comprise the depositing of particles on or to the filtration surfaces of the inlet channels of a filter. Such surface treatments may be implemented to increase filtration efficiency, but at a tradeoff with a correspondingly increased pressure drop. Accordingly, FIG. 21 also shows a second area 212 representative of the expected performance of a surface-treated filter of the normalized geometry formed by plugging and applying a surface treatment to honeycomb bodies made from a traditional cordierite reactive batch.

Desirable filter performance includes high filtration efficiency at low pressure drop. Thus, the filtration Examples shown in FIG. 21 provide superior filtration efficiencies at the same or slightly greater pressure drop in comparison to the expected performance of reactive-batch filters (area 210), while having lower pressure drops in comparison to the expected performance of the surface-treated reactive-batch filters (area 212), albeit at lower filtration efficiency. However, the performance of the illustrated Examples and other filters made in accordance to the current disclosure can be advantageously achieved without the need for any additional surface treatment step or materials, thereby potentially reducing the comparative manufacturing cost and complexity of filters made in accordance with the currently disclosed embodiments.

Since filters made in accordance with the currently disclosed embodiments do not require a surface treatment (as with the filters corresponding to the expected performance of area 212 in FIG. 21), the currently disclosed filters have a microstructure that is homogeneous across the thickness of the walls (e.g., the thickness t of the walls 102 as shown in FIGS. 5A-5B) with respect to its various characteristics related to pressure drop and filtration efficiency. For example, a surface-treated filter may have a median pore size, a porosity %, or a ceramic composition at the surface (e.g., outer 10% of the wall thickness) of the filtration walls that is different in comparison this characteristic at the core or center ("bulk") of the filtration walls. Alternatively stated, a surface-treated filter may have one or more characteristics that varies across the thickness of its walls. In contrast, the porous ceramic walls of filters in accordance with the currently disclosed embodiments are substantially constant or homogeneous across the thickness of the walls, as a result of the microstructure comprising the interconnected network 120 of beads 122. For example, one or more of (such as each of) an interbead median pore size, an intrabead median pore size, a porosity, and a ceramic composition of the microstructure is homogeneous across the thickness of the intersecting walls.

In some embodiments, the clean filtration efficiency, on a mass basis, is at least 75%, at least 76%, at least 77%, at least 78%, at least 79%, at least 80%, or even at least 85%. In some embodiments, the clean filtration efficiency, on a mass basis, when normalized to a filter geometry of 4.05" diameter, 5.47" length, 200 cpsi, 8 mil wall thickness, 6 mm plug depth, and uniform skin thickness of 0.8 mm is at least 75%, at least 76%, at least 77%, at least 78%, at least 79%, or even at least 80%.

Figure 22:
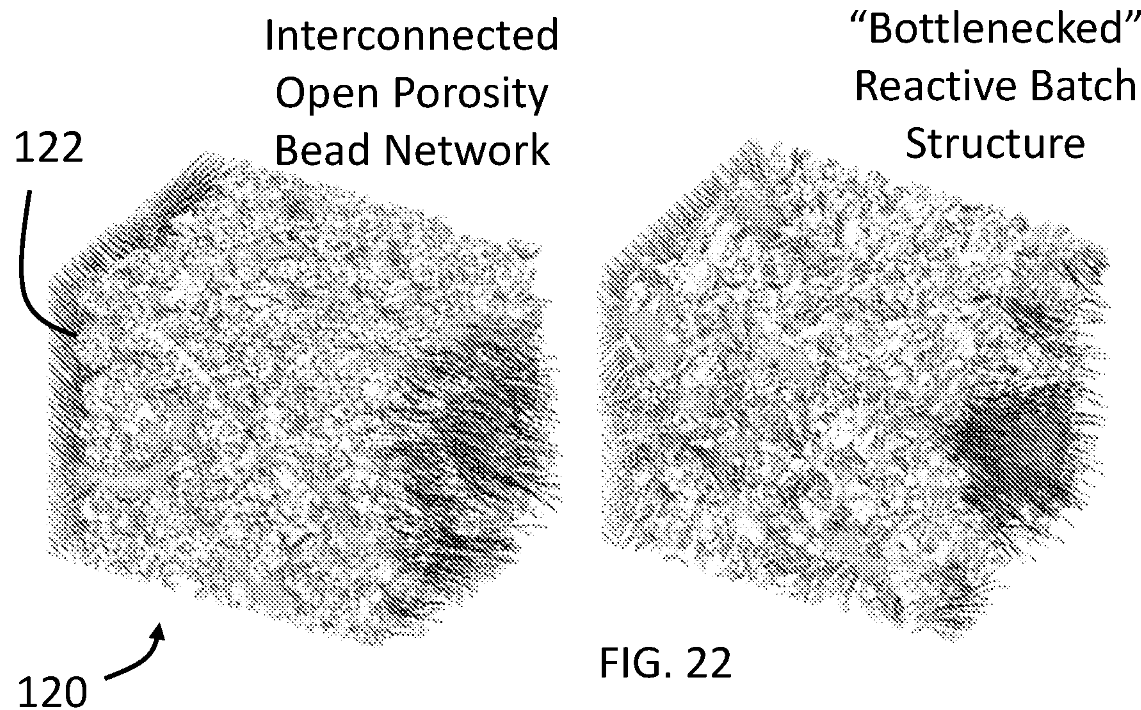
FIG. 22 is a simulation showing a portion of a wall made from an interconnect network of beads according to embodiments disclosed herein in comparison to a portion of a wall having a "bottlenecked" structure made from a traditional reactive batch.

The improved filtration efficiency of filters comprising microstructures comprising interconnected networks of open porosity beads in accordance with the embodiments disclosed herein at similar pressure drops to filters made from reactive batches can be better appreciated in view of FIG. 22. More particularly, FIG. 22 shows a simulated comparison of flow through a cube of material that comprises the interconnected network 120 of beads 122 and through a cube having a material representative of that resulting from a reactive batch. The flow is visualized by lines entering the material at the left hand side of each cube and exiting at the right hand side. As shown, the structure resulting from the reactive batch exhibits high degrees of "bottlenecking" in which pores are surrounded by the solid matter of the ceramic material. The flow is blocked by the solid matter and restricted to just the pore openings. In contrast, the interconnected network 120 of beads 122 results in a more regular or consistent flow through any given portion of the material, as the interstices are evenly spaced between the beads throughout the network 120.

In order to better illustrate the effect that intrabead pore size has on filtration efficiency, multiple filters were made from the same honeycomb extrusion Example, but under different firing conditions. For example, filter Examples F29a, F29b, and F29c were all made from honeycomb extrusion Example H29, filter Examples F30a and F30b were both made from honeycomb extrusion Example H30, and filter Examples F31a, F31b, and F31c were all made from honeycomb extrusion Example H31. In each case, the filters made from longer hold times (e.g., 10 hours for Examples F29c, F30b, and F31c in comparison to 4 hours for Examples F29a, F30a, and F31a) or with initial temperature spikes (e.g., 1400° C. spike with 1380° C. hold for Examples F29b and F31b) resulted in comparatively larger intrabead pore sizes, which correspondingly yielded at least slightly lower filtration efficiencies.

Figure 23A:
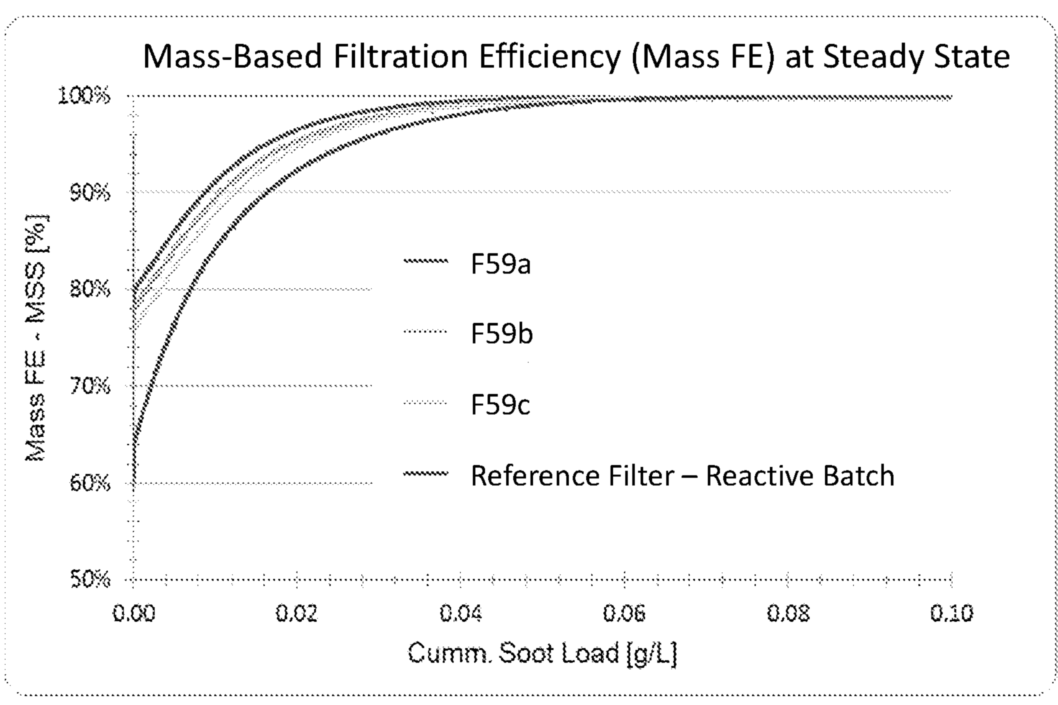
FIGS. 23A and 23B are graphs showing a mass-based filtration efficiency and a particle-based filtration efficiency, respectively, each as a function of cumulative soot load for particulate filters according to various embodiments disclosed herein.
Figure 23B:
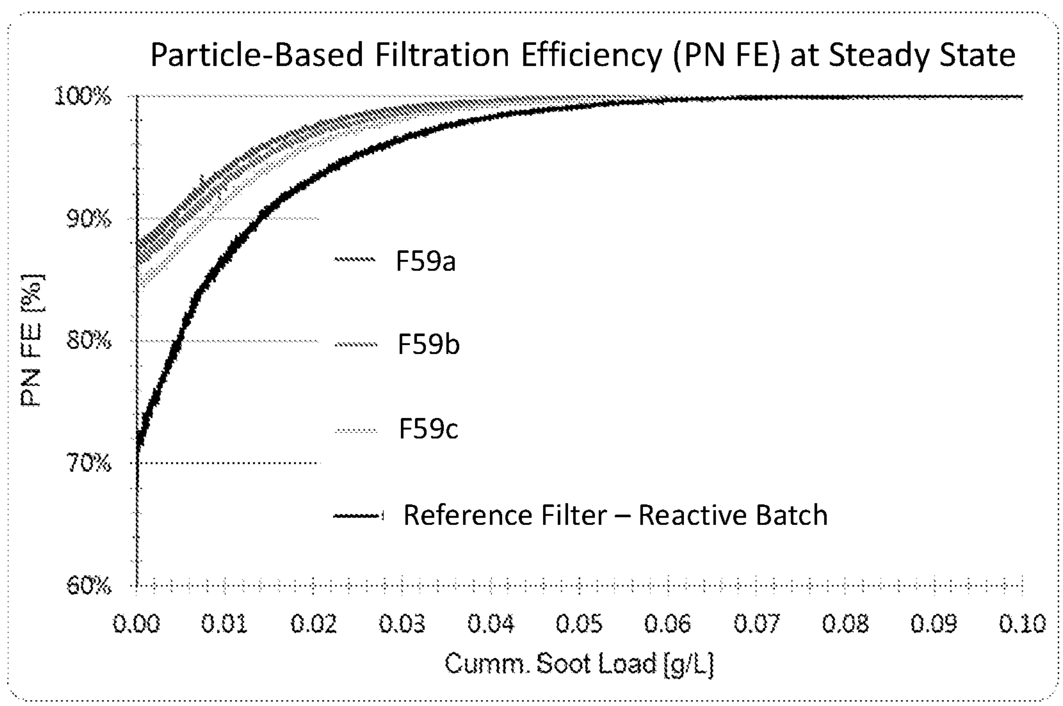

Similar to the above, filters F59a, F59b, and F59c in Table 24B were all formed from honeycomb bodies made in accordance with honeycomb extrusion Example H59, but fired under different conditions. FIGS. 23A and 23B show the filtration efficiency of Examples F59a, F59b, and F59c in comparison to a reference filter made from a traditional reactive cordierite-forming batch mixture. As shown, each of the Examples 59a-59c had a mass-based clean filtration efficiency greater than 75%, and a particle-based clean filtration efficiency of at or above about 85%, while the reference filter had a mass-based FE of about 64% and a particle-based FE of about 71%. As shown, Example 59a had a slightly higher filtration efficiency than Example 59b (fired under the same conditions but with an initial temperature spike before the hold) and a moderately higher filtration efficiency than Example 59c (fired at the same temperature as Example 59a, but for an extended hold time).

However, it can also be seen that other characteristics of the material used to make the honeycomb structure of the filters, such as the interbead median pore size, also affects the filtration efficiency. For example, filter Example F27 had an intrabead median pore size that was relatively larger than all of the other filter Examples in Table 24A, but also had one of the highest clean filtration efficiencies. Without wishing to be bound by theory, it is believed that the slightly higher clean filtration efficiency of Example F27 may have been due at least in part to the comparatively higher intrabead porosity percent of the beads used in filter Example F27. Again without wishing to be bound by theory, it is believed that the filtration efficiency is in part dependent on the intrabead surface area (which provides additional anchoring or bonding sites for particulate matter). Accordingly, since intrabead surface area has been shown herein to correlate to both intrabead porosity and intrabead median pore size, the filtration efficiency can be generally increased as the median intrabead pore size is decreased (e.g., approaching 1.5 μm or even smaller), and/or as the intrabead porosity is increased (e.g., exceeding 20% or even 25% relative to the volume of the beads). For example, from Table 21A it can be seen that the beads of honeycomb extrusion Example 27, from which filter F27 was made, consistently achieved intrabead porosities of over 25% (relative to the volume of the beads). Accordingly, despite the relatively larger intrabead median pore size (e.g., greater than 2 μm), the filter F27 achieved a superior filtration efficiency at least in part to its very high intrabead porosity (greater than 25% relative to the volume of the beads).

Figure 24A:
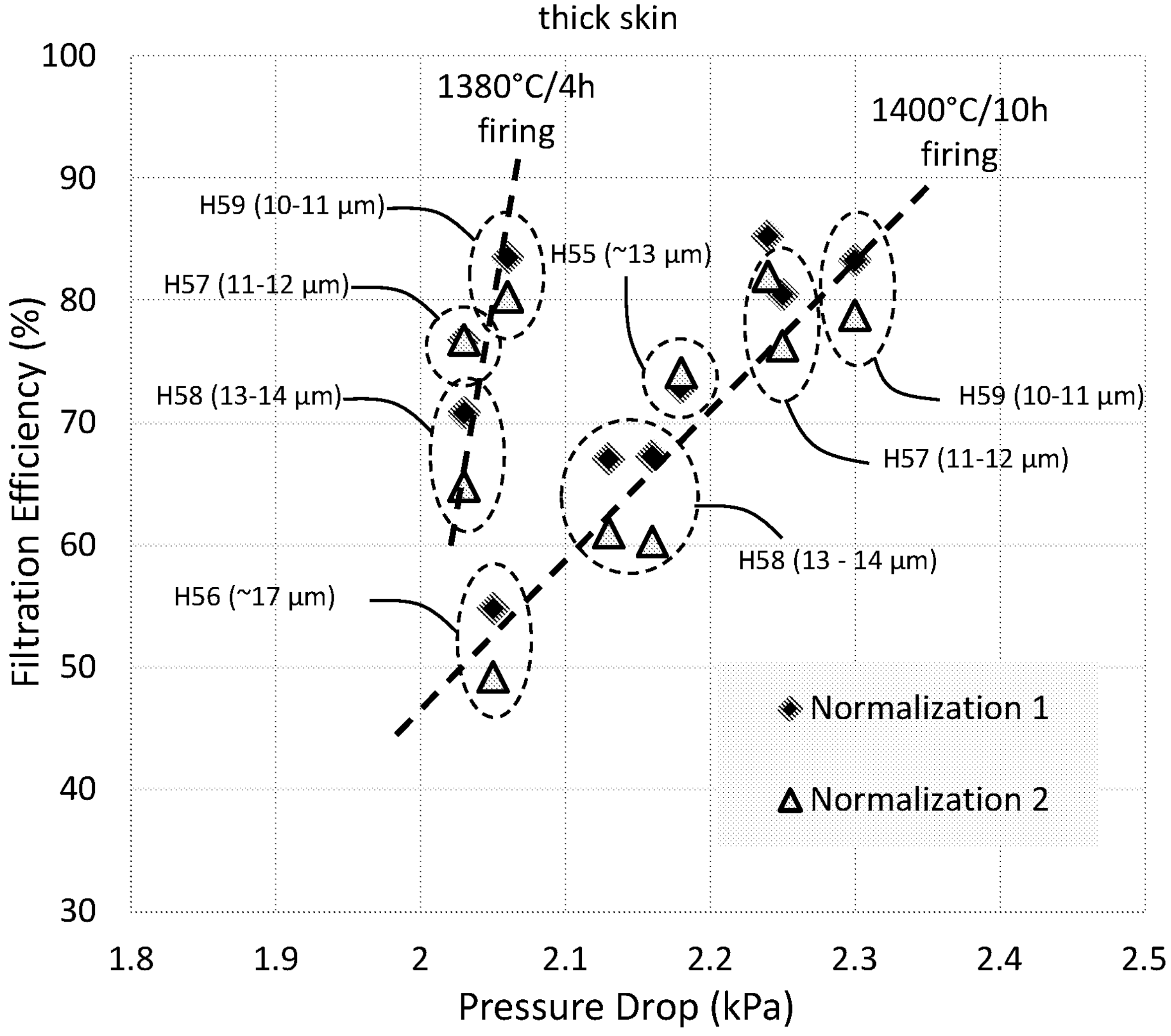
FIG. 24A is a graph showing a bare, clean filter performance, normalized to a standard geometry, for filters having different interbead median pore sizes and fired under different conditions according to various embodiments disclosed herein.

In addition to the above, FIG. 24A shows further examples to help illustrate the effect of both the firing conditions and interbead median pore size on filtration efficiency and pressure drop. In accordance with FIG. 24A, filters were formed from honeycomb bodies made in accordance with Examples H55-H59, which each had a different interbead median pore size. An approximate interbead median pore size is indicated in parenthesis for each example in FIG. 24A (more exact values of the interbead median pore size for specific Examples can be seen in Table 23B and from Table 23B it can also be seen that different firing conditions can result in changes to the interbead median pore size). Trendlines have been added to FIG. 24A to indicate the effect that interbead median pore size has on the filtration efficiency and pressure drop values at two different firing conditions (1380° C. for 4 hours and 1400° C. for 10 hours).

Accordingly, it can be seen from FIG. 24A that both filtration efficiency and pressure drop generally correlate inversely proportionally to interbead median pore size. In other words, as the interbead median pore size increases, the filtration efficiency and pressure drop correspondingly decrease. However, for a particulate filter a high filtration efficiency and low pressure drop may generally be considered desirable. Therefore, the interbead median pore size can be useful for adjusting a tradeoff between pressure drop and filtration efficiency for any given application of the filters described herein, e.g., with larger interbead median pore sizes selected if lower pressure drops are desired, or smaller interbead median pore sizes selected if higher filtration efficiencies are desired.

Furthermore, as described herein, the interbead median pore size can be set, defined, or otherwise influenced by the particle size distribution of the beads, e.g., the median bead size and/or breadth of the particle size distribution of the beads. As also described herein, the particle size distribution of the beads can be set by the initial slurry mixture, the spheroidizing process, and/or sieving of the green agglomerates and/or ceramic beads. In this way, the filtration efficiency and pressure drop can be defined, set, or otherwise influenced in some embodiments by forming the honeycomb bodies from beads having a particle size distribution (e.g., median bead size and/or particle size distribution breadth) that corresponds to an interbead median pore size that yields the targeted value for the filtration efficiency and/or pressure drop.

Also from FIG. 24A, it can be seen that different firing conditions change not only the individual pressure drop and filtration efficiency values for any given Example, but also the effect that changes in the interbead median pore size have on the filtration efficiency and pressure drop. Notably, as indicated by the slope of the trendlines, the Examples fired at 1380° C. for 4 hours had much greater increases in filtration efficiency per unit of pressure drop increase in comparison to those Examples fired at 1400° C. for 10 hours. As a result, for these Examples, the lower temperature and shorter firing cycle advantageously enabled similar filtration efficiencies at significantly lower pressure drops than longer cycles. Furthermore, the lower temperature and shorter firing cycle enabled the change in interbead median pore size to have correspondingly large improvements in filtration efficiency at relatively minor tradeoffs in pressure drop. For example, the filter made from Example H59 fired at 1380° C. for 4 hours had a significantly increased filtration efficiency at essentially the same pressure drop as the Examples H57 and H58 fired under these same conditions, while also having significantly lower pressure drop at essentially the same filtration efficiency as the Example H59 (having the same batch mixture and extrusion conditions) fired at 1400° C. for 10 h.

Figure 24B:
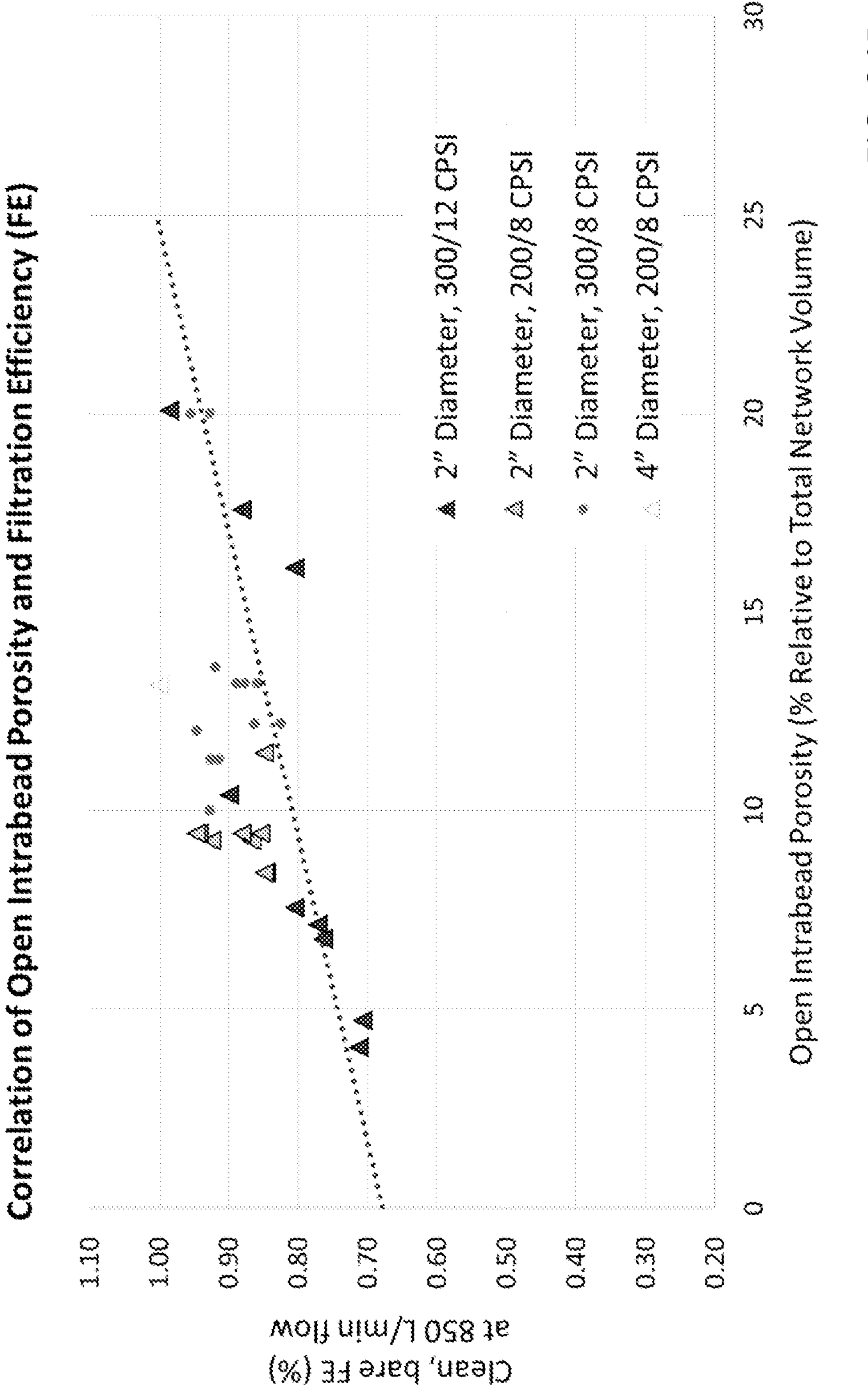
FIG. 24B is a graph showing the relationship between open intrabead porosity and filtration efficiency for filters having a variety of geometries and made from porous ceramic beads in accordance to various examples herein.

According to an experiment performed by the inventors, FIG. 24B shows the relationship between the filtration efficient for clean, bare filters made from honeycomb bodies that comprise beads having a variety of different open intrabead porosities. For example, the open intrabead porosity for each of the filter Examples of Tables 23A and 23B can be determined by subtracting the value for the interbead porosity from the value of the total porosity. The filters utilized for the data of FIG. 24B were taken at a variety of different geometries (diameters and CPSIs) and were made from honeycomb bodies generally in accordance to Examples H32-H52. As shown in FIG. 24B, while the FE is partially dependent on the geometry of the filter, a larger open intrabead porosity generally correlated to a higher filtration efficiency regardless of geometry used. Without wishing to be bound by theory, it is believed that the greater amount of open intrabead porosity results in a higher corresponding surface area, as discussed with respect to FIGS. 20A-20B above, and further, that this higher surface area in turn results in the improved filtration efficiency. For example, and again not wishing to be bound by theory, it is believed that this increase in surface area and the open porosity provides anchor sites for soot, ash, or other particulate matter and may assist in a capillary function of the beads to draw in and anchor such particulate, as described herein.

Figure 24C:
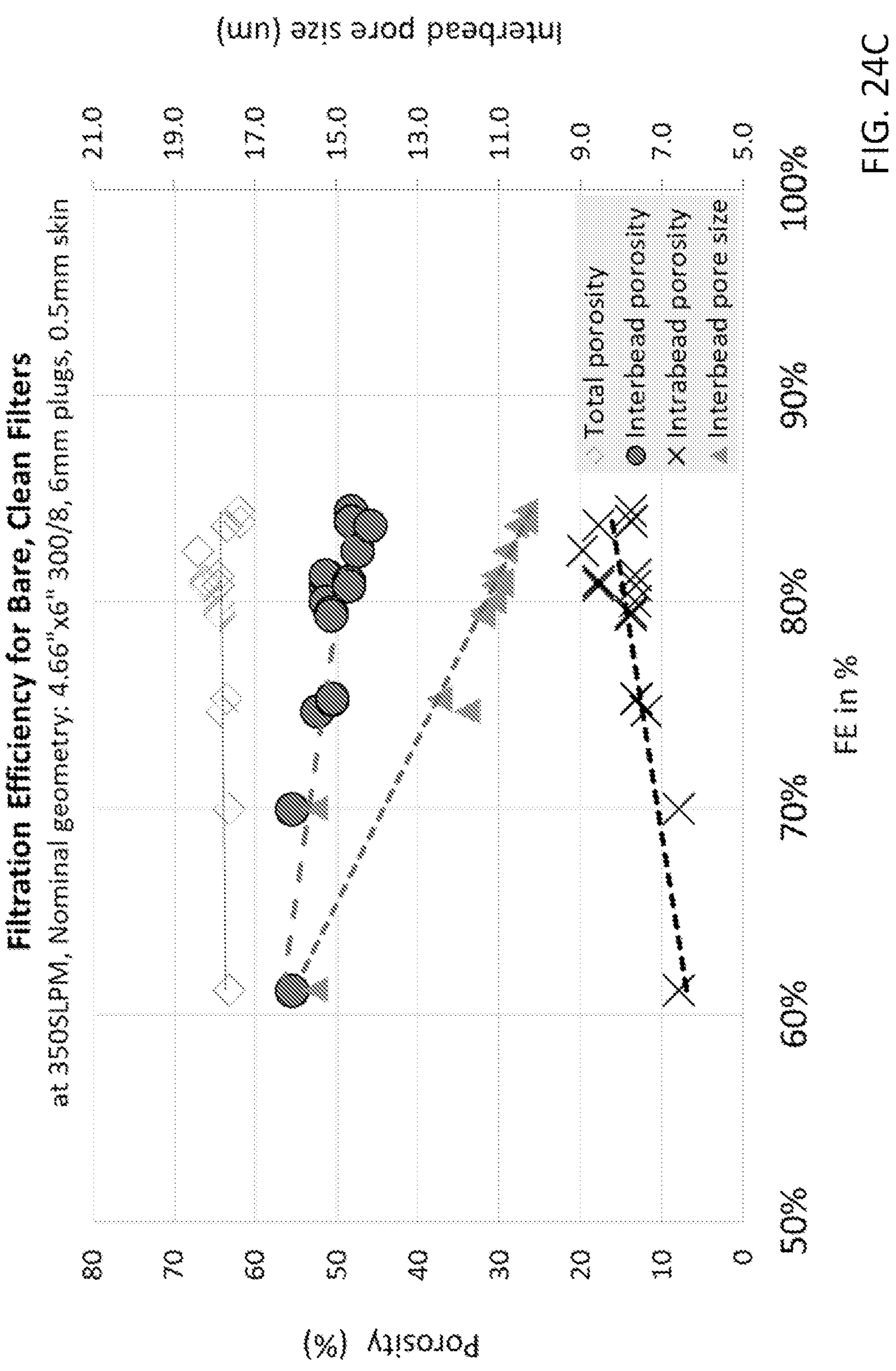
FIG. 24C is a graph showing the relationship between filtration efficiency and (i) total porosity, (ii) interbead porosity, (iii) intrabead porosity, and (iv) interbead pore size for filters made from porous ceramic beads in accordance to various examples herein.

In another experiment, the relationships between FE and (i) total porosity, (ii) interbead porosity, (iii) intrabead porosity, and (iv) interbead pore size (D50) was assessed for various filters made from honeycomb bodies generally in accordance with Examples H53-59 and H62. The FE data was assessed at a flow rate of 350 SLPM and pressure drop was assessed at 210 CFM, and the resulting data normalized to a standard geometry of 4.66 inch diameter, 6 inch axial length, 300 cpsi. 8 mil wall thickness, 6 mm long plugs, and 0.5 mm thick skin. The normalized data showed that the pressure drop was not significantly affected by interbead porosity, the intrabead porosity, or the median interbead pore size. However, as shown in FIG. 24C, the FE was found to be correlated to interbead porosity, intrabead porosity, and the median interbead pore size. All filters in FIG. 24C were selected to have approximately the same total porosity of about 65% total porosity, but differing interbead and intrabead porosities.

From FIG. 24C, it can be seen that the total porosity does not appear to correlate to FE, as the total porosity data plotted in FIG. 24C (diamond symbols) is arranged essentially along a flat horizontal line over a range of FE values. However, FE was found to decrease with increasing interbead porosity, decrease with increasing interbead pore size, and increase with increasing intrabead porosity. Accordingly, in accordance with the examples and disclosure herein, the interbead porosity, intrabead porosity, and interbead pore size are all variables that can be adjusted to influence or control the FE of filters made from high open porosity beads. In particular, the intrabead porosity is a characteristic provided by the high open porosity beads that does not exist in filters made from honeycomb bodies manufactured using traditional reactive batches or beads having low open porosities. Again, without wishing to be bound by theory, it is believed that the relationship between FE and the intrabead porosity reflects the herein described interaction of the intrabead porosity to attract, bond, and/or anchor particulate matter during use in a filter.

In some embodiments the honeycomb firing temperature is less than or equal to the ceramic bead firing temperature, and the honeycomb body firing top temperature hold time is less than the ceramic bead firing top temperature hold time.

The bimodal nature of the pore size distribution is also reflected in the percentile pore size values of the pore size distribution (e.g., the D10, D50, and D75 values). As used herein, the percentile pore size values are designated such that D10 is the pore size value in the pore size distribution that is larger than 10% of pores in the pore size distribution, D50 is the median pore size value (the pore size value in the pore size distribution that is larger than 50% of pores in the pore size distribution), D75 is the pore size value that is larger than 75% of pores in the pore size distribution, and so on.

As described herein, the pore size percentile values (e.g., D10, D50, D75, D90) can be used to characterize the bimodal nature of the pore size distribution. For example, the presence of the intrabead peak (e.g., the peak 140 of FIG. 16B), which would not be found in a pore size distribution of a ceramic article made from a traditional reactive batch, results in a concentration of small pores, and corresponding D10 values that are significantly smaller than D10 values that would occur in a ceramic article made from a reactive batch. Table 25 shows D10, D50, and D75 values, in addition to D50/D10 and D75-D50 values for ceramic bodies made from various honeycomb body Examples described above.

TABLE 25

Pore Size Distribution Values for Ceramic Articles

| Honeycomb Example No. | Firing Conditions: Temp. and Time | Porosity (%) | D10 (μm) | D50 (μm) | D75 (μm) | D50/ D10 | D75- D50 |
|---|---|---|---|---|---|---|---|
| H32 | 1380° C./4 h | 65.33 | 1.98 | 10.36 | 12.37 | 5.23 | 2.01 |
| H33 | 1380° C./4 h | 64.26 | 1.81 | 9.71 | 11.56 | 5.36 | 1.86 |
| H30 | 1380° C./4 h | 62.22 | 1.55 | 8.22 | 10.08 | 5.31 | 1.86 |
| H31 | 1380° C./4 h | 61.73 | 1.93 | 9.07 | 10.94 | 4.69 | 1.86 |
| H29 | 1380° C./4 h | 62.39 | 1.90 | 8.95 | 10.62 | 4.72 | 1.67 |
| H30 | 1400° C./10 h | 57.85 | 1.98 | 8.37 | 10.12 | 4.23 | 1.75 |
| H31 | 1400° C./10 h | 59.14 | 2.17 | 9.10 | 10.82 | 4.19 | 1.72 |
| H29 | 1400° C./10 h | 55.73 | 2.82 | 9.04 | 10.72 | 3.21 | 1.67 |
| H33 | 1380° C./4 h | 61.68 | 6.07 | 17.20 | 19.63 | 2.83 | 2.43 |
| H40 | 1380° C./4 h | 60.81 | 3.71 | 14.19 | 16.03 | 3.83 | 1.84 |
| H35 | 1380° C./4 h | 59.98 | 3.55 | 13.22 | 14.88 | 3.72 | 1.67 |
| H37 | 1380° C./4 h | 60.68 | 2.67 | 11.56 | 14.05 | 4.34 | 2.49 |
| H30 | 1408° C./9 h | 50.82 | 3.57 | 9.02 | 10.78 | 2.53 | 1.76 |
| H31 | 1408° C./9 h | 54.52 | 3.39 | 9.44 | 11.11 | 2.78 | 1.67 |
| H29 | 1408° C./9 h | 54.99 | 2.92 | 9.04 | 10.51 | 3.10 | 1.46 |

A ceramic body made from a traditional reactive batch would not have a bimodal pore size distribution, e.g., as discussed above with respect to FIGS. 16A and 16B. For a ceramic article having a porosity of at least 50%, one might expect a D10>6 μm, D50 between about 8-18 μm, D75>16 μm, D50/D10<2, and D75-D50>3 μm. In some embodiments described herein, for a porosity of at least 50% (e.g., from 50% to 70%, such as from 55% to 65%), the D10 is less than 4 μm, or even more preferably less than 3 μm, less than 2.5 μm, or even less than 2 μm, including ranges having these values as end points, such as from 2 μm to 4 μm, from 2 μm to 3 μm, from 2 μm to 2.5 μm, from 2.5 μm to 4 μm, from 2.5 μm to 3 μm, or even from 1.5 μm to 2 μm.

As a result of the concentration of smaller pores corresponding to the intrabead peak, the D50/D10 value is also quite high in comparison to ceramic articles made from reactive batches which do not have a bimodal pore size distribution. In some embodiments, the D50/D10 value is greater than 2.5, or more preferably greater than 3, greater than 4, or even greater than 5, and in some cases up to 6, including ranges having these values as end points, such as from 2.5 to 6, from 3 to 6, from 4 to 6, or even from 5 to 6.

Due to the bimodal pore size distribution, and assisted by the narrow pore size distribution peak breadths of the intrabead and interbead peaks (e.g., as described with respect to FIGS. 16A-16B), the value of the difference between the D75 and D50 values (i.e., D75-D50) is also narrow. In some embodiments, the D75-D50 value is less than 2.5 μm, or more preferably less than 2 μm, or even less than 1.5 μm, including ranges with these values as end points, such as from 1 μm to 2.5 μm, from 1 μm to 2 μm, or even from 1 μm to 1.5 μm.

Since the D50 of the final ceramic article is affected significantly by the interbead median pore size, and the interbead median pore size is affected significantly by the median particle size of the beads used to make the ceramic article, it follows that the D50 is at least partially dependent on the median particle size of the beads used to create the ceramic article. In this way, the selected median particle size of the beads can be used to engineer the resulting D50 of the ceramic article.

For example, median bead sizes ranging from about 25 μm to 50 μm have been found to generally correspond to a D50 of the ceramic article being up to about 20 μm (more specifically, in a range of about 8 μm to 18 μm). For example, the selection of beads having larger median bead sizes (e.g., a d50 of about 50 μm) could be used to shift the median pore size (D50) of the resulting ceramic article toward larger values (e.g., toward a D50 of 18-20 μm, or even larger values as larger beads are used). Similarly, selecting beads having relatively smaller median beads sizes (e.g., d50 of 25 μm) could be used to shift the median pore size (D50) of the resulting ceramic article toward relatively smaller values (e.g., toward a D50 of 8 μm, or even smaller as smaller beads are used).

In accordance with the disclosure herein, the median particle size (d50) of the beads can be affected, influenced, or even set, by removing one or more size fractions from the bead powder. In some embodiments, removal of one or more bead fractions (e.g., larger or smaller tails in the particle size distribution) is accomplished by sieving. For example, removing a larger size fraction can be implemented to lower the median bead size, while removing a smaller size fraction can be implemented to increase the median bead size.

Honeycomb bodies having a bimodal porosity and high interbead surface area also exhibit advantageous properties for use as a substrate or support for carrying a catalytic material. In some embodiments, a honeycomb body (e.g., manufactured in accordance with any of the embodiments described herein) is both plugged to act as a particulate filter (as also described above), and loaded with a catalytic material. In some embodiments, the honeycomb body is plugged without being loaded with a catalyst material, while in other embodiments the honeycomb body is loaded with a catalyst material without being plugged. The loading of a catalytic material into the porous walls of a ceramic honeycomb body can be accomplished by a washcoating process, for example, in which the catalytic material is carried by a liquid carrier of a washcoat slurry onto and/or into the porous walls, where the catalytic material is deposited.

Figure 25A:
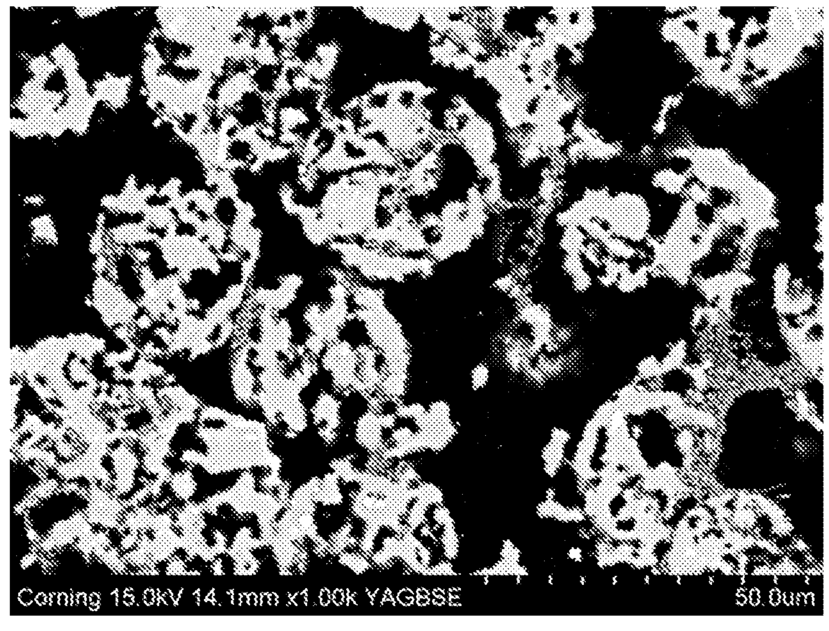
FIGS. 25A-25B show polished SEM cross-sectional images of respective portions of the wall of a honeycomb body comprising interconnected networks of cordierite beads after washcoating the honeycomb body, according to embodiments disclosed herein.
Figure 25B:
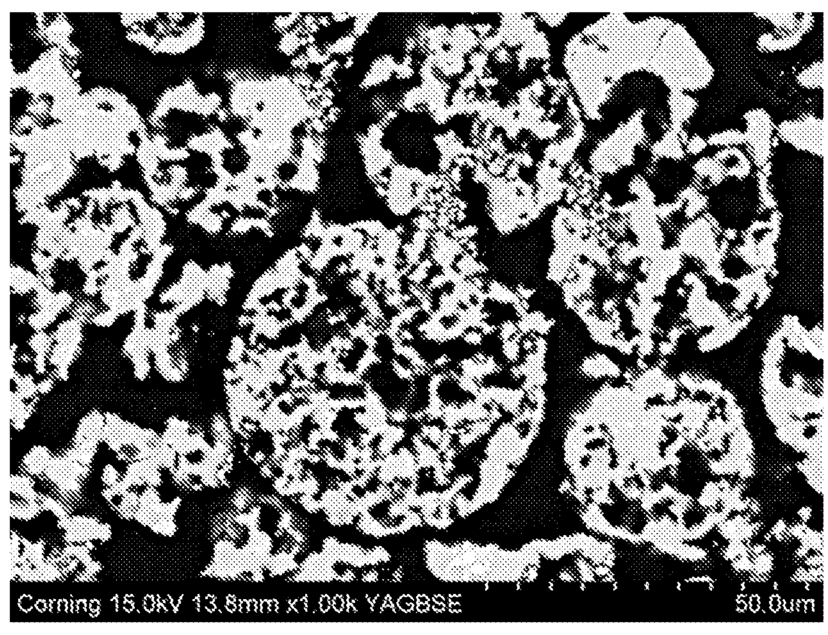

A test was conducted to evaluate the applicability of honeycomb bodies comprising porous spheroidal cordierite beads as described herein to be loaded with a catalyst material loading and assess the interactivity of these honeycomb bodies to washcoating processes. Honeycomb bodies were dipped into slurries with ultrafine (approximately 0.5 μm median particle size) and fine (approximately 1.5 μm median particle size) alumina particles. The alumina slurries were selected to act as a surrogate for a catalyst washcoat. FIGS. 25A and 25B show SEM cross sections of cordierite honeycomb made from Example H12 that was dipped into high solid loading slurry with the ultrafine alumina and the fine alumina particles, respectively. It can be seen that alumina particles of the washcoat are pulled into the intrabead porosity (intrabead pore structure 124) in the porous bead and leaves the interbead pathways around the beads (interstices 128) open for gas (exhaust) flow (thereby maintaining a desirable pressure drop when employed in a filter). Without wishing to be bound by theory, it is believed that capillarity forces, as described above, will facilitate interactivity between catalytic materials deposited within the intrabead pore structure and the exhaust gases during use of such a catalyst-loaded honeycomb body.

In another investigation, various honeycomb bodies were formed, optionally plugged, and then washcoated with a washcoating slurry as described herein. After plugging, the honeycomb bodies, now arranged as wall-flow filters were then washcoated to a washcoat concentration of about 75-80 g/L. The washcoat slurry comprised a fine carrier of alumina particles of at most about 1 μm in median particle size and larger alumina, zirconia, and ceria particles having a bimodal distribution with fine particles in the sub-micron range and larger particles in the median size range of about 7-10 μm. The 7-10 μm washcoat particles did not significantly penetrate the relatively smaller intrabead porosity. However, the smaller washcoat particles did penetrate into the porous ceramic walls and homogeneously distributed in the intrabead pore space. Both the relatively smaller and relatively larger washcoat particles anchored to the bead network around the exterior of the beads in the interbead pore space, but without significantly reducing the interbead pore size. The washcoat particles appeared to be well anchored in the bead surface porosity on the cordierite bead surfaces, thus providing high accessible surface area to promote catalytic activity.

Figure 26A:
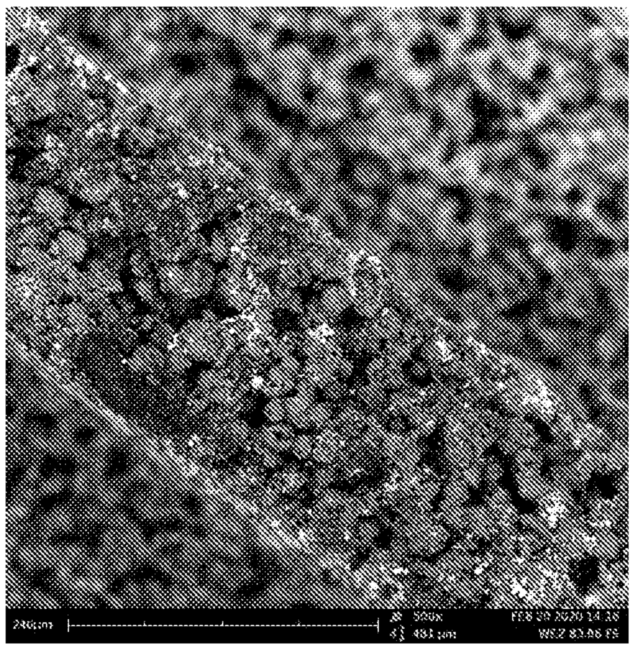
FIGS. 26A-26B show different magnifications of a fracture surface of a wall of a washcoated honeycomb body comprising an interconnected network of cordierite beads hosting washcoat particles according to an embodiment disclosed herein.
Figure 26B:
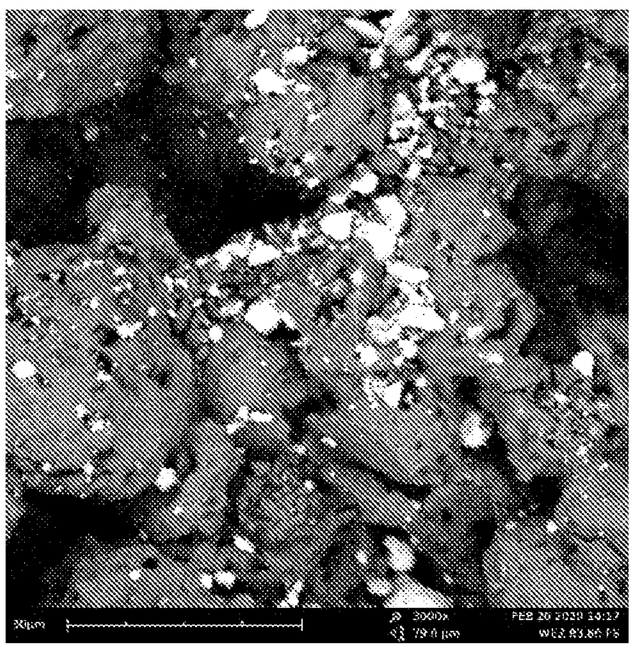
Figure 27A:
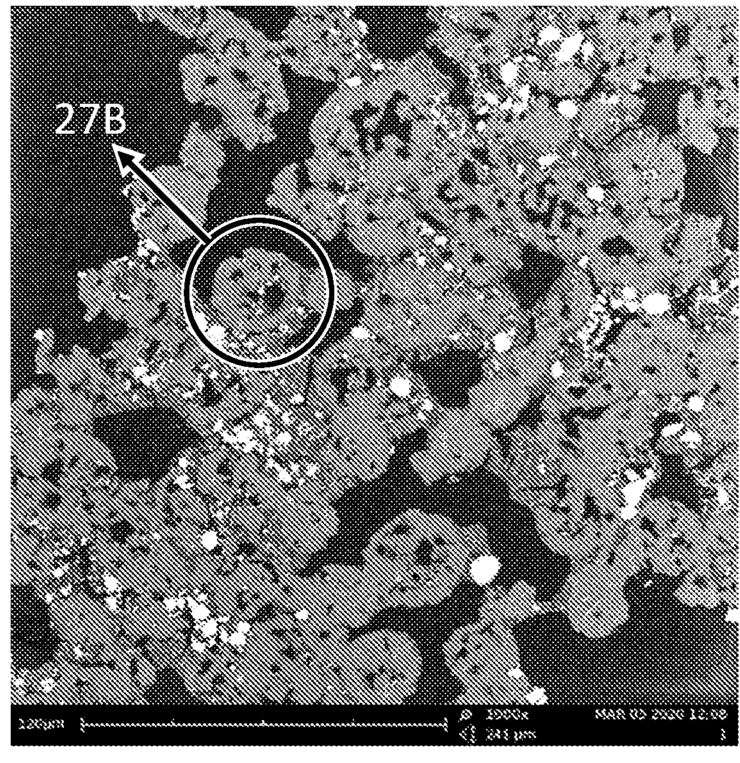
FIG. 27A shows a polished SEM cross-sectional image of a portion of a wall of a washcoated honeycomb body comprising an interconnected network of cordierite beads hosting washcoat particles, according to one embodiment disclosed herein.
Figure 27B:
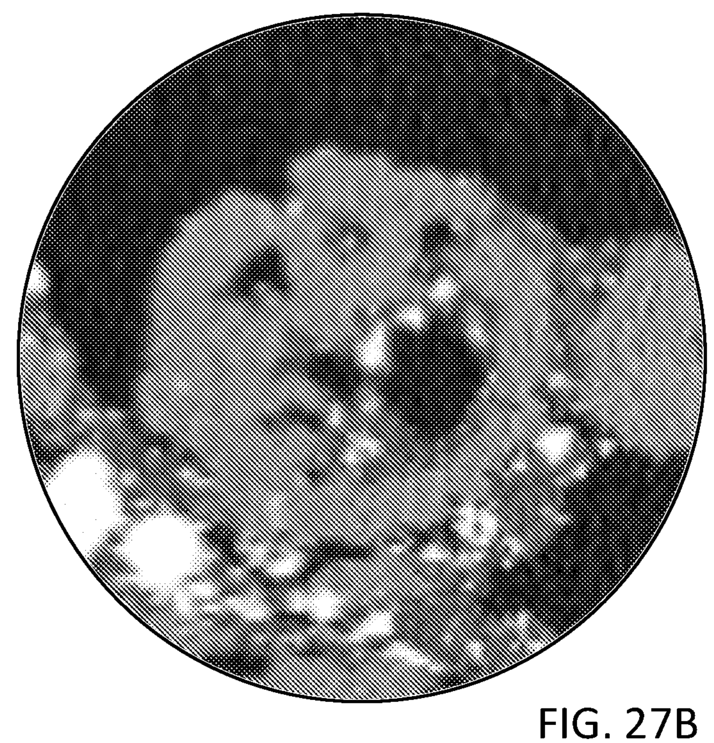
FIG. 27B shows an enlarged view of the encircled area of FIG. 23A showing a porous ceramic bead having washcoat particles deposited within the intrabead pore structure and externally on an outside surface of the bead.

FIGS. 26A-27B show various views of a honeycomb body made in accordance with Example H57 after washcoating with a three-way catalyst washcoating slurry at a concentration of 84 g/l. In particular, FIGS. 26A and 26B show SEM images of a representative portion of a fracture surface of a washcoated porous ceramic wall of the example washcoated honeycomb body at a magnification of approximately 500× and a fracture surface of the washcoated honeycomb body at a magnification of approximately 3000×, while FIG. 27A shows a polished surface of the washcoated honeycomb body at a magnification of approximately 1000×, with the encircled area of FIG. 27A further enlarged in FIG. 27B. In FIGS. 26A-27B, the cordierite material of the honeycomb body is shown in gray, pores are in black, and the washcoat particles are in white. Due to high surface area of the open porosity of the beads, as described herein, it can be seen in FIGS. 26A-27B, that there is a good distribution of catalyst material within the open pore structure of the beads, as well as on the outer surface of the beads. Additionally, due to the bimodal pore size distribution, many of the interbead pores (interstices between beads) remain essentially unblocked and open even after washcoating, thereby enabling low pressure drop if the honeycomb body is arranged as a filter, while still providing high catalytic activity with the catalytic material loaded in and/or on the internal and/or external surfaces of the beads.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A particulate filter comprising:

a ceramic honeycomb body comprising a plurality of intersecting walls, wherein the plurality of intersecting walls form a plurality of channels extending longitudinally though the ceramic honeycomb body from a first end face to a second end face;

a first plurality of plugs in a first subset of the plurality of channels at the first end face;

a second plurality of plugs in a second subset of the plurality of the channels at the second end face, wherein the first subset of the plurality of channels is different than the second subset of the plurality of channels;

wherein the plurality of intersecting walls comprise a porous ceramic material having a microstructure that comprises an interconnected network of porous spheroidal ceramic beads, wherein the microstructure has a total porosity defined as the sum of an open intrabead porosity of the porous spheroidal ceramic beads and an interbead porosity defined by interstices between the porous spheroidal ceramic beads in the interconnected network; and wherein the microstructure has a bimodal pore size distribution in which an intrabead median pore size of the porous spheroidal ceramic beads is from 1.5 μm to 4 μm and an interbead median pore size of the interstices between the porous spheroidal ceramic beads is from 6 μm to 20 μm.

2. The particulate filter of claim 1, wherein the open intrabead porosity is at least 8% relative to a total volume defined by the interconnected network.

3. The particulate filter of claim 1, further comprising a plurality of catalytically active particles deposited within pores of the porous spheroidal ceramic beads and within the interstices between the porous spheroidal ceramic beads on outer surfaces of the porous spheroidal ceramic beads.

4. The particulate filter of claim 1, wherein the porous spheroidal ceramic beads comprise at least 80 wt % cordierite.

5. The particulate filter of claim 1, wherein the porous spheroidal ceramic beads comprise a closed bead porosity of less than 5%.

6. The particulate filter of claim 1, wherein the open intrabead porosity is at least 12% relative to a total volume defined by the interconnected network.

7. The particulate filter of claim 1, wherein an interbead half maximum pore size distribution peak breadth is at most 6 μm, as determined by mercury intrusion porosimetry.

8. The particulate filter of claim 1, wherein an intrabead half maximum pore size distribution peak breadth is at most 2 μm, as determined by mercury intrusion porosimetry.

9. The particulate filter of claim 1, wherein the bimodal pore size distribution, when determined via mercury intrusion porosimetry, has a local minimum differential intrusion value at a pore size that is between the intrabead median pore size and the interbead median pore size, and wherein the local minimum differential intrusion value is less than 20% of a maximum differential intrusion value of an interbead peak.

10. The particulate filter of claim 1, wherein a D10 value of the bimodal pore size distribution of the particulate filter is at most 3 μm, as determined by mercury intrusion porosimetry.

11. The particulate filter of claim 1, wherein a D75-D50 value of the bimodal pore size distribution of the particulate filter is at most 2 μm, as determined by mercury intrusion porosimetry.

12. The particulate filter of claim 1, wherein a D50/D10 ratio of the bimodal pore size distribution of the particulate filter is at least 3, as determined by mercury intrusion porosimetry.

13. The particulate filter of claim 1, wherein the total porosity is at least 55%, and wherein, as determined by mercury intrusion porosimetry, the bimodal pore size distribution has a D10 value of at most 3 μm, a D50 value between 5 μm and 18 μm, and a D75-D50 value of at most 2 μm.

14. The particulate filter of claim 1, wherein the open intrabead porosity of the porous spheroidal ceramic beads is on average at least 20% relative to a volume of the porous spheroidal ceramic beads.

15. The particulate filter of claim 1, wherein the interbead median pore size is in a range from 8 μm to 18 μm.

16. The particulate filter of claim 1, wherein the porous spheroidal ceramic beads have a median particle size in a range from 20 μm to 50 μm.

17. A method of manufacturing a particulate filter, comprising:

mixing together a batch mixture comprising a plurality of porous ceramic spheroidal beads each comprising a porous ceramic material, shaping the batch mixture into a green honeycomb body;

firing the green honeycomb body into a ceramic honeycomb body by sintering together the plurality of porous ceramic spheroidal beads into an interconnected network of the plurality of porous ceramic spheroidal beads, wherein the ceramic honeycomb body comprises a plurality of intersecting walls that define channels extending axially between opposite end faces of the ceramic honeycomb body, wherein a microstructure of the plurality of intersecting walls comprises the interconnected network of the plurality of porous ceramic spheroidal beads; and alternatingly plugging at least some of the channels at the opposite end faces of the ceramic honeycomb body to form the particulate filter;

wherein the microstructure has a total porosity defined as the sum of an open intrabead porosity of the plurality of porous ceramic spheroidal beads and an interbead porosity defined by interstices between the plurality of porous ceramic spheroidal beads in the interconnected network; and wherein the microstructure has a bimodal pore size distribution in which an intrabead median pore size of the plurality of porous ceramic spheroidal beads is from 1.5 μm to 4 μm and an interbead median pore size of the interstices between the plurality of porous ceramic spheroidal beads is from 6 μm to 20 μm.

18. The method of claim 17, wherein prior to forming the batch mixture, the method further comprises:

forming a slurry mixture comprising a mixture of ceramic precursor materials;

spheroidizing the slurry mixture into spheroidal green agglomerates; and firing the spheroidal green agglomerates to form the plurality of porous ceramic spheroidal beads by converting the mixture of ceramic precursor materials into the porous ceramic material.

19. The method of claim 18, wherein the batch mixture comprises the plurality of porous ceramic spheroidal beads in an amount ranging from 60 wt % to 95 wt %, relative to a total weight of an inorganic binder and the plurality of porous ceramic spheroidal beads.

20. The method of claim 19, wherein the inorganic binder comprises a plurality of shear binder agglomerates, wherein the plurality of shear binder agglomerates comprise a green mixture of one or more inorganic ceramic precursor materials and a binder.

* * * * *